United States Patent
Nagao

(10) Patent No.: US 12,088,764 B2
(45) Date of Patent: Sep. 10, 2024

(54) IMAGE PROCESSING APPARATUS AND JOB OUTPUT METHOD

(71) Applicant: SHARP KABUSHIKI KAISHA, Sakai (JP)

(72) Inventor: Tsuyoshi Nagao, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/964,815

(22) Filed: Oct. 12, 2022

(65) Prior Publication Data

US 2023/0120306 A1    Apr. 20, 2023

(30) Foreign Application Priority Data

Oct. 14, 2021   (JP) .................................. 2021-168850
Oct. 14, 2021   (JP) .................................. 2021-168851

(51) Int. Cl.
*H04N 1/00*      (2006.01)
*H04N 1/44*      (2006.01)

(52) U.S. Cl.
CPC ..... *H04N 1/00082* (2013.01); *H04N 1/00204* (2013.01); *H04N 1/00411* (2013.01); *H04N 1/00413* (2013.01); *H04N 1/4426* (2013.01); *H04N 1/4433* (2013.01); *H04N 2201/0094* (2013.01)

(58) Field of Classification Search
USPC ......... 358/1.1–3.29, 434–440; 707/621–632; 715/700–866
See application file for complete search history.

(56) References Cited

U.S. PATENT DOCUMENTS

| | | | |
|---|---|---|---|
| 11,132,471 B1* | 9/2021 | Elmandouh | G06F 21/606 |
| 2005/0231760 A1* | 10/2005 | Minato | H04N 1/00472 358/1.15 |
| 2013/0021643 A1 | 1/2013 | Nuggehalli et al. | |
| 2014/0289674 A1* | 9/2014 | Jin | G06F 9/542 715/810 |

(Continued)

FOREIGN PATENT DOCUMENTS

JP       2013025809 A      2/2013

OTHER PUBLICATIONS

Tabuki Masumi, Information Processing Apparatus, Control Method Thereof, and Program; Sep. 16, 2021 (Year: 2021).*

(Continued)

*Primary Examiner* — Marcellus J Augustin
(74) *Attorney, Agent, or Firm* — ScienBiziP, P.C.

(57) ABSTRACT

An image processing apparatus includes a controller, a display, and a job executor that executes a job at a predetermined setting based on setting information for job execution sent from a terminal device, wherein the controller starts up an application in response to a startup instruction, generates apparatus information including identification information on the image processing apparatus based on the started application, displays the generated apparatus information on the display for the terminal device, and controls the job executor to output the job at a predetermined setting based on setting information for job execution sent from the terminal device having read the displayed apparatus information, and terminates the application when a termination determination time has elapsed after startup of the application.

17 Claims, 52 Drawing Sheets

(56) References Cited

U.S. PATENT DOCUMENTS

2016/0085489 A1* 3/2016 Hansen .................. G06F 3/1285
                                                              358/1.15
2017/0010668 A1* 1/2017 Son .......................... G06F 3/013
2019/0188398 A1* 6/2019 Kihara .................. H04W 12/64

OTHER PUBLICATIONS

Tanaka Yusaku, Remote Control System, Image Forming Apparatus, and Program; Jun. 4, 2015 (Year: 2015).*
Mori Keisuke, Output System, Output Apparatus, and Output Method; Mar. 2, 2016 (Year: 2016).*
Yoshida Shigeki, Printing Apparatus; Oct. 5, 2017 (Year: 2017).*
Morii Hiroyuki; Printing System, Control Method of the Same, and Program; Mar. 3, 2011 (Year: 2011).*
Nishida, Konai; Terminal Device, Information Processing System And Output Method; Apr. 26, 2019 (Year: 2019).*
Nakamura Yoshiyuki; Server Device, Picture Data Transmitting Method, Picture Display Method, Picture Display Program, Distributing Program and Storage Medium; 2002 (Year: 2002).*
Yamamoto Norihiro; Image Formation Device and Image Formation System With the Same; 2014 (Year: 2014).*
Konno Masahiro; Information Processor and Process Control Method; 2009 (Year: 2009).*
Server Device, Picture Data Transmitting Method, Picture Display Method, Picture Display Program, Distributing Program and Storage Medium (Year: 2002).*
Image Formation Device and Image Formation System With the Same (Year: 2014).*
Information Processor and Process Control Method (Year: 2009).*

* cited by examiner

FIG. 3

| | APPARATUS INFORMATION ITEMS (KEY) | VALUE |
|---|---|---|
| I/F-RELATED ITEMS | NAME | "Remote Operationn" |
| | TYPE | "MFP" |
| | VERSION | "1.0" |
| MFP-RELATED ITEMS | COLOR MODE | "Color output possible" |
| | PUNCH | "With options" |
| | STAPLE | "With options" |
| | OCR | "OCR possible" |
| | ⋮ | ⋮ |
| CONNECTION-RELATED ITEMS | DEVICE ID | "jv6Ou3QBGv8w6yNtGt" |
| | SESSION KEY | "1qazxsw23edcvfr45tgbnhy67ujm, ki8 ------" |
| | INSTALLATION COUNTRY | "0 -11" (example; value 3: Japan) |
| | ⋮ | ⋮ |

FIG. 4

| TERMINATION DETERMINATION VALUE MANAGEMENT TABLE | VALUE |
|---|---|
| AUTOMATIC APPLICATION TERMINATION | "ON" |
| TIME BEFORE TERMINATION (SEC) | "120" |
| COUNTING START TIMING | "AT TIME OF STARTUP" |

FIG. 6

| DEVICE ID | SETTING INFORMATION |
|---|---|
| "jv6Ou3QBGv8w6yNtGt" | MODE: COPY<br>NUMBER OF COPIES: 1<br>PAPER FEED TRAY: AUTO<br>DUPLEX COPY:<br>ONE-SIDED → ONE-SIDED<br>180-DEGREE ROTATION<br>OF BACK SURFACE<br>ORIENTATION: OFF<br>COLOR MODE: COLOR<br>PUNCH: OFF<br>STAPLE: OFF |

FIG. 8

| JOB ID | DEVICE ID | SETTING INFORMATION |
|---|---|---|
| "#0001" | "jv6Ou3QBGv8w6yNtGt" | MODE: COPY<br>NUMBER OF COPIES: 1<br>PAPER FEED TRAY: AUTO<br>DUPLEX COPY:<br>ONE-SIDED → ONE-SIDED<br>180-DEGREE ROTATION<br>OF BACK SURFACE<br>ORIENTATION: OFF<br>COLOR MODE: COLOR<br>PUNCH: OFF<br>STAPLE: OFF |

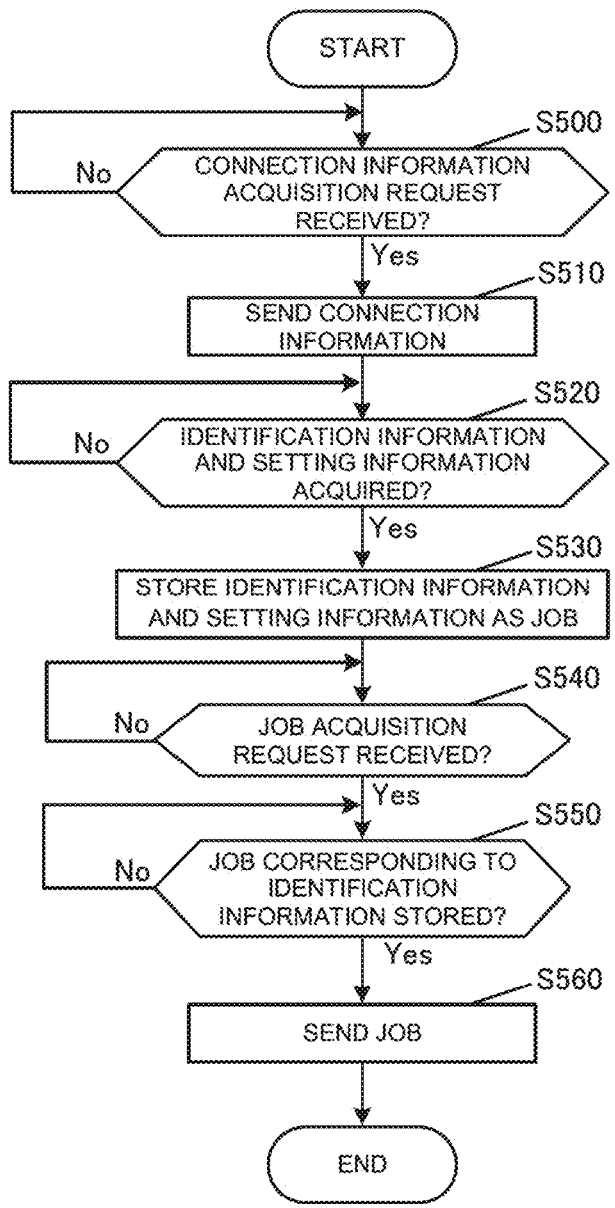

FIG. 50
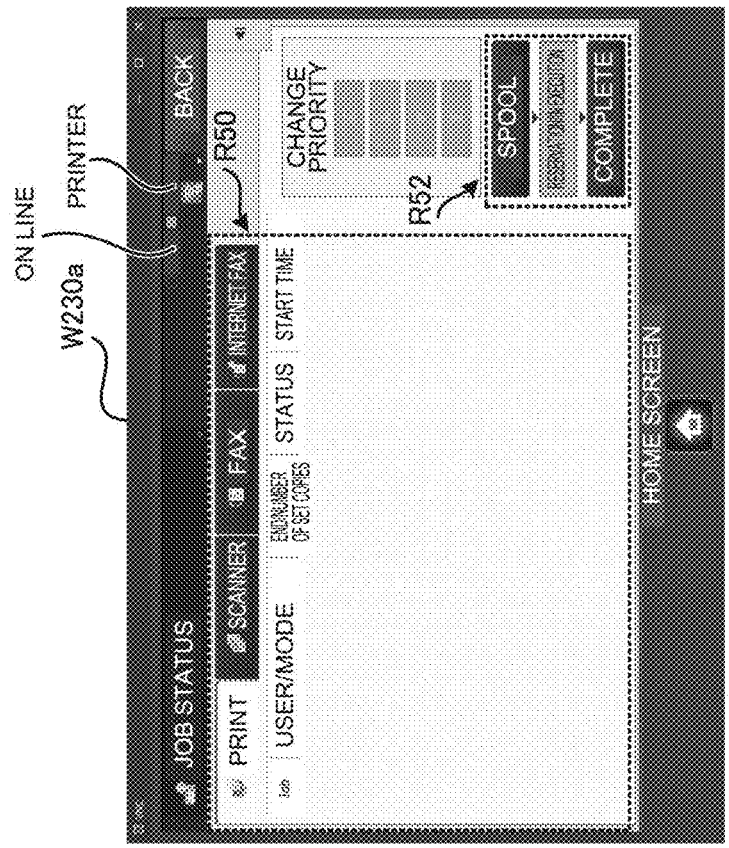

FIG. 51
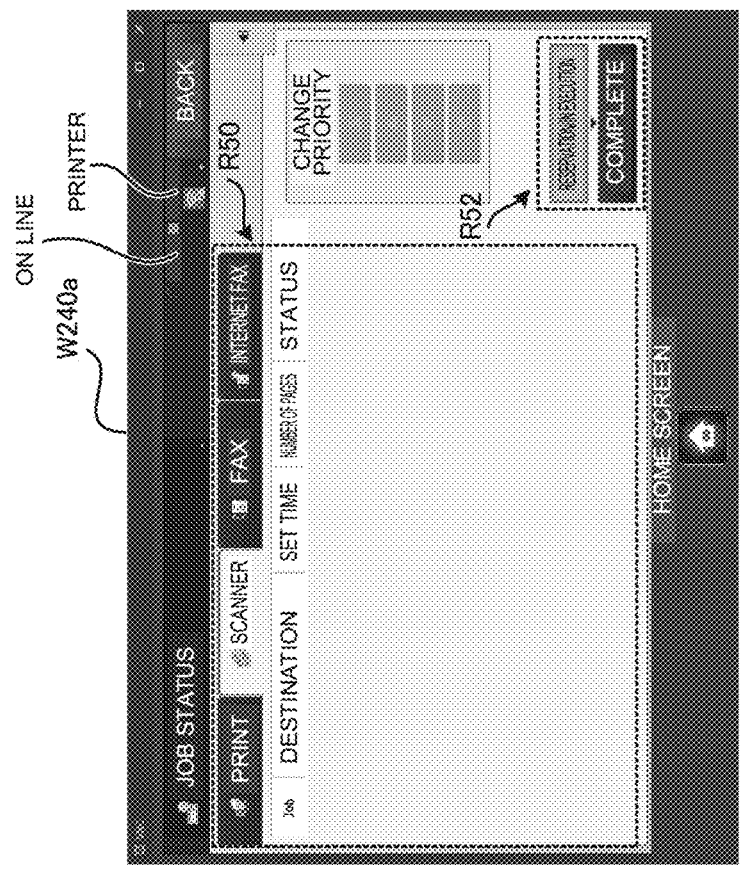
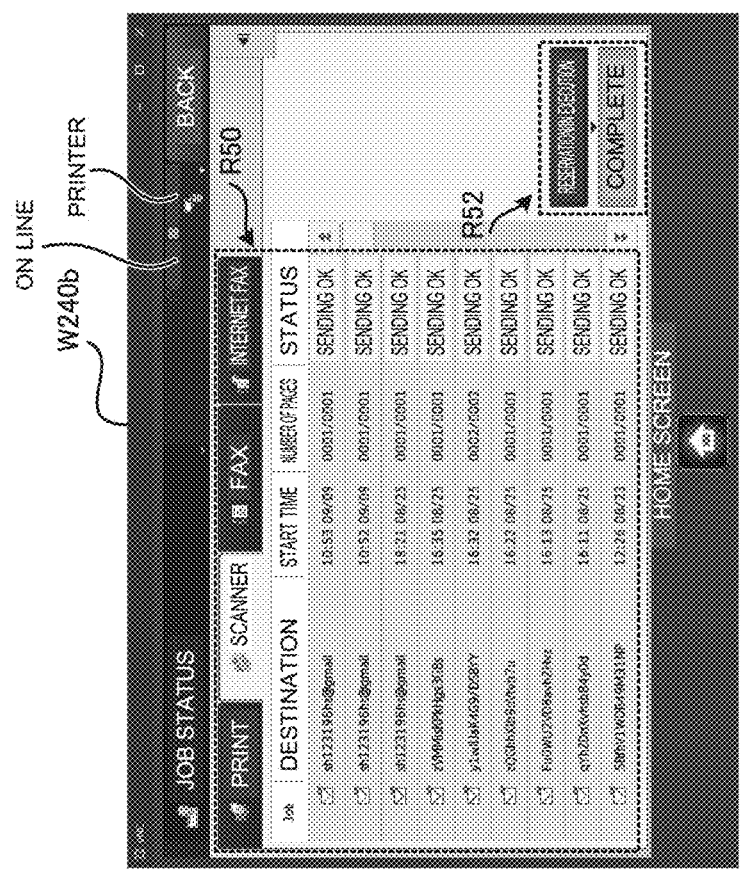

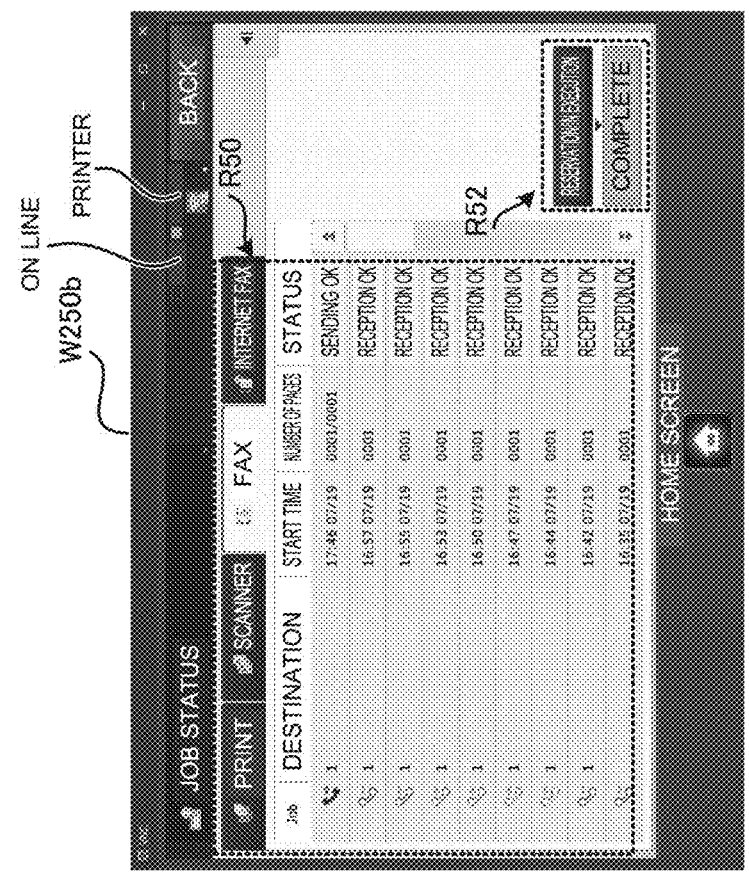
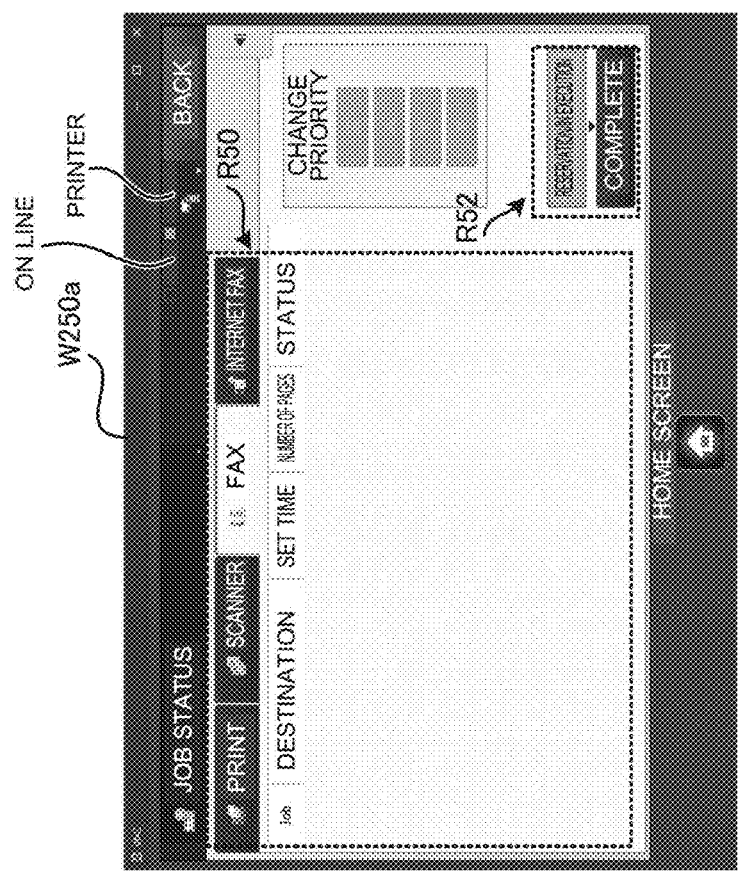
FIG. 52

IMAGE PROCESSING APPARATUS AND JOB OUTPUT METHOD

BACKGROUND OF THE INVENTION

Field of the Invention

The present disclosure relates to an image processing apparatus, and the like.

Description of the Background Art

Multifunction peripherals capable of executing, in a single apparatus, multiple modes such as copy mode, scan mode, fax mode, and e-mail mode often include an operation screen for selecting the mode and receiving input and selection of the setting values for the selected mode.

Recently, it has been a primary trend to adopt, as an operation screen, a touch panel display including a display that displays various types of information to the user and a touch panel that is placed on the display in a superimposed manner to detect the position pressed by the user's finger. The user operates the touch panel while checking various types of information displayed on the display, which achieves intuitive and easy selection of the mode and input and selection of the setting values for the selected mode.

The outbreak of the novel coronavirus has increased the demand to avoid high-frequency contact with an unspecified number of people in order to reduce the risk of infection.

For example, operations via operation screens of shared multifunction peripherals in workplaces, multipurpose multifunction peripherals installed in convenience stores, and the like, are no exception, and there is a need for urgent measures to avoid high-frequency contact.

There is a conventionally known technique for generating document jobs without manually inputting information to a document processing device such as a multifunction peripheral terminal as an example to avoid direct contact with the operation screen of the multifunction peripheral, and the like.

When an image processing apparatus is remotely operated to avoid high-frequency contact, the image processing apparatus maintains a communication with a network service while a remote application has started up for a remote operation of the image processing apparatus. In some specifications of image processing apparatuses, the remote application is not terminated during the communication with the network service, and therefore the image processing apparatus does not automatically perform a logout process when a user authentication function is enabled. In this case, there is a possibility of impersonation by other users because there is time to allow the image processing apparatus to be operated by a user other than the user who logged in to the image processing apparatus. Furthermore, in a case where the image processing apparatus is operated remotely from the terminal device, when the remote application is terminated after a job is registered in the network service and before the job is executed, there is a possibility that, when another user subsequently logs in to the multifunction peripheral and starts up the remote application, the job registered in the network service could be executed.

A primary object of the present disclosure is to provide an image processing apparatus, and the like, which terminates the remote application after a termination determination time has elapsed and thus may prevent impersonation by other users.

A secondary object of the present disclosure is to provide an image processing apparatus, and the like, which deletes the job registered in the network service before or when the remote application is started up and thus may prevent other users from executing the job registered in the network service.

SUMMARY OF THE INVENTION

In order to solve the above issue, an image processing apparatus according to the present disclosure includes a controller, a display, and a job executor that executes a job at a predetermined setting based on setting information for job execution sent from a terminal device, and the controller starts up an application in response to a startup instruction, generates apparatus information including identification information on the image processing apparatus based on the started application, displays the generated apparatus information on the display for the terminal device, and controls the job executor to output the job at a predetermined setting based on setting information for job execution sent from the terminal device having read the displayed apparatus information, and terminates the application when a termination determination time has elapsed after startup of the application.

An output system according to the present disclosure is a job output system including a terminal device, an image processing apparatus, and a network service, the terminal device includes a controller and an apparatus information acquirer that acquires apparatus information including identification information for identifying the image processing apparatus, generates a user interface that receives a setting for job execution by the image processing apparatus based on a request from a user, and sends setting information for job execution set via the user interface and the acquired identification information to the network service, the network service includes a controller and a storage that stores the setting information and the identification information in association with each other, sends the setting information corresponding to the identification information to the image processing apparatus in response to a request from the image processing apparatus, the image processing apparatus includes a controller, a display, and a job executor that executes a job at a predetermined setting based on setting information for job execution sent from the terminal device, the controller starts up an application in response to a startup instruction, generates apparatus information including identification information on the image processing apparatus based on the started application, displays the generated apparatus information on the display for the terminal device, controls the job executor to output the job at the predetermined setting based on setting information for job execution sent from the terminal device having read the displayed apparatus information and, terminates the application when a termination determination time has elapsed after startup of the application.

A job output method according to the present disclosure is a job output method by an image processing apparatus, and the job output method includes starting up an application in response to a startup instruction, generating apparatus information including identification information on the image processing apparatus based on the started application, displaying the generated apparatus information on the display for the terminal device, and outputting the job at a predetermined setting based on setting information for job execution sent from the terminal device having read the displayed apparatus information, and terminating the application when a termination determination time has elapsed after startup of the application.

An image processing apparatus according to the present disclosure includes a controller, a display, and a job executor that executes a job at a predetermined setting based on setting information for job execution sent from a terminal device, and the controller starts up an application in response to a startup instruction, establishes a communication with the terminal device, acquires a job including setting information for job execution registered in a network service from the terminal device and controls the job executor to execute the job, and outputs a deletion request to the network service when the application is started up.

An output system according to the present disclosure is a job output system including a terminal device, an image processing apparatus, and a network service, the terminal device includes a controller and an apparatus information acquirer that acquires apparatus information including identification information for identifying the image processing apparatus, generates a user interface that receives a setting for job execution by the image processing apparatus based on a request from a user, and sends setting information for job execution set via the user interface and the acquired identification information to the network service, the network service includes a controller and a storage that stores the setting information and the identification information as a job in association with each other, and sends a job corresponding to the identification information to the image processing apparatus in response to a request from the image processing apparatus, the image processing apparatus includes a controller, a display, and a job executor that executes a job at a predetermined setting based on setting information for job execution sent from the terminal device, the controller starts up an application in response to a startup instruction, establishes a communication with the terminal device, acquires a job including setting information for job execution registered in the network service from the terminal device, controls the job executor to execute the job, and outputs a deletion request to the network service when the application is started up.

A job output method according to the present disclosure is a job output method by an image processing apparatus including a controller, a display, and a job executor that executes a job at a predetermined setting based on setting information for job execution sent from a terminal device, and the job output method includes starting up an application in response to a startup instruction, establishing a communication with the terminal device, acquiring a job including setting information for job execution registered in a network service from the terminal device and controlling the job executor to execute the job, and outputting a deletion request to the network service when the application is started up.

According to the present disclosure, it is possible to provide an image processing apparatus, and the like, which terminates the remote application after the termination determination time has elapsed and thus may prevent impersonation by other users. According to the present disclosure, it is possible to provide an image processing apparatus, and the like, which deletes the job registered in the network service before or when the remote application is started up and thus may prevent other users from executing the job registered in the network service.

BRIEF DESCRIPTION OF THE DRAWINGS

FIG. 3 is a table illustrating a configuration example of apparatus information.

FIG. 4 is a table illustrating a termination determination value management table.

FIG. 6 is a table illustrating a configuration example of a combination of setting information and identification information sent by a terminal device.

FIG. 8 is a table illustrating a configuration example of a combination of setting information and identification information as a job stored in the network service.

FIG. 12 is a flowchart illustrating a process of the network service according to the first embodiment.

FIG. 50 is a diagram illustrating an operation example according to the tenth embodiment.

FIG. 51 is a diagram illustrating an operation example according to the tenth embodiment.

FIG. 52 is a diagram illustrating an operation example according to the tenth embodiment.

DESCRIPTION OF THE PREFERRED EMBODIMENTS

Embodiments of the present disclosure will be described below with reference to the drawings. According to the present disclosure, a multifunction peripheral (MFP) 10 capable of executing jobs in a copy mode and a scan mode is described as an example of an image processing apparatus. The embodiments below are examples for describing the present disclosure, and the technical scope of the description in the claims is not limited to the description below.

1 First Embodiment

A first embodiment is an embodiment in which a remote application is terminated after a termination determination time has elapsed so that impersonations by other users may be prevented.

1.1 Overall Configuration

Figure 1:
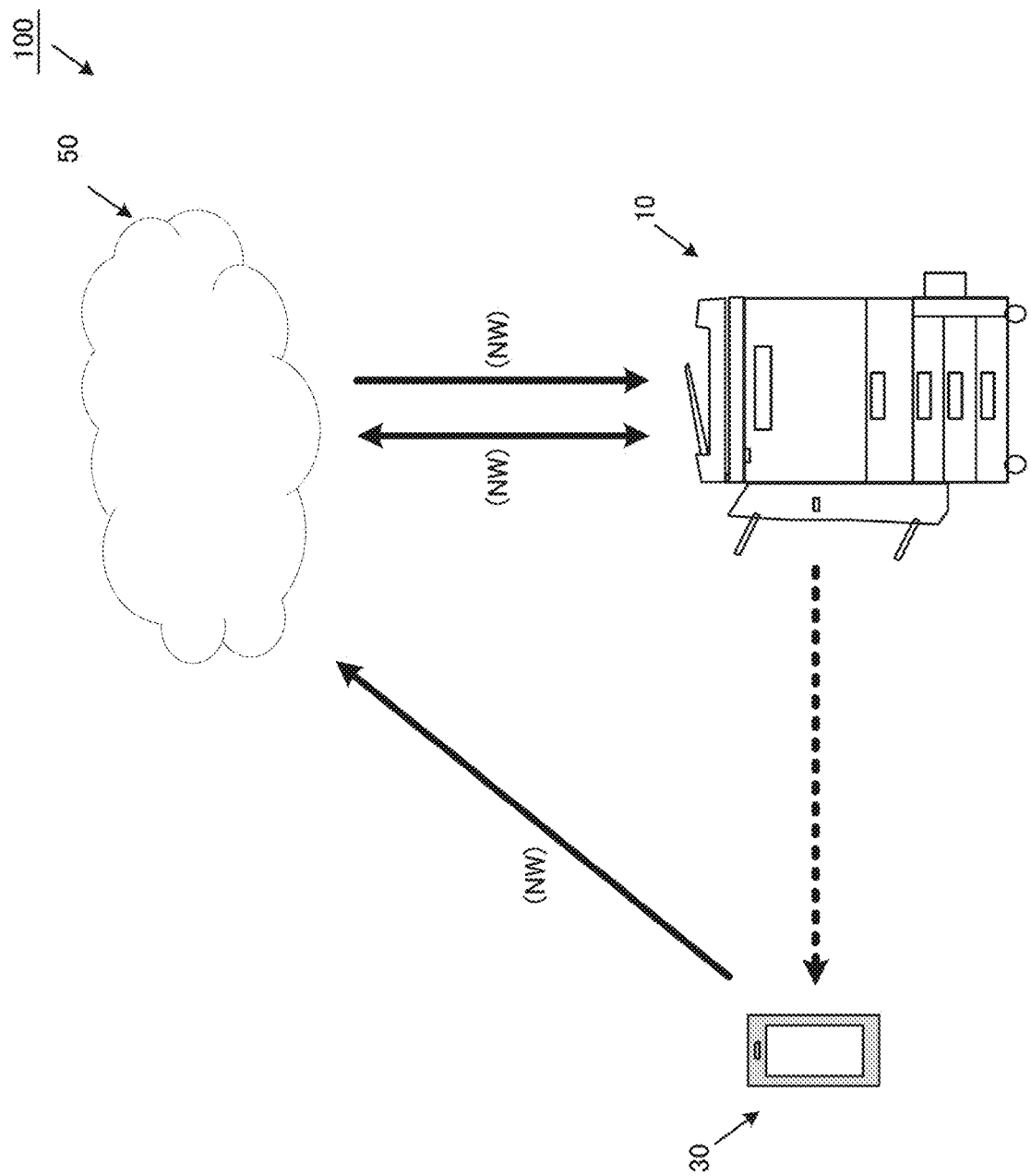
FIG. 1 is a diagram schematically illustrating an overall configuration of an output system according to a first embodiment.

FIG. 1 is a diagram schematically illustrating an overall configuration of an output system 100 according to the first embodiment. The output system 100 includes the multifunction peripheral 10, a terminal device 30, and a network service 50. In the output system 100 according to the first embodiment, an external authentication server (not illustrated), or the like, may be separately installed to perform user authentication for the multifunction peripheral 10.

The multifunction peripheral 10 is connected to the network service 50 via a network (NW), illustrated in a solid line in FIG. 1, to enable bi-directional communications. The terminal device 30 is communicatively connected to the network service 50 via a network (NW). The terminal device 30 is configured to acquire apparatus information described below from the multifunction peripheral 10 (a dotted line in FIG. 1).

Here, the network refers to a mechanism, method, or the like, which connects at least two apparatuses so that information may be sent from one apparatus to another. The apparatuses communicating via a network may be independent apparatuses as illustrated in FIG. 1 or may be internal blocks constituting a single apparatus.

The communication may be not only a wireless communication or a wired communication but also a mixture of a wireless communication and a wired communication. For example, a configuration may be such that a wired communication is performed in some sections and a wireless communication is performed in others sections. Furthermore, a configuration may be such that a wireless communication is performed from one apparatus to the other apparatus and a wired communication is performed from the other apparatus to one apparatus.

1.2 Functional Configuration

1.2.1 Regarding Multifunction Peripheral 10

The multifunction peripheral 10 is, for example, an image processing apparatus that may scan a document and form an image on a sheet as a recording medium to output a printed material. The multifunction peripheral 10 is also an image processing apparatus that may output electronic data in a predetermined format (e.g., portable document format (PDF)) based on the scan data on a document. The material input to the multifunction peripheral 10 is not limited to documents, but may also be electronic data input from, for example, external storage media or external devices.

Figure 2:
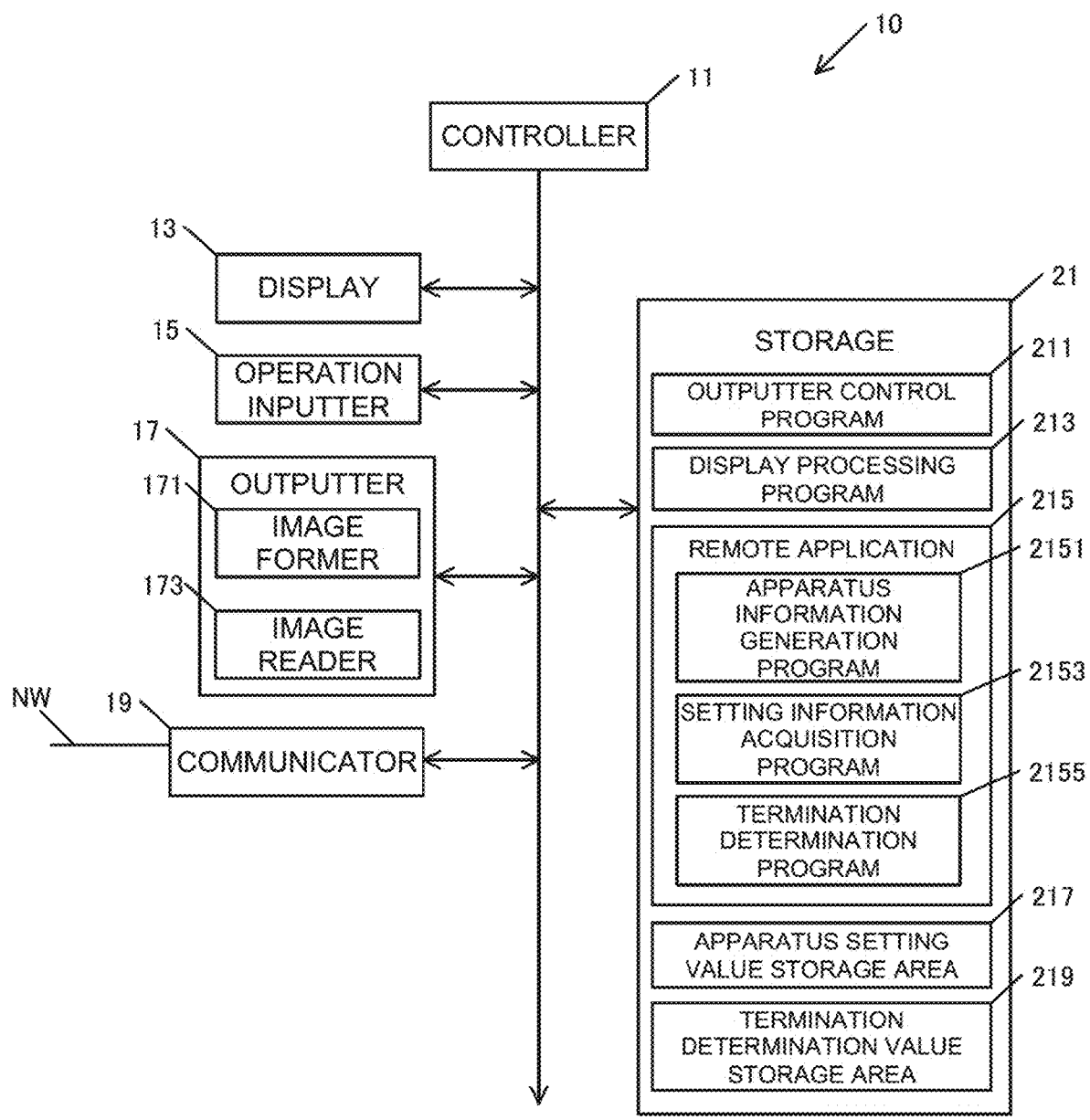
FIG. 2 is a diagram illustrating a functional configuration of a multifunction peripheral according to the first embodiment.

FIG. 2 is a functional configuration diagram of the multifunction peripheral 10. The multifunction peripheral 10 includes a controller 11, a display 13, an operation inputter 15, an outputter 17 as a job executor, a communicator 19, and a storage 21.

The controller 11 controls the overall multifunction peripheral 10. The controller 11 includes, for example, one or more arithmetic devices (e.g., central processing units (CPUs)). The controller 11 reads and executes various programs stored in the storage 21 to perform its function.

The display 13 displays various types of information to a user, etc. The display 13 may include, for example, a liquid crystal display (LCD) or an organic electro-luminescence (EL) display. The display 13 displays apparatus information including identification information described below.

The operation inputter 15 receives input of information from the user, etc. The operation inputter 15 may include hardware keys (e.g., a numeric keypad), buttons, etc. The operation inputter 15 may be configured as a touch panel display that allows input via the display 13. In this case, examples of the input method to the touch panel display may include a resistive method, infrared method, inductive method, and capacitive method.

The outputter 17 includes an image former 171 and an image reader 173. The image former 171 forms and outputs an image based on image data (image data generated by scanning a document or image data input from an external device) on a sheet as a recording medium. The image former 171 may include, for example, a laser printer using an electrophotographic system. The image former 171 forms images by using the toners supplied from toner cartridges (not illustrated) corresponding to toner colors (e.g., cyan, magenta, yellow, and black).

The image reader 173 scans and reads the document (document image) to be read to generate and output image data. The image reader 173 may be configured as a scanner device including an image sensor such as a charge coupled device (CCD) or a contact image sensor (CIS). There are no restrictions on the configuration of the image reader 173 as long as the image reader 173 is configured to output the image data by reading the reflected light image from the document with the image sensor.

The communicator 19 includes either a wired or wireless interface or both wired and wireless interfaces to communicate with other devices via a local area network (LAN), a wide area network (WAN), the Internet, a telephone line, a fax line, etc.

The storage 21 stores various programs needed for the operation of the multifunction peripheral 10 and various types of data. The storage 21 may include a storage device such as a random access memory (RAM), a hard disk drive (HDD), a solid state drive (SSD), and a read only memory (ROM).

According to the first embodiment, the storage 21 stores an outputter control program 211, a display processing program 213, a remote application 215 as an application and provides an apparatus setting value storage area 217 and a termination determination value storage area 219.

The outputter control program 211 is a program read by the controller 11 to control the outputter 17 such as the image former 171 and the image reader 173. When the job described below is acquired, the controller 11, which has read the outputter control program 211, controls the outputter 17 based on the setting information included in the job to perform print output by the image former 171 or image data output by the image reader 173.

The display processing program 213 is a program read by the controller 11 to perform a display process in the display 13 for, for example, the home screen and the job execution screen based on each mode. After reading the display processing program 213, the controller 11 displays, on the display 13, the encoded information including the apparatus information generated by an apparatus information generation program 2151 in accordance with the startup of the remote application 215.

The remote application 215 includes the apparatus information generation program 2151, a setting information acquisition program 2153, and a termination determination program 2155. By executing these programs, the controller 11 may provide the apparatus information, acquire the setting information, and control the termination of the remote application 215.

The apparatus information generation program 2151 is a program read by the controller 11 to generate the apparatus information including the identification information on the multifunction peripheral 10 in response to a startup instruction of the remote application 215. After reading the apparatus information generation program 2151, the controller 11 sends the request to the network service 50 to acquire the connection information for the network service 50 such as a session key. The controller 11 generates the apparatus information based on the acquired connection information, connection-related items based on the identification information, or the like, on the multifunction peripheral 10, interface (I/F)-related items, items (MFP-related items) regarding the settings of the multifunction peripheral 10 necessary for input of the setting information in the terminal device 30, etc. The controller 11 generates the apparatus information as the encoded information that is encoded by one or more of a two-dimensional code (Quick Response Code: QR Code (registered trademark)), a one-dimensional code (barcode), a symbol, and an alphanumeric character. The controller 11 updates the apparatus information on a regular or irregular basis. For example, the controller 11 may update the apparatus information to support a newly added function when a driver program of the multifunction peripheral 10 is updated, when the installation location of the multifunction peripheral 10 is changed, etc.

Here, a configuration example of the apparatus information according to the present disclosure will be described with reference to FIG. 3. The apparatus information illustrated in FIG. 3 includes items described in a specific format, such as "name", "type", and "version" as interface (I/F)-related items, "color mode", "punch", "staple", "optical character recognition (OCR)", and the like, as MFP-related items, and "device ID", "session key", "installation country", and the like, as connection-related items. The terminal device 30 reads and decodes the encoded information, which is obtained by encoding the above apparatus information, so as to acquire the apparatus information. The terminal device 30 may connect to the network service 50 based on the connection-related items (the device ID and the session key) of the acquired apparatus information.

The session key here is the information needed for communications by each apparatus. For example, the session key is generated each time a communication is started and is discarded when the communication terminates. A valid time may be set for the session key and, when the valid time has elapsed, the communication performed based on the session key may be terminated.

The apparatus information items and their values illustrated in FIG. 3 are merely examples, and the apparatus information according to the present disclosure is not limited to the description in FIG. 3. For example, in a case where an authentication operation for the multifunction peripheral 10 is needed when a job execution instruction is given by the terminal device 30, the apparatus information may include a personal identification number (PIN), a one-time password generated by a token, etc.

With reference back to FIG. 2, the setting information acquisition program 2153 is a program read by the controller 11 to acquire the setting information set in the terminal device 30 as a job from the network service 50. After reading the setting information acquisition program 2153, the controller 11 uses the acquired connection information to perform, for example, Hypertext Transfer Protocol Secure (HTTPS) long polling for the network service 50 and, when the terminal device 30 sends the setting information, etc. to the multifunction peripheral 10, acquires the job as the setting information.

The termination determination program 2155 is a program read by the controller 11 to terminate the remote application 215 after the termination determination time has elapsed. For example, the controller 11, which has read the termination determination program 2155, determines whether the termination determination time (e.g., 120 seconds) has elapsed after receiving a startup instruction for the remote application 215 and, when the termination determination time has elapsed, performs a termination control to terminate the remote application 215. The termination determination program 2155 may be started up not only when the remote application 215 is started up but also, for example, when the request to acquire the connection information is sent to the network service 50, when the connection information is acquired, or when login authentication is performed. A counting start timing of the termination determination time may be when the request to acquire the connection information is sent, when the connection information is acquired, or when login authentication is performed.

The apparatus setting value storage area 217 is a storage area that stores each value of the interface-related items, the MFP-related items, the connection-related items, and the like, for generating the apparatus information. After reading the apparatus information generation program 2151, the controller 11 reads the values of the MFP-related items (e.g., "color mode", "punch", "staple", and "OCR") stored in the apparatus setting value storage area 217 so as to generate the apparatus information.

The termination determination value storage area 219 is a storage area that stores a termination determination value management table that is referred to by the controller 11, which has read the termination determination program 2155, to perform termination determination of the remote application 215.

Here, with reference to FIG. 4, a configuration example of the termination determination value management table will be described. The termination determination value management table may include, as management items, the item "automatic application termination" for setting whether to (automatically) terminate the remote application 215, "time before termination (seconds)" for setting the determination time before the remote application 215 is terminated, and "counting start timing" for setting the counting start timing of the determination time. FIG. 4 illustrates an example where the value of "automatic application termination" is set to "ON", the value of "time before termination (seconds)" is set to "120 (seconds)", and the value of "counting start timing" is set to "at the time of startup (of the remote application 215)". The values for these management items may be set via a termination determination value setting screen described below.

1.2.2 Regarding Terminal Device 30

The terminal device 30 according to the present disclosure may be configured as what is called a mobile terminal device, such as a smartphone, tablet, cell phone, or notebook computer. The terminal device 30 is configured as a device that has a combination of at least the function to generate a (graphical) user interface, the communication function, and the function specific to mobile terminal devices.

Figure 5:
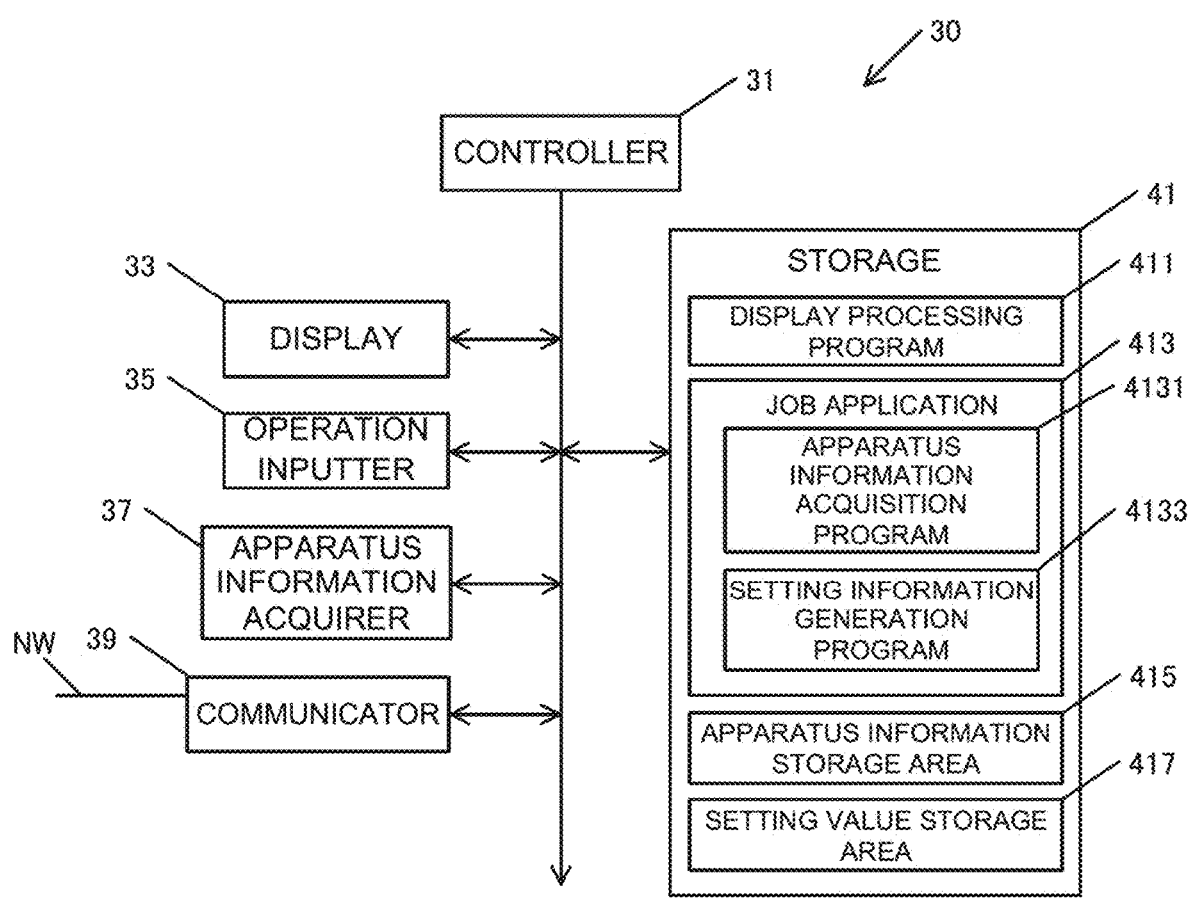
FIG. 5 is a diagram illustrating a functional configuration of a terminal device according to the first embodiment.

FIG. 5 is a functional configuration diagram of the terminal device 30. The terminal device 30 includes a controller 31, a display 33, an operation inputter 35, an apparatus information acquirer 37, a communicator 39, and a storage 41.

The controller 31 controls the overall terminal device 30. The controller 31 includes, for example, one or more arithmetic devices (CPUs, etc.), and the controller 31 reads and executes various programs stored in the storage 41 to perform its function.

The display 33 displays various types of information to the user, etc. The display 33 may include, for example, an LCD or an organic EL display.

The operation inputter 35 receives input of information from the user, etc. The operation inputter 35 may be configured as a touch panel display that allows input via the display 33. In this case, examples of the input method to the touch panel display may include a resistive method, infrared method, inductive method, and capacitive method.

The apparatus information acquirer 37 acquires the encoded information displayed on the display 13 of the multifunction peripheral 10 and decodes the encoded information to acquire the apparatus information. Examples of the apparatus information acquirer 37 may include an imaging device such as a camera and a scanning device using a laser beam. As long as the apparatus information acquirer 37 is configured to read the encoded information on the multifunction peripheral 10 so as to acquire the apparatus information, there are no restrictions, and the apparatus information acquirer 37 may acquire the apparatus information by using wireless communications (e.g., Wifi (registered trademark), Bluetooth (registered trademark), and infrared rays). The apparatus information acquirer 37 does not need to be directly included in the terminal device 30, but may be an external device having, for example, an imaging function, scanning function, etc.

The communicator 39 includes either a wired or wireless interface or both wired and wireless interfaces to communicate with other devices via a LAN, WAN, the Internet, telephone line, etc.

The storage 41 stores various programs needed for operations of the terminal device 30 and various types of data. The storage 41 may include a storage device such as a RAM, HDD, SSD, and ROM.

According to the first embodiment, the storage 41 stores a display processing program 411 and a job application 413 and provides an apparatus information storage area 415 and a setting value storage area 417.

The display processing program 411 is a program read by the controller 31 to display, on the display 33, a user interface, or the like, which receives the selection of a job mode to be executed by the multifunction peripheral 10 and the input and selection of setting values.

The job application 413 includes an apparatus information acquisition program 4131 and a setting information generation program 4133. By executing these programs, the controller 31 may generate the setting information to be executed by the multifunction peripheral 10.

The apparatus information acquisition program 4131 is a program read by the controller 31 in response to a startup instruction of the job application 413. After reading the apparatus information acquisition program 4131, the controller 31 controls the apparatus information acquirer 37 to acquire the encoded information (e.g., QR Code) including the apparatus information.

The setting information generation program 4133 is a program read by the controller 31 to generate the setting information based on the setting values that are input and selected via the user interface displayed on the display 33 in response to the startup instruction of the job application 413. After reading the setting information generation program 4133, the controller 31 generates the setting information from various setting values that are input and selected via the user interface and stored in the setting value storage area 417. Then, the controller 31 sends, to the network service 50, the generated setting information together with the identification information (device ID) on the multifunction peripheral 10 extracted from the acquired apparatus information.

Here, FIG. 6 is a table illustrating a configuration example of a combination of the setting information and the identification information (device ID) sent by the terminal device 30 to the network service 50. FIG. 6 illustrates an example of sending of the combination of the setting information including a group of "mode", "number of copies", "paper feed tray", "duplex copy", "180-degree rotation of back surface orientation", "color mode", "punch", and "staple" that are input and selected via the user interface and "jv6Ou3QBGv8w6yNtGt" as the identification information (device ID) on the multifunction peripheral 10.

With reference back to FIG. 5, the apparatus information storage area 415 is a storage area that stores the apparatus information acquired from the multifunction peripheral 10. The setting value storage area 417 is a storage area that stores the setting value input and selected by the user via the user interface.

1.2.3 Regarding Network Service 50

The network service 50 is a computing system, what is called a cloud, which provides a predetermined service such as processing resources, storage resources, and delivery resources via, for example, a web browser. The service provided by the network service 50 may be used by accessing from the multifunction peripheral 10 or the terminal device 30 via the network (NW) using any data communication protocol such as a transfer control protocol, Internet protocol, or other protocols. The network service 50 includes one or more network devices as hardware.

Figure 7:
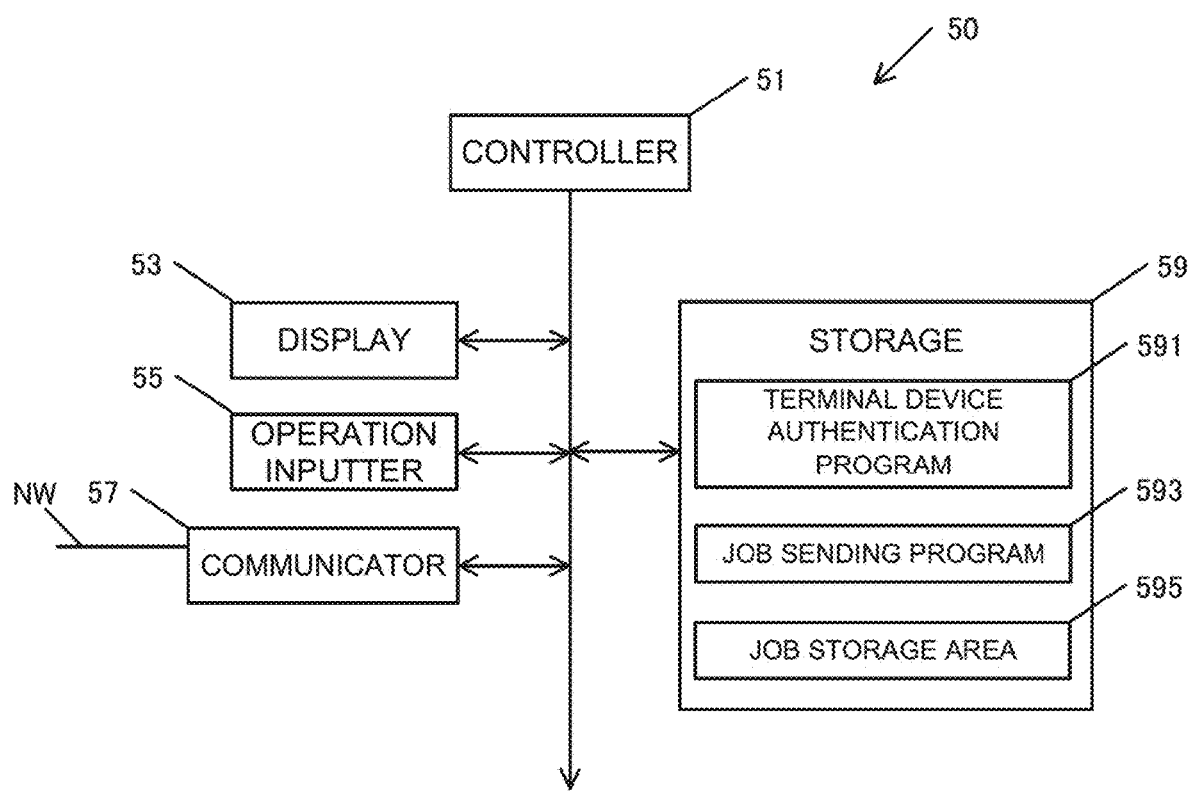
FIG. 7 is a diagram illustrating a functional configuration of a network device according to the first embodiment.

FIG. 7 is a functional configuration diagram of the network service 50. The network service 50 includes a controller 51, a display 53, an operation inputter 55, a communicator 57, and a storage 59.

The controller 51 controls the overall network service 50. The controller 51 includes, for example, one or more arithmetic devices (CPUs, etc.), and the controller 51 reads and executes various programs stored in the storage 59 to perform its function.

The display 53 displays various types of information to the user, etc. The display 53 may include, for example, an LCD or an organic EL display.

The operation inputter 55 receives input of information from the user, etc. An input device such as a keyboard and a mouse may be used as the operation inputter 55.

The communicator 57 includes either a wired or wireless interface or both wired and wireless interfaces to communicate with other devices via a LAN, WAN, the Internet, telephone line, etc.

The storage 59 stores various programs needed for the operation of the network service 50 and various types of data. The storage 59 may include a storage device such as a RAM, HDD, SSD, and ROM.

According to the first embodiment, the storage 59 stores a terminal device authentication program 591 and a job sending program 593 and provides a job storage area 595.

The terminal device authentication program 591 is a program read by the controller 51 to authenticate the connection with the terminal device 30. When the identification information and the setting information are sent from the terminal device 30, the controller 51, which has read the terminal device authentication program 591, authenticates the terminal device 30 based on the session key included in the setting information.

The job sending program 593 is a program read by the controller 51 to send the job to the multifunction peripheral 10. After reading the job sending program 593, the controller 51 searches for the job ID attached to the identification information (device ID) on the multifunction peripheral 10 in response to HTTPS long polling from the multifunction peripheral 10. When the job ID is associated with the setting information, the setting information is sent as a job to be executed by the multifunction peripheral 10.

As illustrated in FIG. 8, the job storage area 595 is a storage area that stores the job to be executed by the multifunction peripheral 10 after the controller 51 associates the identification information with the setting information on the multifunction peripheral 10 sent from terminal device 30 and then adds the job ID. The controller 51 uses the job ID to manage the information in which the identification information (device ID) is associated with the setting information. The job ID may also be assigned by the terminal device 30. In this case, the terminal device 30 may associate the identification information with the setting information on the multifunction peripheral 10, then add the job ID, and send them to the network service 50. The controller 51 stores, in the job storage area 595, the identification information and the setting information on the multifunction peripheral 10 with the job ID added thereto.

1.3 Process Flow

1.3.1 Regarding Overall Process

Figure 9:
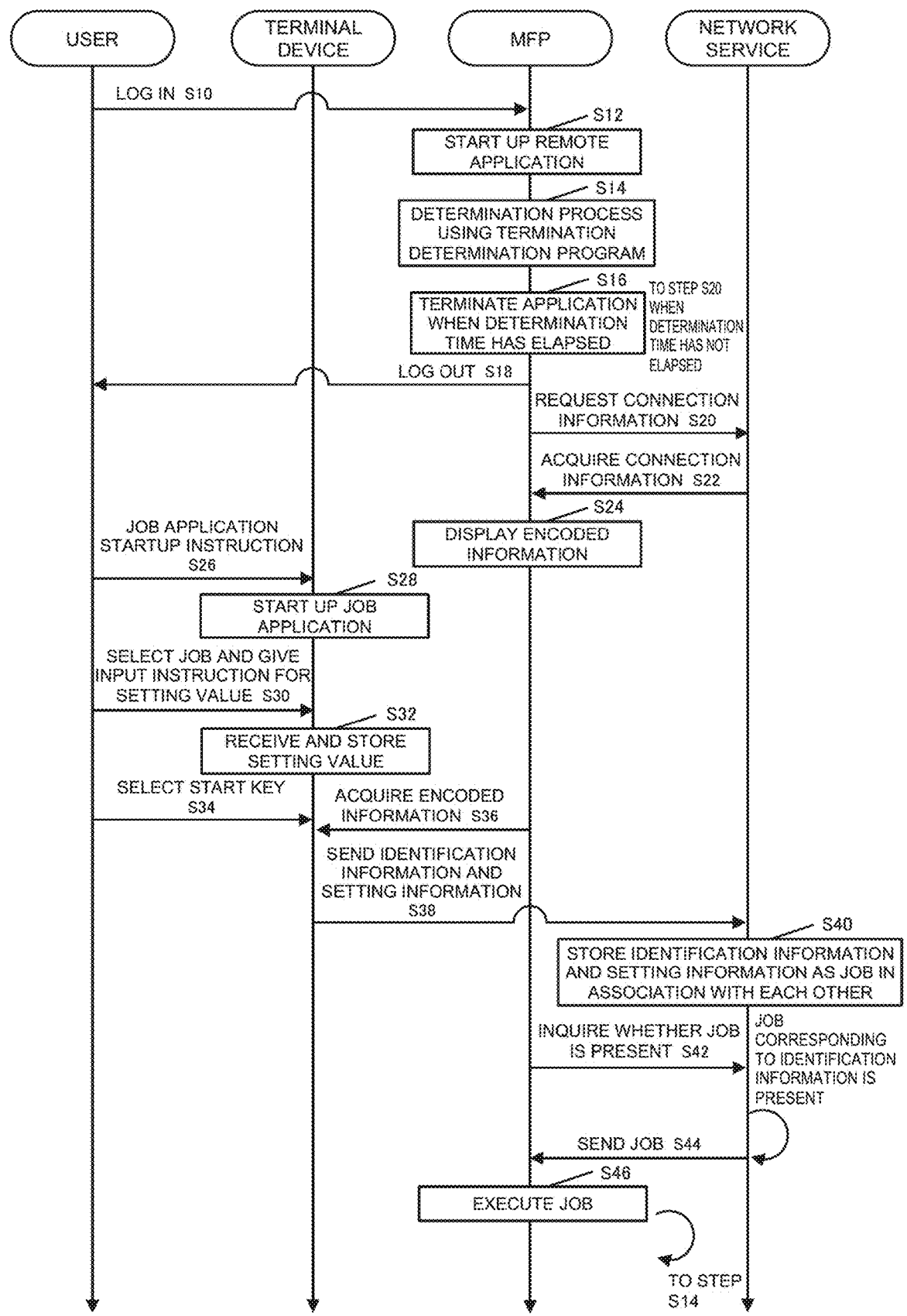
FIG. 9 is a flowchart illustrating an overall process according to the first embodiment.

Next, the overall process according to the first embodiment will be described with reference to the flowchart in FIG. 9. The overall process illustrated in FIG. 9 is a process that is started when the remote application 215 is started up after the user logs in to the multifunction peripheral 10 while a user authentication function of the multifunction peripheral 10 is enabled.

First, the user logs in to the multifunction peripheral 10 via a login screen described below (Step S10). Specifically, the multifunction peripheral 10 performs a login process to display a screen for the user to input the information (e.g., user name and password) needed for login. After the information needed for login is input, the multifunction peripheral 10 transitions to a login state when the user is an appropriate user (Step S10).

After logging in to the multifunction peripheral 10, the user inputs a startup instruction for the remote application 215 via, for example, a home screen described below.

In response to the input of the startup instruction by the user, the controller 11 starts up the remote application 215 (Step S12).

In accordance with the startup of the remote application 215, the controller 11 reads the termination determination program and starts counting the termination determination time (Step S14). When it is determined that the termination determination time has elapsed after the startup of the remote application 215, the controller 11 performs a termination control on the remote application 215 (Step S14→Step S16).

Then, the controller 11 logs out the logged in user (Step S18).

Conversely, when it is determined that the termination determination time has not elapsed after the startup of the remote application 215, the controller 11 proceeds to the process at Step S20 (Step S14→Step S20).

The controller 11 sends a request to the network service 50 to acquire the connection information for the network service 50, such as a session key (Step S20).

In response to the request to acquire the connection information, the network service 50 generates the session key needed for communication and sends the connection information such as the session key to the multifunction peripheral 10. After acquiring the connection information from the network service 50 (Step S22), the multifunction peripheral 10 displays, on the display 13, the encoded information (e.g., QR Code) including the apparatus information while maintaining the connection with the network service 50 by HTTPS long polling (Step S24).

The user sets a document in the multifunction peripheral 10 and inputs the startup instruction for the job application 413 in the terminal device 30. The terminal device 30 receives the startup instruction for the job application 413 from the user (Step S26). The terminal device 30 starts up the job application in response to the startup instruction for the job application (Step S28). Specifically, the controller 31 reads the apparatus information acquisition program 4131 and the setting information generation program 4133 to start up the job application 413.

The user selects the job to be executed by the multifunction peripheral 10 via the user interface displayed on the display 33 and inputs and selects the setting values for the selected job (Step S30).

The terminal device 30 receives the setting value for which the input instruction has been received and stores the setting value in the setting value storage area 417 (Step S32).

The user selects a start key. The controller 31 of the terminal device 30 receives a selection instruction input of the start key (Step S34).

The controller 31 of the terminal device 30 acquires the encoded information (e.g., QR Code) including the apparatus information displayed on the display 13 of the multifunction peripheral 10 (Step S36).

The terminal device 30 generates the setting information from various setting values stored in the setting value storage area 417 and sends the setting information together with the identification information on the multifunction peripheral 10 extracted from the apparatus information included in the encoded information acquired at Step S36 to the network service 50 (Step S38).

The network service 50 associates the identification information with the setting information on the multifunction peripheral 10 sent from the terminal device 30, then adds the job ID, and stores them as a job in the job storage area 595 (Step S40).

The multifunction peripheral 10 makes an inquiry to the network service 50 as to whether the job corresponding to the identification information on the multifunction peripheral 10 is present (Step S42).

When the job corresponding to the identification information on the multifunction peripheral 10 is present, the network service 50 sends the job to the multifunction peripheral 10 (Step S44).

The multifunction peripheral 10 executes the received job (Step S46). Then, the process returns to Step S14.

During the process in FIG. 9, the communication is preferably connected while the remote application 215 has started up and the multifunction peripheral 10 is connected. For example, it is preferable to maintain the connection by HTTPS long polling or to maintain the communication at a predetermined time interval (e.g., maintain the communication between terminals by Ping, etc.). This allows the terminal device 30 to send the instruction, which is input by the operation, to the multifunction peripheral 10 via the network service 50 at any time during the remote operation.

According to the present embodiment, the termination determination time may be set by the terminal device 30. When the termination determination time has elapsed, the terminal device 30 automatically terminates the communication with the network service 50. In this case, the connection between the multifunction peripheral 10 and the terminal device 30 is forcibly disconnected.

This allows the user to automatically terminate the remote application without, for example, touching a termination button of the remote application displayed on the multifunction peripheral 10. Thus, the user may terminate the remote application without touching the multifunction peripheral 10.

Here, the termination determination time is preferably set from 30 seconds to 240 seconds, for example. For example, when the termination determination time is set to a short time such as 10 seconds, the remote application is terminated immediately after its start, which is not user-friendly.

The process flow described above will be described below with reference to a flowchart for each apparatus.

1.3.2 Regarding Process of Multifunction Peripheral 10

A process of the multifunction peripheral 10 will be described with reference to the flowchart in FIG. 10. When an instruction input for power-on, an instruction input for recovery from a sleep mode, or an instruction input for auto clear is received, the controller 11 of the multifunction peripheral 10 executes an apparatus initialization process (Step S110→Step S120). The auto clear is a process performed to cancel the job itself or cancel the input or selection of the setting value. Typically, the multifunction peripheral 10 may execute the auto clear process when a selection button (e.g., "auto clear button") provided on the display screen is selected.

Here, the apparatus initialization process refers to, for example, the temperature control, or the like, of a fusing device to enable print output by the image former 171 when the input instruction is an instruction input for power-on or an instruction input for recovery from the sleep mode, or the process to reset the changed setting value to the initial value and obtain the state where the multifunction peripheral 10 may be used in the initial state when the input instruction is auto clear.

After the apparatus initialization process ends, the controller 11 displays the login screen. Then, the controller 11 determines whether login authentication has been performed by the user via the login screen (Step S130).

When it is determined that login authentication has been performed and has succeeded, the controller 11 displays the home screen (Step S130; Yes→Step S140).

Conversely, when it is determined that login authentication has not been performed (the login authentication function is disabled) or login authentication has been performed but failed, the controller 11 determines whether an operation for job execution has been detected (Step S130; No→Step S150). The operation for job execution refers to, for example, a preparatory operation performed by the user to execute the job such as copy or scan, e.g., setting a document on a document bed of the multifunction peripheral 10. For example, when a document is set on the document bed, the controller 11 may detect the document by using an optical or mechanical detector to determine that the operation for job execution has been performed.

When it is determined that the operation for job execution has been input, the controller 11 proceeds to the process at Step S170 (Step S150; Yes→Step S170). Conversely, when it is determined that no operation for job execution has been input, the controller 11 may determine that an operation other than the operation for job execution has been performed or may continuously terminate the process (Step S150; No).

At Step S140, after the home screen is displayed, the controller 11 determines whether the startup instruction for the remote application 215 has been input (Step S140→Step S160). The controller 11 may detect whether the user has selected a startup instruction input button for the remote application 215 displayed on the home screen to determine whether the startup instruction for the remote application 215 has been input.

When it is determined that the startup instruction for the remote application 215 has been input, the controller 11 starts up the remote application 215 (Step S160; Yes→Step S170). When it is determined that the startup instruction for the remote application 215 has not been input, the controller 11 continuously displays the home screen (Step S160; No→Step S140).

The controller 11 reads the termination determination program 2155 to determine whether the termination determination time has elapsed after the startup of the remote application 215 (Step S180). Here, when it is determined that the termination determination time has elapsed, the controller 11 performs the termination control on the remote application 215 (Step S180; Yes→Step S190). The termination control on the remote application 215 includes freeing of the apparatus information generation program 2151, the setting information acquisition program 2153, and the termination determination program 2155, which have been read, from the working memory and the disconnection from the network service 50 via HTTPS long polling. In this case, the controller 11 may free the program after disconnection from the network service 50 or conversely disconnect from the network service 50 after freeing the program.

Then, when the logged in user is present, the controller 11 performs a logout process (Step S200) and terminates the process.

Conversely, when it is determined that the termination determination time has not elapsed after the startup of the remote application 215, the controller 11 sends a request to the network service 50 to acquire the connection information, such as the session key, for the network service 50 (Step S180; No→Step S210).

Then, the controller 11 determines whether the connection information has been acquired from the network service 50 (Step S220). When it is determined that the connection information has been acquired, the controller 11 generates the apparatus information and displays, on the display 13, the generated apparatus information as the encoded information that is encoded by one or more of a two-dimensional code (Quick Response (QR) Code), a one-dimensional code (bar code), a symbol, and an alphanumeric character (Step S220; Yes→Step S230). When it is determined that the connection information has not been acquired, the controller 11 waits until the connection information is acquired (Step S220; No). When the setting information is not acquired for a certain period of time and a logged-in user is present, the controller 11 may automatically perform a logout process. Thus, automatic logout may prevent unauthorized use when an unattended state such as a non operating state continues while user authentication is enabled.

The controller 11 determines whether the job has been acquired from the network service 50 (Step S240). When the job is acquired from the network service 50, the controller 11 executes the acquired job (Step S240; Yes→Step S250). Conversely, when it is determined that no job has been acquired, the controller continuously displays the encoded information (Step S240; No→Step S230).

At Step S250, the controller 11 returns to the process at Step S180 after the job is executed.

Figure 10:
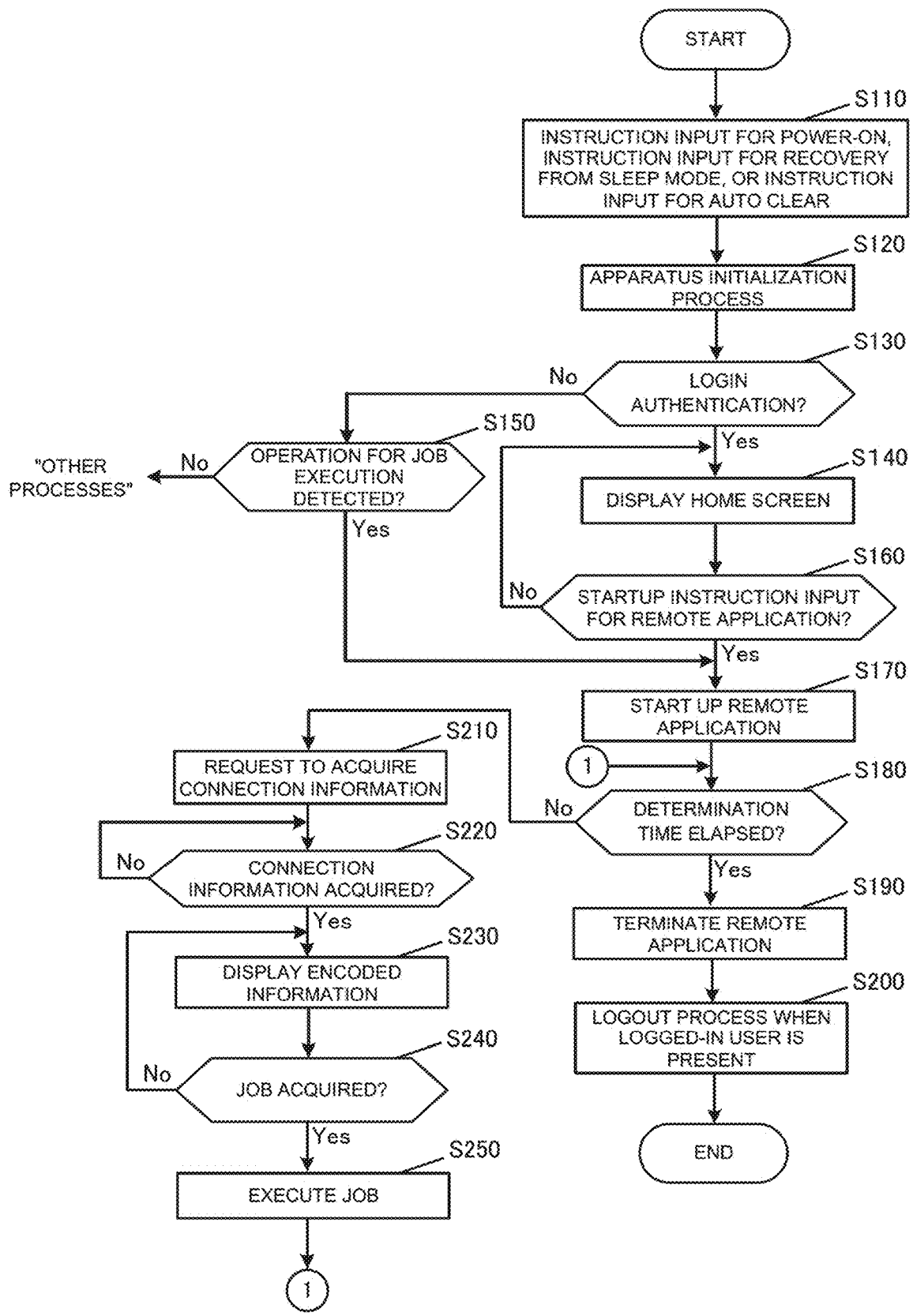
FIG. 10 is a flowchart illustrating a process of the multifunction peripheral according to the first embodiment.

In the configuration illustrated in FIG. 10, the process is performed to determine the termination determination time at Step S180 when the process from Steps S210 to S250 ends. However, it is possible that the remote application 215 has started up and the termination determination time has elapsed in the middle of the progress of the process from Steps S210 to Step S250. In this case, the controller 11 may be configured to terminate the remote application (Step S190) when the termination determination time has elapsed and perform the logout process (Step S200) or may terminate the remote application (Step S190) and perform the logout process (Step S200) after the process from Steps S210 to S250 is completed.

1.3.3 Regarding Process of Terminal Device 30

Next, a process of the terminal device 30 will be described with reference to the flowchart in FIG. 11. The controller 31 of the terminal device 30 determines whether the startup instruction for the job application 413 has been received from the user (Step S300). The controller 31 may detect whether the user has selected the startup instruction input button for the job application 413 displayed on the display 33 of the terminal device 30 to determine whether the startup instruction for the job application 413 has been received.

When it is determined that the startup instruction for the job application has been received, the controller 31 reads the display processing program 411 to display an application screen as a user interface on the display 33 (Step S300; Yes→Step S310).

Subsequently, the controller 31 determines whether the user has selected a copy job via the application screen (Step S320). When it is determined that the user has selected the copy job, the controller 31 displays a copy job execution screen on the display 33 (Step S320; Yes→Step S330). Conversely, when it is determined that the user has not selected the copy job, the controller 31 displays a scan job execution screen on the display 33 (Step S320; No→Step S340).

The controller 31 receives the input of the setting value via either the copy job execution screen displayed at Step S330 or the scan job execution screen displayed at Step S340 (Step S350). Then, the controller 31 stores the received setting value in the setting value storage area 417 (Step S360).

The controller 31 determines whether the user has selected the "start button" (Step S370). When it is determined that the user has selected the "start button", the controller 31 controls the apparatus information acquirer 37 to acquire the encoded information including the apparatus information from the multifunction peripheral 10 (Step S370; Yes→Step S380). The controller 31 decodes the encoded information displayed on the display 13 of the multifunction peripheral 10 to acquire the apparatus information based on the read apparatus information acquisition program 4131 in accordance with the startup instruction input of the job application 413.

Subsequently, the controller 31 generates the setting information from the various setting values stored in the setting value storage area 417 based on the read setting information generation program 4133 in accordance with the startup instruction input of the job application 413 (Step S390). Then, the controller 31 sends the generated setting information together with the identification information extracted from the apparatus information on the multifunction peripheral 10 to the network service 50 and terminates the process (Step S400).

1.3.4 Regarding Process of Network Service 50

Next, a process of the network service 50 will be described with reference to the flowchart in FIG. 12. The controller 51 of the network service 50 determines whether the request to acquire the connection information, such as session key, for the network service 50 has been received from the multifunction peripheral 10 (Step S500).

When it is determined that the request to acquire the connection information has been received from the multifunction peripheral 10, the controller 51 sends the connection information to the multifunction peripheral 10 (Step S500; Yes→Step S510). Conversely, when it is determined that no request to acquire the connection information has been received from the multifunction peripheral 10, the controller 51 waits until the acquisition request is received (Step S500; No).

Subsequently, the controller 51 determines whether the identification information and the setting information have been acquired from the terminal device 30 (Step S520).

When it is determined that the identification information and the setting information have been acquired from the terminal device 30, the controller 51 associates the identification information with the setting information, then adds the job ID, and stores them in the job storage area 595 as a job (Step S520; Yes→Step S530).

Subsequently, the controller 51 determines whether the job acquisition request has been received from the multifunction peripheral 10 (Step S540). When it is determined that the job acquisition request has been received from the multifunction peripheral 10, the controller 51 determines whether the job corresponding to the identification information on the multifunction peripheral 10, from which the acquisition request has been received, is stored (Step S540; Yes→Step S550). In this case, the controller 51 searches for the job ID added to the identification information (device ID) on the multifunction peripheral 10. When the job ID is associated with the setting information, the controller 51 determines that the job corresponding to the identification information on the multifunction peripheral 10 is stored.

When the job corresponding to the identification information is stored, the controller 51 reads the job sending program 593, sends the job to the multifunction peripheral 10 (Step S560), and terminates the process.

The controller 51 may also be configured as a push type that, when it is determined at Step S520 that the identification information and the setting information have been acquired from the terminal device 30, directly sends the job corresponding to the identification information to the multifunction peripheral 10 without waiting for the job acquisition request from the multifunction peripheral 10.

1.4 Operation Example

Figure 13A:
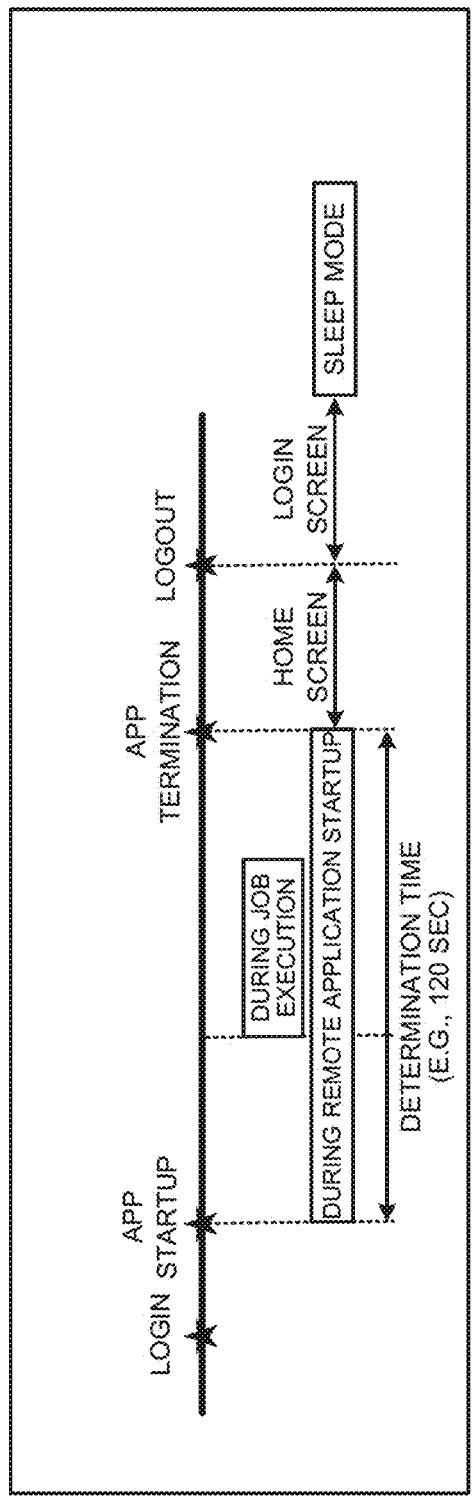
FIGS. 13A and 13B are a diagram illustrating an operation example according to the first embodiment.
Figure 13B:
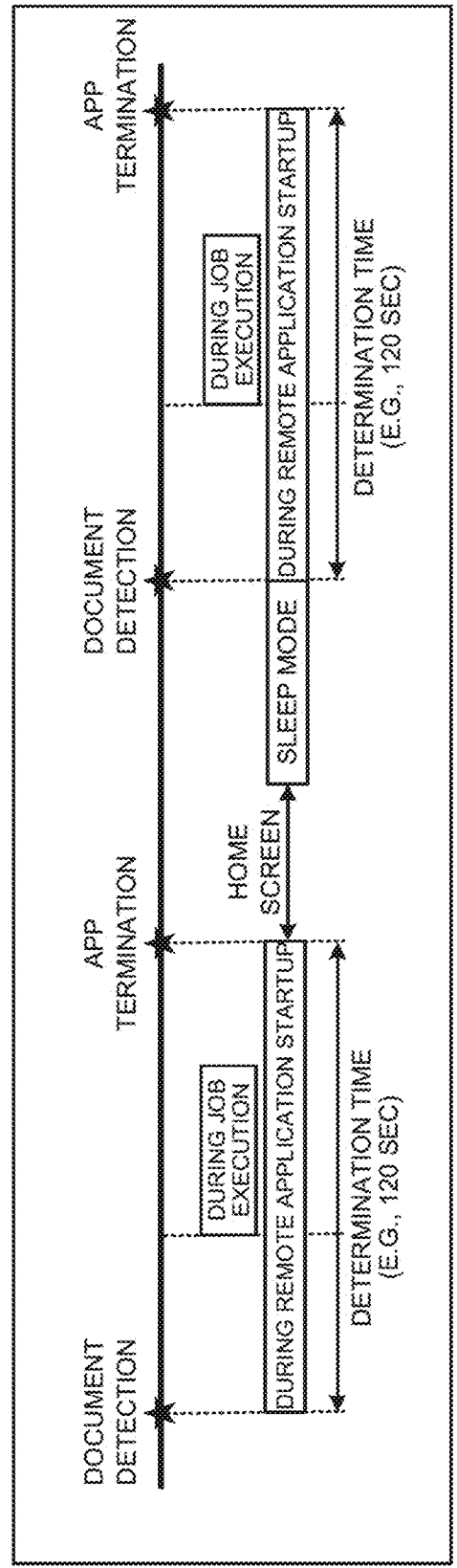

Next, an operation example according to the first embodiment will be described. FIGS. 13A and 13B are a diagram schematically illustrating the flow of an operation according to the first embodiment as a timeline. Here, FIG. 13A illustrates the timeline of the multifunction peripheral 10 when the user authentication function is enabled, and FIG. 13B illustrates the timeline of the multifunction peripheral 10 when the user authentication function is disabled.

When user authentication is enabled as illustrated in FIG. 13A, the remote application 215 is started up in response to the startup instruction input from the user after login authentication. Remote job execution is possible only when the remote application 215 has started up. Then, for example, when the termination determination time (e.g., 120 seconds) has elapsed after the startup of the remote application 215, the controller 11 terminates the remote application 215.

After the remote application 215 is terminated, the controller 11 displays the home screen. When the preset automatic logout time has elapsed after the display of the home screen, the controller 11 logs out the user and displays the login screen to receive login authentication.

When a non operating state continues for a predetermined time after the login screen is displayed, the multifunction peripheral 10 shifts to, for example, a preheating or auto power shutoff mode (sleep mode) in accordance with a preheating mode setting or auto power shutoff setting.

Conversely, in a case where user authentication is disabled (when the user authentication function is disabled or user authentication fails) illustrated in FIG. 13B, for example, when a preparatory operation for job execution such as copy or scan, e.g., setting of a document on the document bed, is detected, the controller 11 starts up the remote application 215. Then, for example, when the termination determination time (e.g., 120 seconds) has elapsed after the startup of the remote application 215, the controller 11 terminates the remote application 215.

After the remote application 215 is terminated, the controller 11 displays the home screen. When the non-operating state continues for a predetermined time after the home screen is displayed, the multifunction peripheral 10 shifts the preheating or auto power shutoff mode (sleep mode). Then, when a new preparatory operation for job execution, such as copy or scan, is detected, the controller 11 starts up the remote application 215.

As illustrated in FIGS. 13A and 13B, the controller 11 terminates the remote application 215 when the termination determination time has elapsed after the startup of the remote application 215. Then, as illustrated in FIG. 13A, when the preset automatic logout time has elapsed after the display of the home screen while user authentication is enabled, the controller 11 logs out the user and displays the login screen to receive login authentication. This configuration prevents users other than the logged-in user from operating the multifunction peripheral 10 so that impersonation by other users may be prevented.

Figure 14:
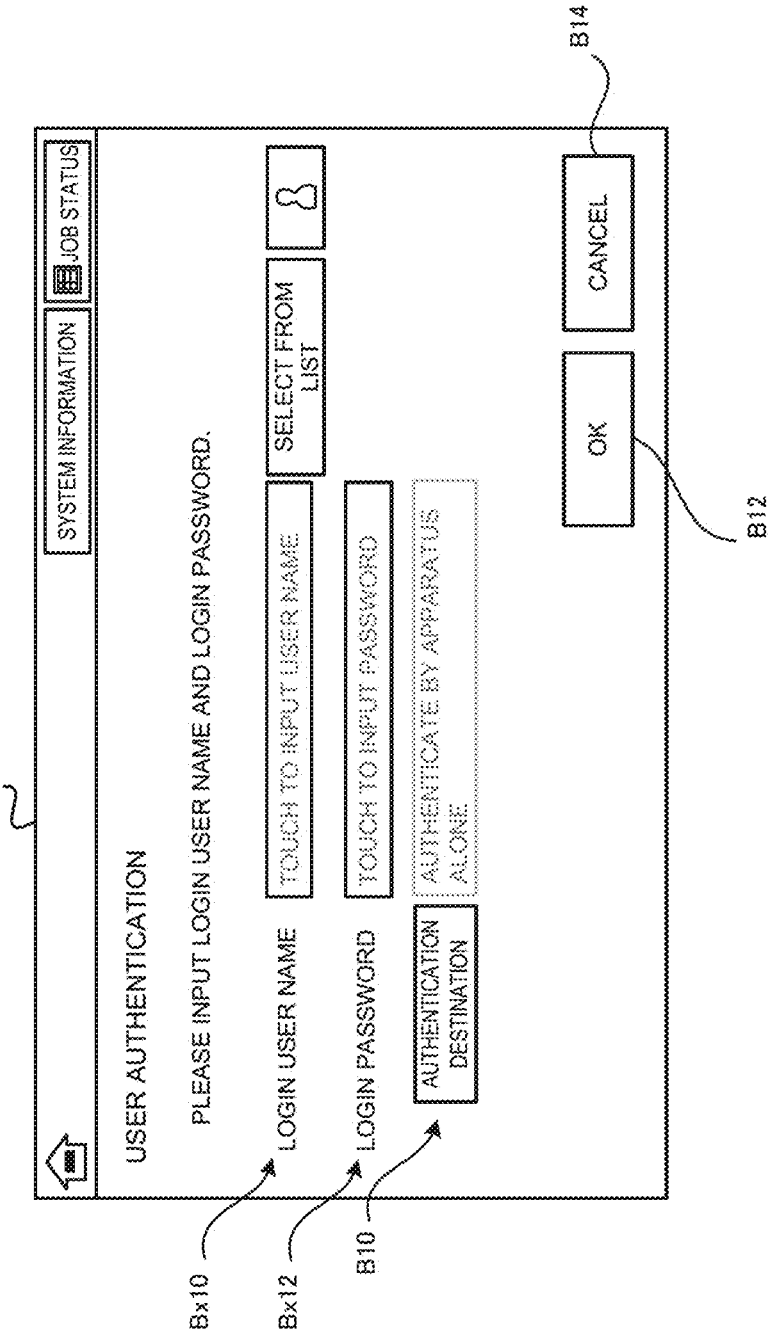
FIG. 14 is a diagram illustrating an operation example according to the first embodiment.

FIG. 14 is a diagram illustrating a configuration example of the login screen displayed by the controller 11. This operation is an operation example corresponding to Step S130 in FIG. 10.

A login screen W10 includes a login user name input box Bx10, a login password input box Bx12, an authentication destination selection button B10, an OK button B12, and a cancel button B14.

The login user name input box Bx10 is an input box to receive the input of a login user name of a logged-in user who attempts to log in to the multifunction peripheral 10.

The login password input box Bx12 is an input box that receives the input of a login password associated with the login user name of the logged in user who attempts to log in to the multifunction peripheral 10.

The authentication destination selection button B10 is a button that receives the selection of the authentication destination of the logged-in user. FIG. 14 illustrates an example in which a machine (the multifunction peripheral 10) alone is selected as the authentication destination of the logged-in user. When the logged-in user is managed by the other device, such as a management server, via a network (NW), it is possible to select the name of the other device or the positional information (e.g., IP address) of the other device on the network.

The OK button B12 is a button that receives a login authentication operation by the logged-in user. The cancel button B14 is a button that receives cancellation of the login authentication operation by the logged-in user.

Figure 15:
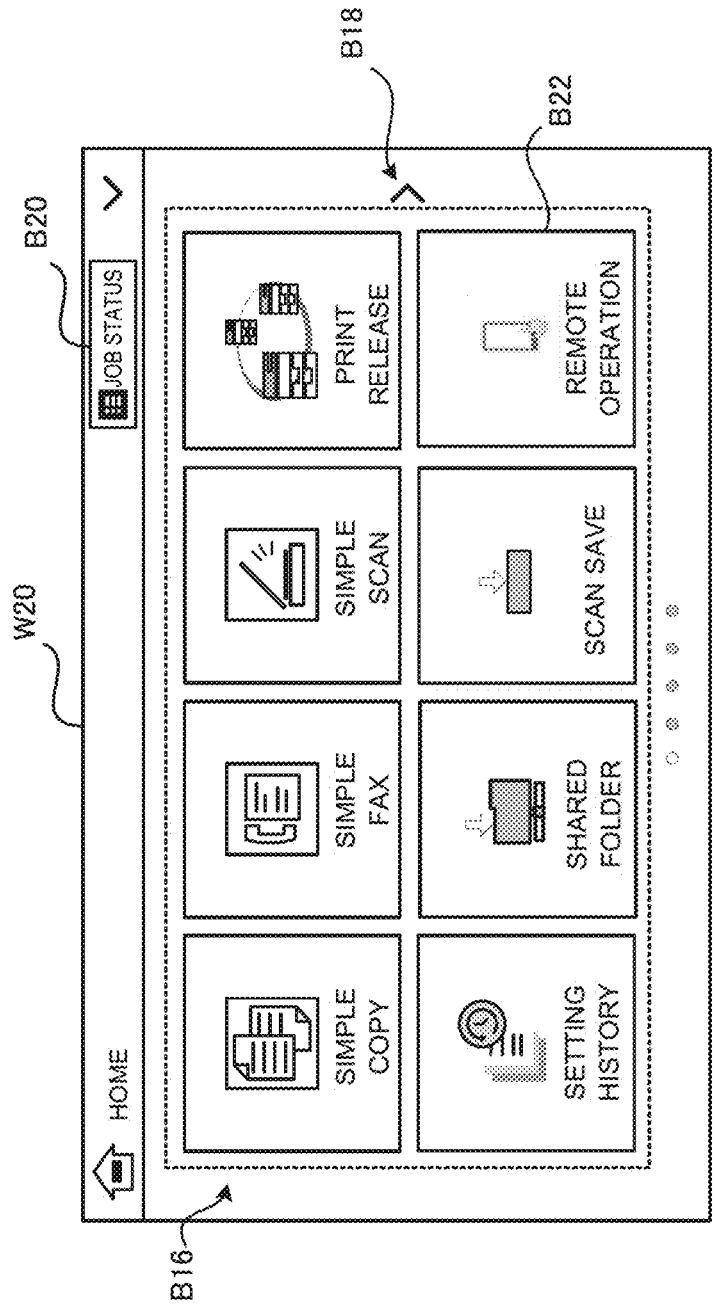
FIG. 15 is a diagram illustrating an operation example according to the first embodiment.

FIG. 15 is a diagram illustrating a configuration example of a home screen W20 displayed by the controller 11. This operation example corresponds to the process at Step S140 in FIG. 10. The home screen W20 is a basic screen that receives, for example, the selection of a job by the user and the selection of various function displays. The home screen W20 includes job/function selection buttons B16, a display forward button B18, and a job status button B20.

The job/function selection buttons B16 receive the selection of the job or function display, or the like, desired by the user. For example, when the user selects a "simple copy" button of the job/function selection buttons B16, the controller 11 displays a job execution screen (not illustrated) for setting the "simple copy". The job/function selection buttons B16 according to the first embodiment include a remote operation button B22 to shift the screen to a display screen W30 described with reference to the subsequent figure. When the user selects the remote operation button B22, the controller 11 starts up the remote application 215 and shifts the screen display to the display screen W30 to enable use of the output method according to the present disclosure. The display configuration example of the job/function selection buttons B16 in FIG. 15 is merely an example, and a hidden job/function display button may be displayed by selecting the display forward button B18.

The job status button B20 receives a notification instruction input for the progress status, reservation status, and the like, of the job that is being executed by the multifunction peripheral 10. When the user selects the job status button B20, the controller 11 displays the progress status, reservation status, and the like, of the job.

Figure 16:
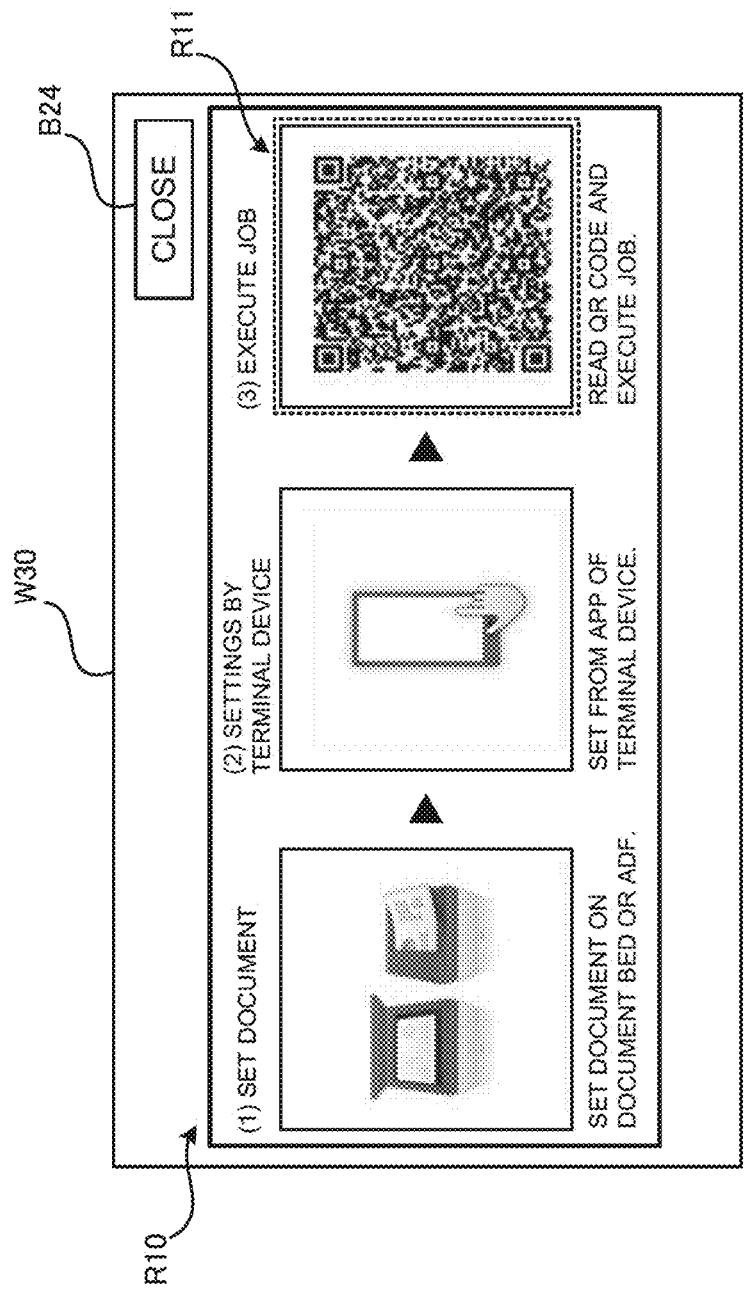
FIG. 16 is a diagram illustrating an operation example according to the first embodiment.

FIG. 16 illustrates a configuration example of the display screen W30 displayed by the controller 11. This operation example corresponds to the process at Step S230 in FIG. 10, and the display screen W30 is displayed when the remote application 215 is started up and the connection information is acquired from the network service 50.

The display screen W30 includes an operation procedure display area R10 and a close button B24. The operation procedure display area R10 is an area for explaining the operation procedure of the output method according to the first embodiment through illustrations or animations. In the example illustrated in FIG. 16, the operation procedure is explained in the following order: (1) set the document, (2) settings with the terminal device, and (3) execute the job.

The operation procedure display area R10 includes an encoded information display area R11 that displays the encoded information including the apparatus information on the multifunction peripheral 10. In the example described according to the first embodiment, a two-dimensional code (e.g., Quick Response (QR) Code, Data Matrix, or Veri-Code) is used as the encoded information including the apparatus information. The QR Code (registered trademark) is a two-dimensional code representing data in a graphical form. In addition to the QR Code, the information encoded using one or more of a barcode, a symbol, and an alphanumeric character may also be used as the apparatus information.

The terminal device 30 may read the QR Code with an imaging device such as a camera or a scanning device using a laser light to execute the job.

The close button B24 is a button that receives selection when the user desires the execution of the job via the normal home screen without using the output method according to the present disclosure. When the close button B24 is selected, the controller 11 displays the home screen W20 on the display 13 and receives the input of an execution instruction, and the like, of the job via the home screen W20.

Figure 17:
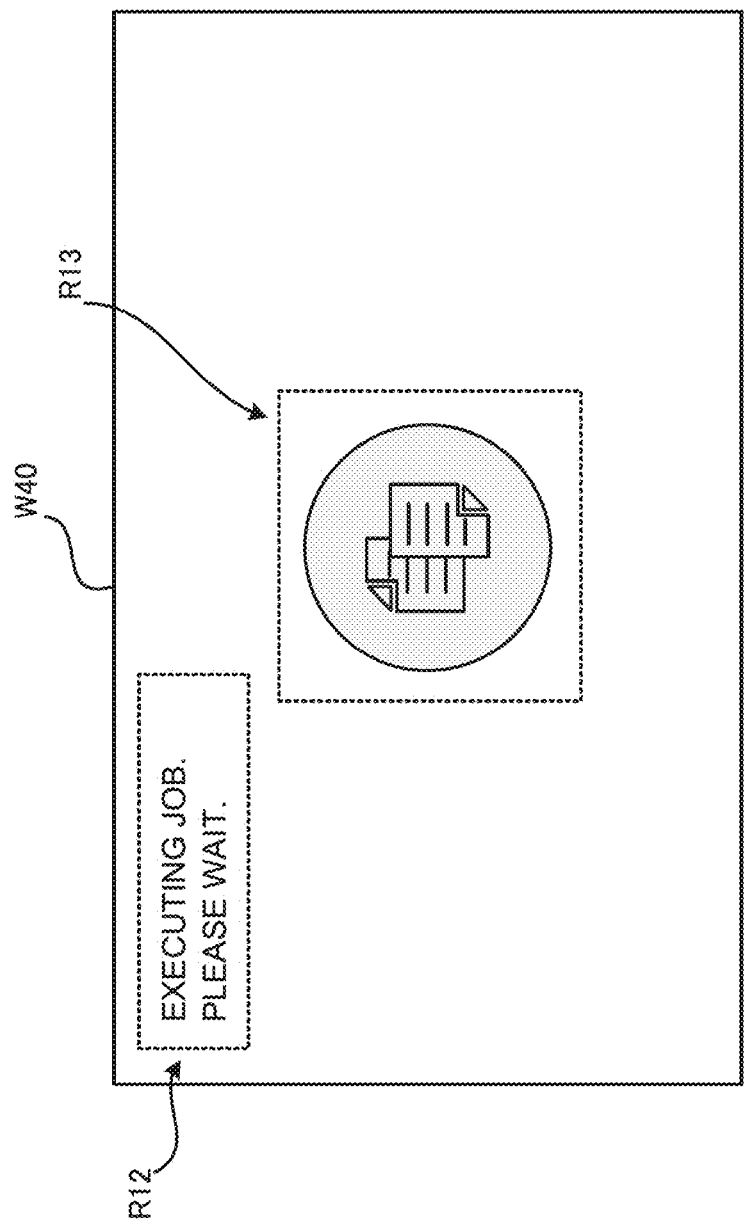
FIG. 17 is a diagram illustrating an operation example according to the first embodiment.

FIG. 17 illustrates a configuration example of an execution screen displayed on the display 13 when the multifunction peripheral 10 is executing the job based on the setting information after receiving the setting information from the network service 50. This operation example corresponds to the process at Step S250 of FIG. 10. An execution screen W40 includes a message display area R12 indicating that the job is being executed and an executed job display area R13 displaying the type of job being executed (copy job in the example of FIG. 17) by an illustration or animation.

Figure 18:
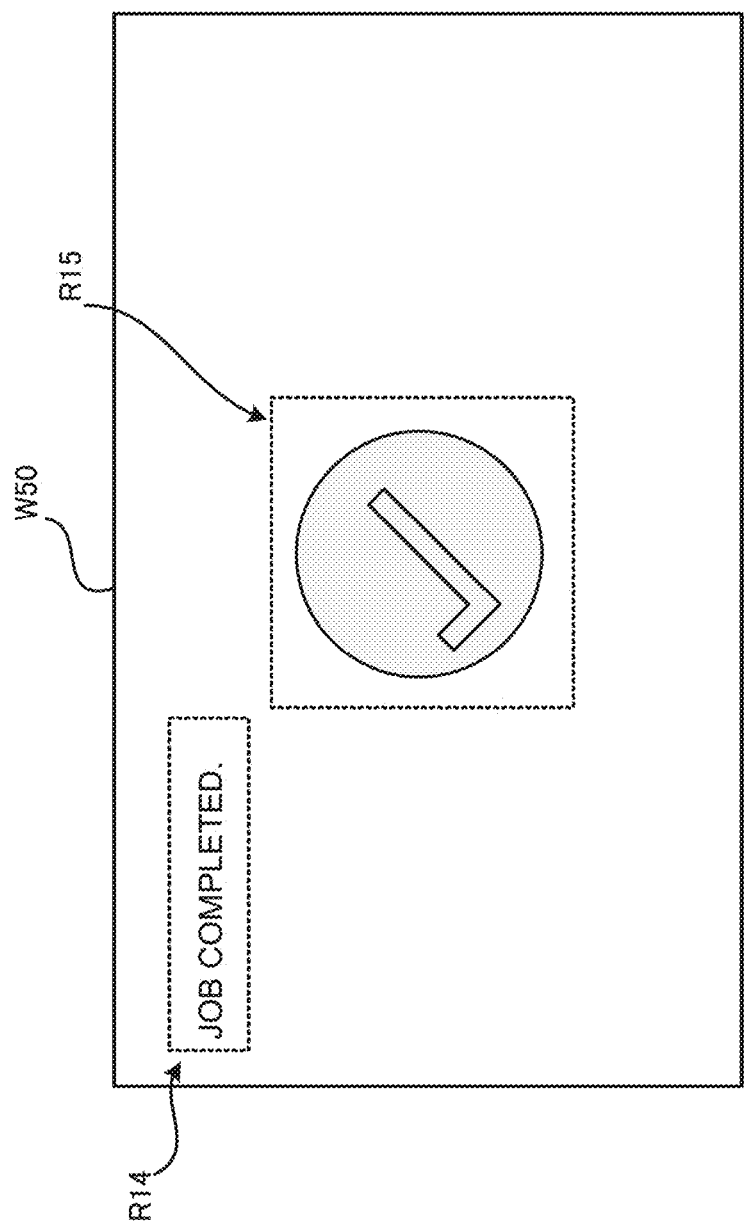
FIG. 18 is a diagram illustrating an operation example according to the first embodiment.

FIG. 18 illustrates a configuration example of a completion screen displayed on the display 13 when the multifunction peripheral 10 has completed the job. This operation example corresponds to the process after Step S250 in FIG. 10. A completion screen W50 includes a message display area R14 indicating that the job has been completed and a completed job display area R15 displaying the completion of the job by an illustration or animation.

Figure 19:
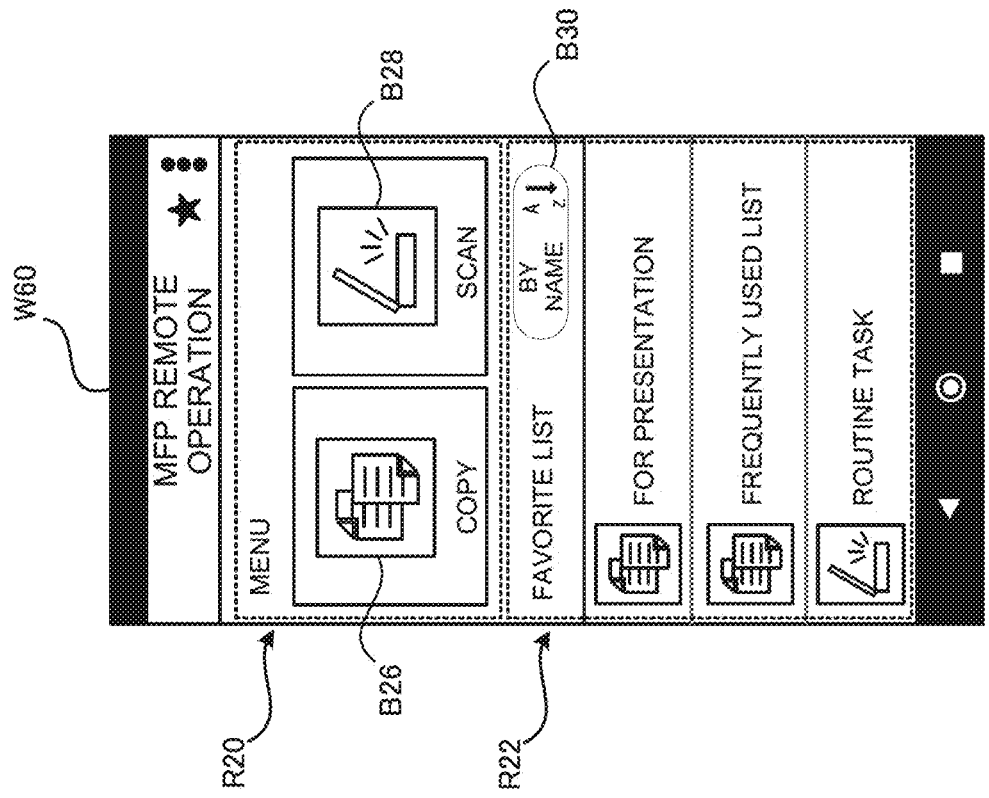
FIG. 19 is a diagram illustrating an operation example according to the first embodiment.

FIG. 19 illustrates a configuration example of an application screen displayed on the display 33 by the controller 31 of the terminal device 30 after receiving the startup instruction of the job application 413 from the user. This operation example corresponds to the process from Step S300 to S310 in FIG. 11. An application screen W60 includes a menu display area R20 and a favorite list display area R22.

The menu display area R20 includes a copy job selection button B26 and a scan job selection button B28. The copy job selection button B26 receives the selection of the copy job from the user. When the selection of the copy job selection button B26 is received, the controller 31 may determine that the copy job has been selected by the user. When the selection of the copy job selection button B26 is received, the controller 31 displays the copy job execution screen on the display 33.

Conversely, the scan job selection button B28 receives the selection of the scan job from the user. When the selection of the scan job selection button B28 is received, the controller 31 may determine that the scan job has been selected by the user. When the selection of the scan job selection button B28 is received, the controller 31 displays the scan job execution screen on the display 33.

The favorite list display area R22 displays items frequently used by the user in a list format. The display of the ascending and descending order of the favorite list may be switched by a sort button B30.

Figure 20:
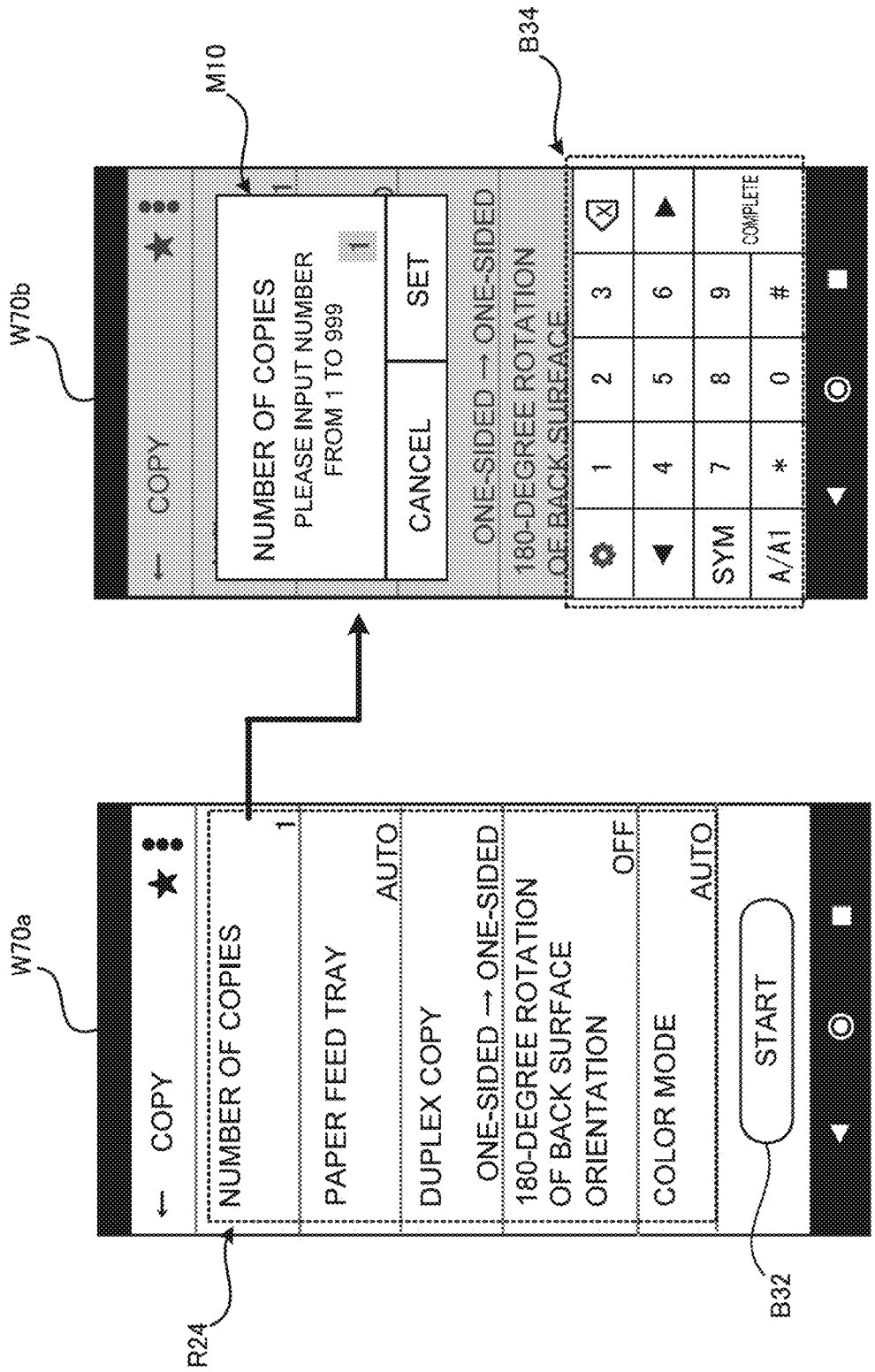
FIG. 20 is a diagram illustrating an operation example according to the first embodiment.

FIG. 20 illustrates a configuration example of the copy job execution screen displayed on the display 33 when the copy job is selected by the user. This operation example corresponds to the process at Step S330, and the like, in FIG. 11. A copy job execution screen W70a includes a setting value setting area R24 and a start button B32.

The setting value setting area R24 receives the input and selection of the setting values for job execution. The setting value may be input and selected for each setting item regarding the copy job, for example, "number of copies", "paper feed tray", "duplex copy", "180-degree rotation of back surface orientation", and "color mode".

For example, a copy job execution screen W70b is a configuration example of a number-of-copies setting screen that is displayed when the setting value of "number of copies" is selected by a tap operation, etc. The copy job execution screen W70b includes a modal M10 that receives the input of the setting value of the number of copies and setting value input buttons B34.

As illustrated in FIG. 20, when the modal M10 is displayed, the controller 31 grays out the other setting values to put restrictions so as not to input the setting values. The user inputs the number of copies by using the setting value input buttons B34. After inputting the predetermined number of copies, a "set" button is selected so that the setting value regarding the number of copies may be confirmed. When the "set" or "cancel" button is selected, the screen returns to the copy job execution screen W70a.

Figure 21:
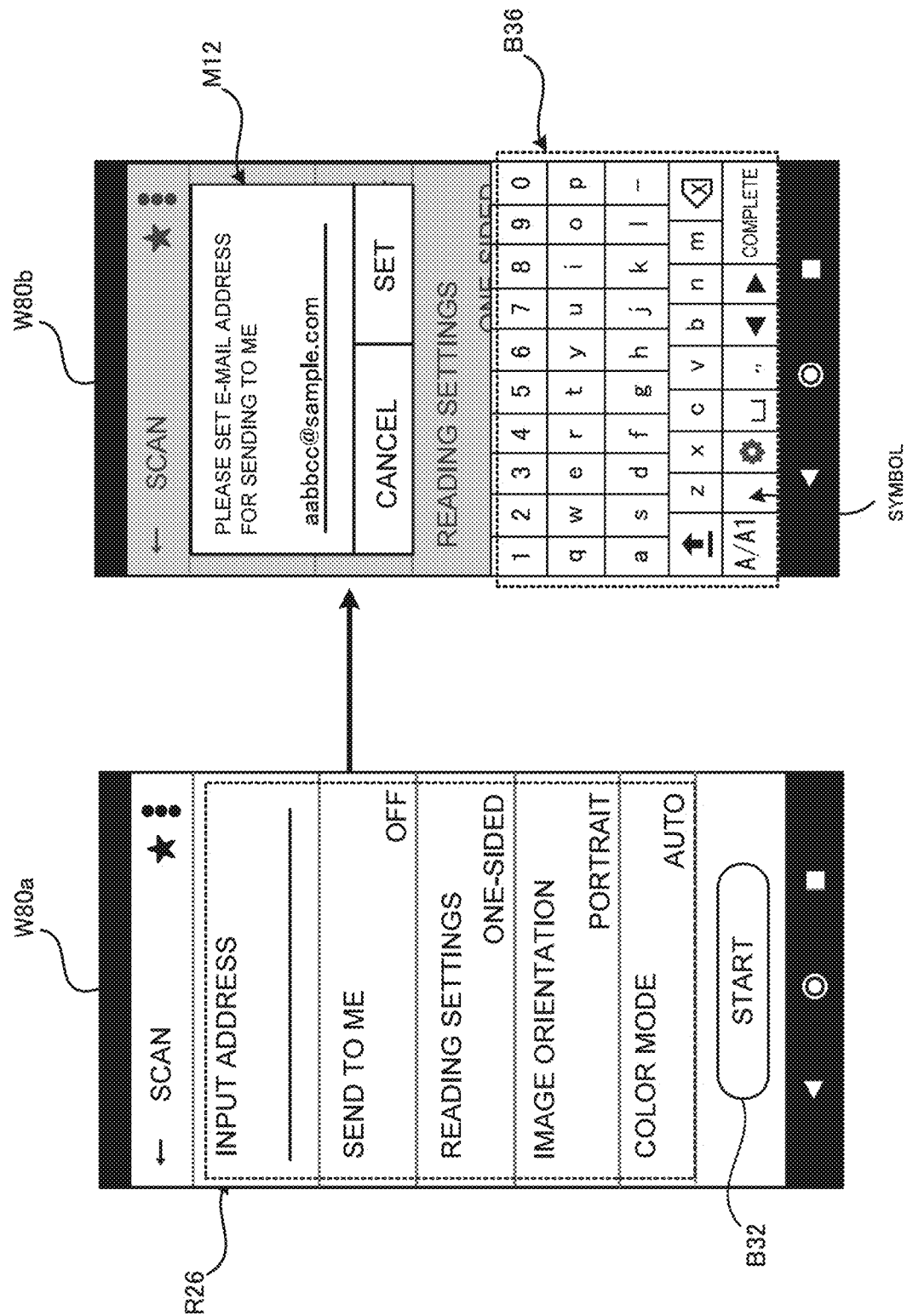
FIG. 21 is a diagram illustrating an operation example according to the first embodiment.

FIG. 21 illustrates a configuration example of the scan job execution screen displayed on the display 33 when the user selects the scan job. This operation example corresponds to the process at Step S340, and the like, in FIG. 11. A scan job execution screen W80a includes a setting value setting area R26 and the start button B32.

The setting value setting area R26 receives the input and selection of the setting values for job execution. The setting value may be input and selected for each setting value regarding the scan job, such as "enter address", "send to me", "reading settings", "image orientation", and "color mode".

For example, a scan job execution screen W80b is a configuration example of a destination setting screen for sending to me that is displayed when the setting value of "send to me" is selected as the setting value by a tap operation, or the like. The scan job execution screen W80b includes a modal M12 that receives the input of the setting value for sending to me and setting value input buttons B36.

As illustrated in FIG. 21, when the modal M12 is displayed, the controller 31 grays out the other setting values and puts a restriction so as not to input the setting values. The user uses the setting value input buttons B36 to input the sending destination for sending to me. After inputting the predetermined sending destination, the "set" button is selected so that the setting values for the sending destination may be confirmed. When the "set" or "cancel" button is selected, the screen returns to the scan job execution screen W80a.

Figure 22:
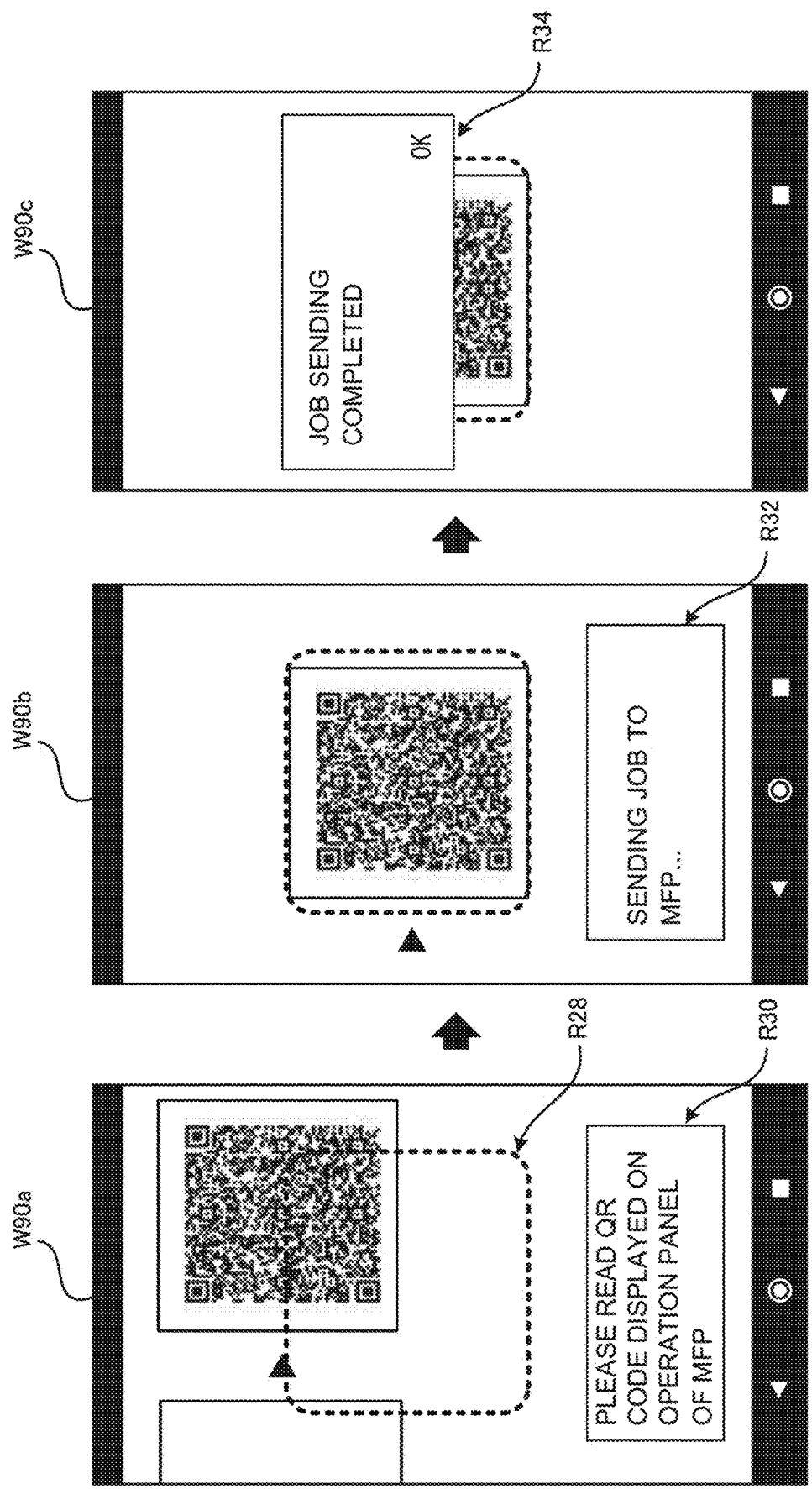
FIG. 22 is a diagram illustrating an operation example according to the first embodiment.

FIG. 22 illustrates a configuration example of an encoded information acquisition screen displayed by the controller 31 when the start button B32 on the copy job execution screen W70a in FIG. 20 or the scan job execution screen W80a in FIG. 21 has been selected and the apparatus information displayed on the multifunction peripheral 10 is to be acquired. An encoded information acquisition screen W90a includes an encoded information acquisition area R28 and a status display area R30.

As illustrated in FIG. 22, the encoded information acquisition area R28 may be configured as a guideline to guide the user such that the encoded information to be acquired falls within a reading area of the imaging device or the scanning device when the encoded information is encoded information such as a QR Code. The user operates the terminal device 30 such that the encoded information such as a QR Code falls within the encoded information acquisition area R28. When the encoded information is acquired, the controller 31 shifts the encoded information acquisition screen W90a to an encoded information acquisition screen W90b.

The status display area R30 is an area that displays the operation or the progress status (status) of the job to the user. The status display area R30 of the encoded information acquisition screen W90a is an example displaying the message to cause the QR Code to fall within the encoded information acquisition area R28 and read the QR Code.

When the encoded information such as QR Code is read, the encoded information acquisition screen W90b displays a message in a status display area R32 that the job (setting information) is being sent to the multifunction peripheral 10.

When the sending of the job to the multifunction peripheral 10 is completed, the controller 31 shifts the display screen to an encoded information acquisition screen W90c. In the encoded information acquisition screen W90c, a status display area R34 displays the completion of job sending.

Figure 23:
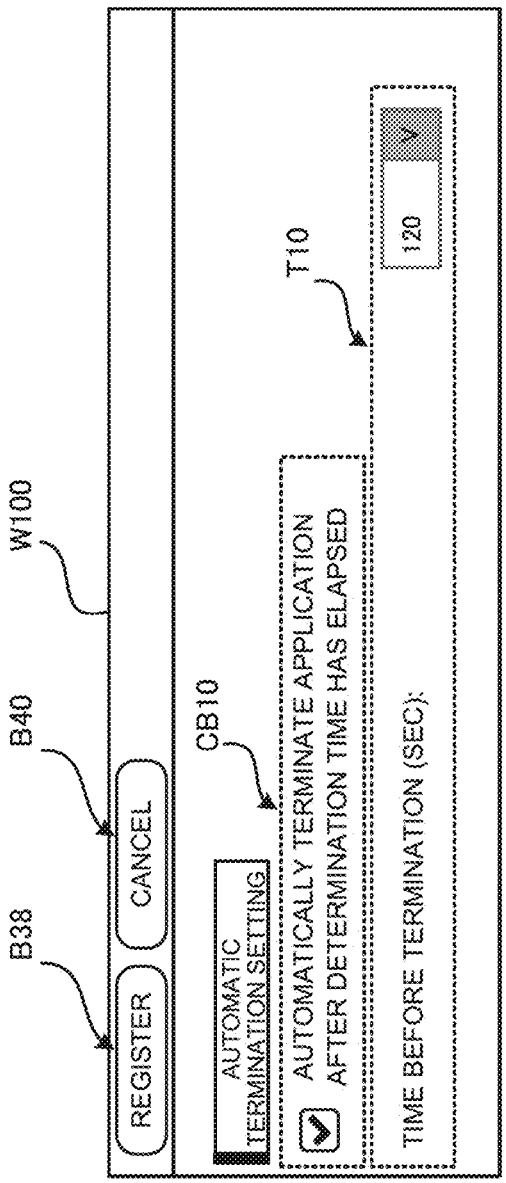
FIG. 23 is a diagram illustrating an operation example according to the first embodiment.

FIG. 23 is a diagram illustrating a configuration example of a termination determination value setting screen W100. The termination determination value setting screen W100 may be displayed, for example, via a system setting screen. Here, the system setting screen is a setting screen that receives the input settings for apparatus settings (e.g., operating condition, environmental condition, and authenticated user registration) of the multifunction peripheral 10 and is typically a setting screen managed by the user (administrative user) having an administrative authority.

The termination determination value setting screen W100 includes an application termination setting checkbox CB10, a termination time setting tab T10, a registration button B38, and a cancel button B40.

The application termination setting checkbox CB10 is a checkbox for setting whether the remote application 215 is automatically terminated. When the application termination setting checkbox CB10 is checked, the automatic termination setting of the remote application 215 is enabled.

The termination time setting tab T10 is a pull-down tab that receives the setting of the determination time before the remote application 215 is terminated. The user may select the termination determination time by the pull-down tab and may also directly input and set any determination time.

The registration button B38 receives the registration of the input values to the application termination setting checkbox CB10 and the termination time setting tab T10. By selecting the registration button B38, the values input to the application termination setting checkbox CB10 and the termination time setting tab T10 are registered in the termination determination value management table. The cancel button B40 receives the cancellation of the input to the application termination setting checkbox CB10 and the termination time setting tab T10.

As described above, according to the first embodiment, it is possible to provide the image processing apparatus, and the like, which terminates the remote application after the termination determination time has elapsed and thus may prevent impersonation by other users.

2 Second Embodiment

A second embodiment is an embodiment in which the termination determination time may be extended on the operation screen when the remote application 215 is terminated according to the first embodiment.

The overall configuration or the functional configurations of the multifunction peripheral, the terminal device, and the network service according to the second embodiment may be identical to the functional configurations according to the first embodiment, and therefore the description here is omitted. The flow of the overall process, the process of the terminal device, and the process of the network service may also be identical to the process according to the first embodiment, and therefore the description here is omitted.

2.1 Regarding Process of Multifunction Peripheral 10

The flow of the process of the multifunction peripheral 10 according to the second embodiment may also be substantially identical to the flow of the process of the multifunction peripheral 10 described in FIG. 10 according to the first embodiment. The second embodiment is different from the first embodiment in that, at Step S180 of FIG. 10, a termination extension setting screen is displayed in the display 13 immediately before the determination time elapses.

2.2 Operation Example

Figure 24:
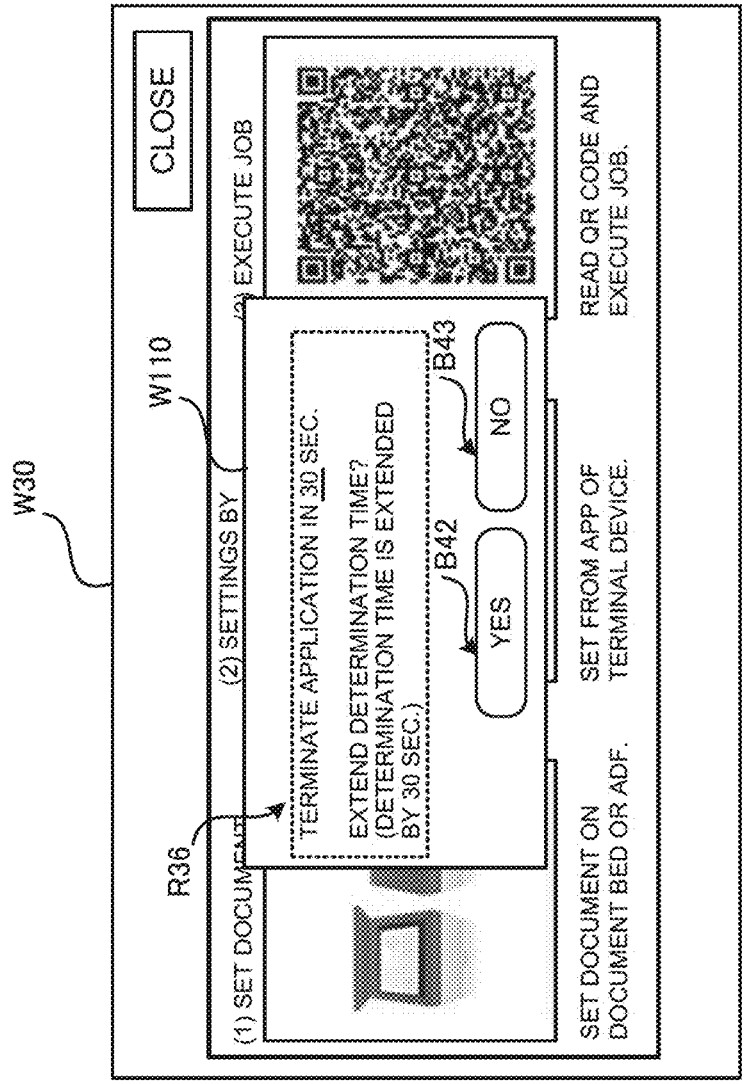
FIG. 24 is a diagram illustrating an operation example according to a second embodiment.

FIG. 24 is a diagram illustrating a configuration example of a termination extension setting screen W110. The termination extension setting screen W110 is displayed in a superimposed manner on the display screen W30 described in FIG. 16 immediately before the determination time elapses (e.g., 30 seconds before the elapse).

The termination extension setting screen W110 includes a termination extension confirmation setting area R36, a Yes button B42, and a No button B43.

The termination extension confirmation setting area R36 may be configured as a message display area that displays, for example, the remaining time before the determination time elapses in a countdown format and that makes an inquiry to the user as to whether the termination time is to be extended. FIG. 24 illustrates an example where the remaining time before the determination time elapses is 30 seconds and the user is inquired as to whether the determination time is to be extended.

The Yes button B42 receives the input of an extension instruction for the determination time from the user. When the Yes button B42 is selected to give the extension instruction for the determination time, the controller 11 extends the determination time (in FIG. 24, the controller 11 extends the determination time by 30 seconds). The No button B43 receives an instruction when the determination time is not to be extended. When the No button B43 is selected to give the instruction indicating that the determination time is not to be extended, the controller 11 performs a termination control on the remote application 215 when the remaining time before the determination time elapses, displayed in the termination extension confirmation setting area R36, becomes zero.

As described above, according to the second embodiment, in addition to the advantage of the first embodiment, it is possible to extend the termination determination time of the remote application 215 on the operation screen, and therefore the startup state of the remote application 215 may be extended and maintained, for example, when the job to be executed has not been completed or when multiple jobs are in an uncompleted state.

3 Third Embodiment

According to the first embodiment, the termination determination value setting screen W100 is displayed, for example, via the system setting screen and the termination determination value is set in the multifunction peripheral 10. A third embodiment is an embodiment in which the termination determination value may be set in the terminal device 30.

The overall configuration or the functional configurations of the multifunction peripheral, the terminal device, and the network service according to the third embodiment may be identical to the functional configurations according to the first embodiment, and therefore the description here is omitted. The flow of the overall process, the process of the multifunction peripheral, and the process of the network service may also be identical to the process according to the first embodiment, and therefore the description here is omitted.

3.1 Regarding Process of Terminal Device 30

Figure 11:
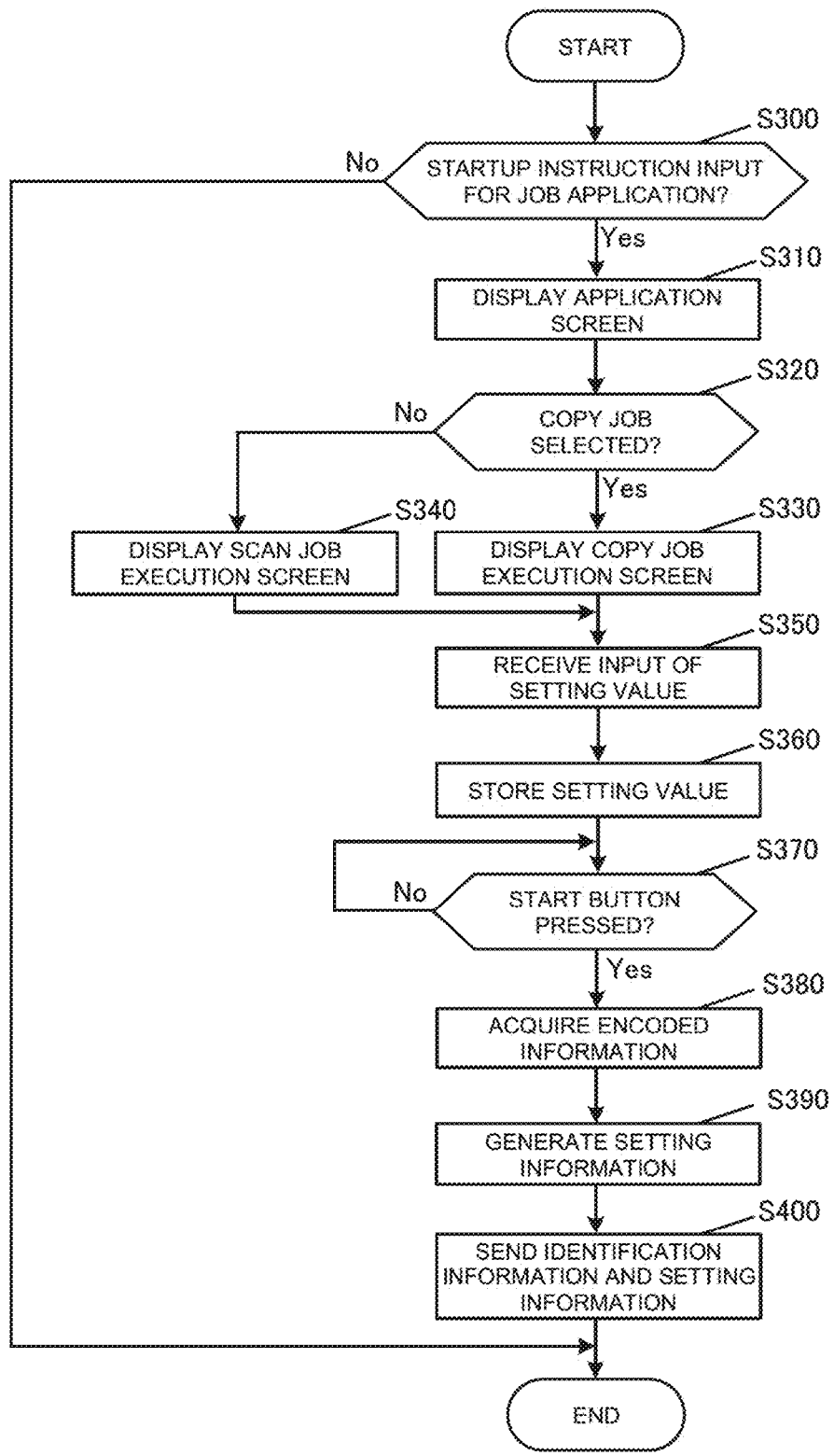
FIG. 11 is a flowchart illustrating a process of the terminal device according to the first embodiment.

The flow of the process of the terminal device 30 according to the third embodiment may also be substantially identical to the flow of the process of the terminal device 30 described in FIG. 11 according to the first embodiment. The third embodiment is different from the first embodiment in that, at Step S310 of FIG. 11, the termination determination value setting screen may be displayed on the display 33.

3.2 Operation Example

Figure 25:
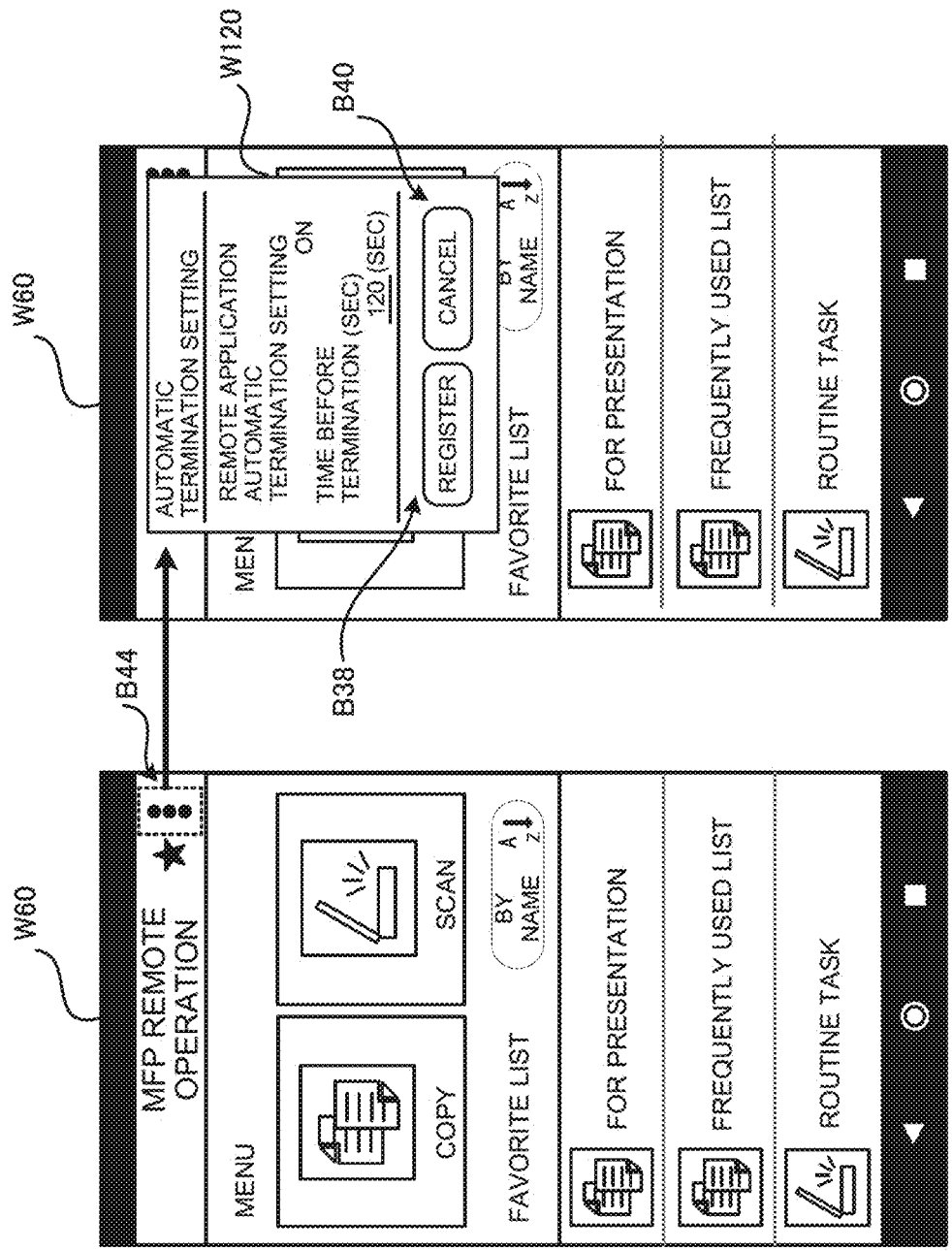
FIG. 25 is a diagram illustrating an operation example according to a third embodiment.

FIG. 25 is a diagram illustrating a configuration example of a termination determination value setting screen W120 displayed by the terminal device 30. The termination determination value setting screen W120 may be displayed by selecting an application setting button B44 provided on the application screen W60 illustrated in FIG. 19 to input a display instruction.

The termination determination value setting screen W120 may have the same content as the display content of the termination determination value setting screen W100 illustrated in FIG. 23. The user may set the termination determination value via the termination determination value setting screen W120. For example, the input values on the termination determination value setting screen W120 may be stored in the setting value storage area 417 in the same manner as the setting values for the job, and the like, and is sent to the multifunction peripheral 10 together with the setting information.

As described above, according to the third embodiment, in addition to the advantage of the first embodiment, the termination determination value may be set in the terminal device 30 without operating the operation screen of the multifunction peripheral 10, and thus the contact with the multifunction peripheral 10 may be further avoided.

4 Fourth Embodiment

There is a possibility that, when the remote application is terminated and the user logs out of the multifunction peripheral 10 immediately after the apparatus information acquirer 37 of the terminal device 30 acquires the encoded information (apparatus information) on the multifunction peripheral 10 and then another user logs in to the multifunction peripheral and starts up the remote application, the user could execute the job that is registered in the network service by the user who logged out.

A fourth embodiment is an embodiment in which, before or when the remote application is started up, the job registered in the network service is deleted so that it is possible to prevent other users from executing the job registered in the network service.

Before the specific mode of the fourth embodiment is described, the situation where the job of the user who logged in to the multifunction peripheral earlier is executed by another user.

Figure 26:
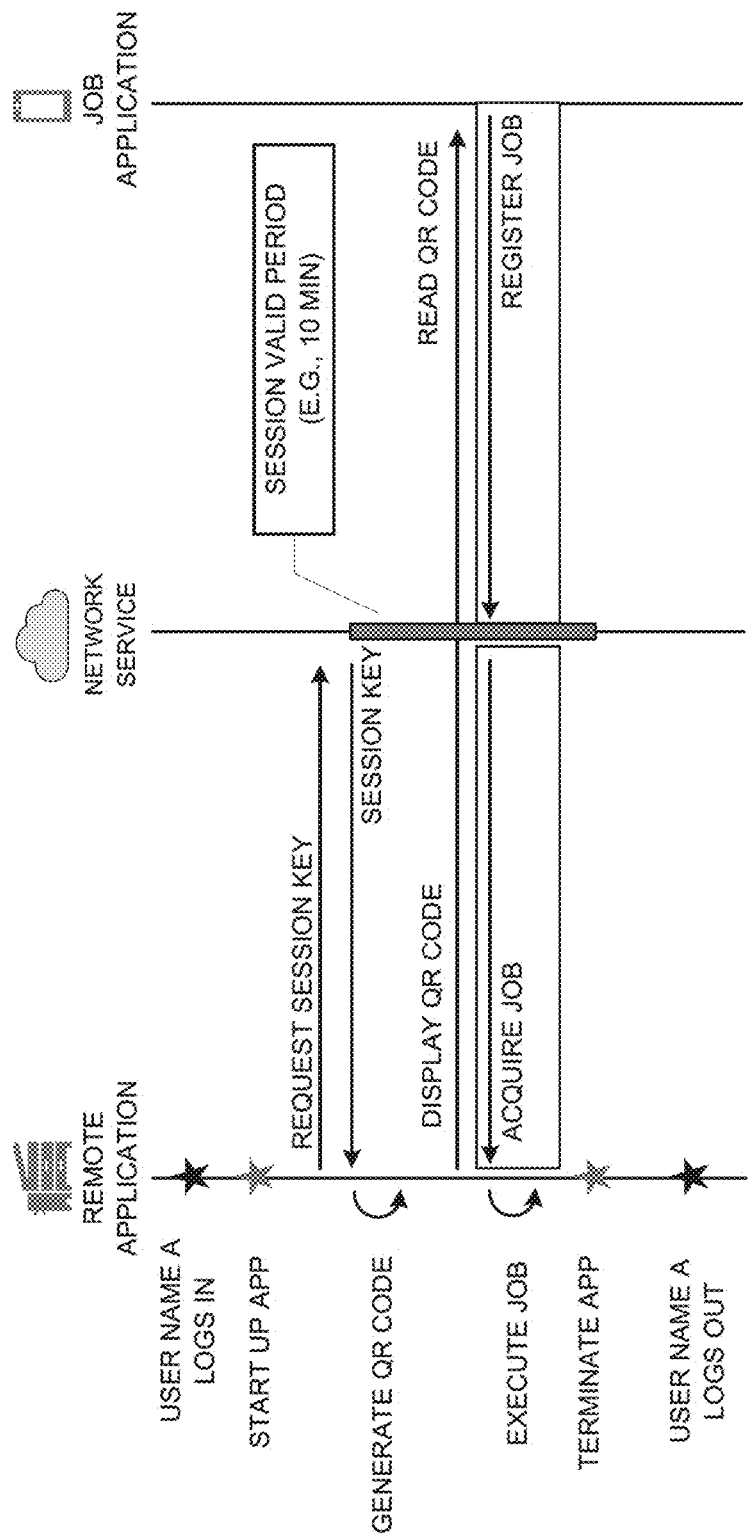
FIG. 26 is a diagram illustrating a fourth embodiment.

FIG. 26 is a diagram schematically illustrating, as a timeline, the flow of the operation in which a user name A logs in to the multifunction peripheral and remotely operates the multifunction peripheral.

When the user name A logs in to the multifunction peripheral and starts up the remote application, the multifunction peripheral (remote application) makes a request to the network service to acquire the session key as the connection information.

Then, the terminal device generates the setting information for job execution and sends the generated setting information to the network service to register the job. The multifunction peripheral acquires the setting information from the network service and executes the job based on the acquired setting information.

After the job is executed, the multifunction peripheral performs a termination control on the remote application, logs out the user name A, and terminates the series of processes.

As described in FIG. 26, the setting information for job execution is registered as a job in the network service, and the multifunction peripheral acquires the job from the network service so that, in principle, the job does not remain in the network service.

Figure 27:
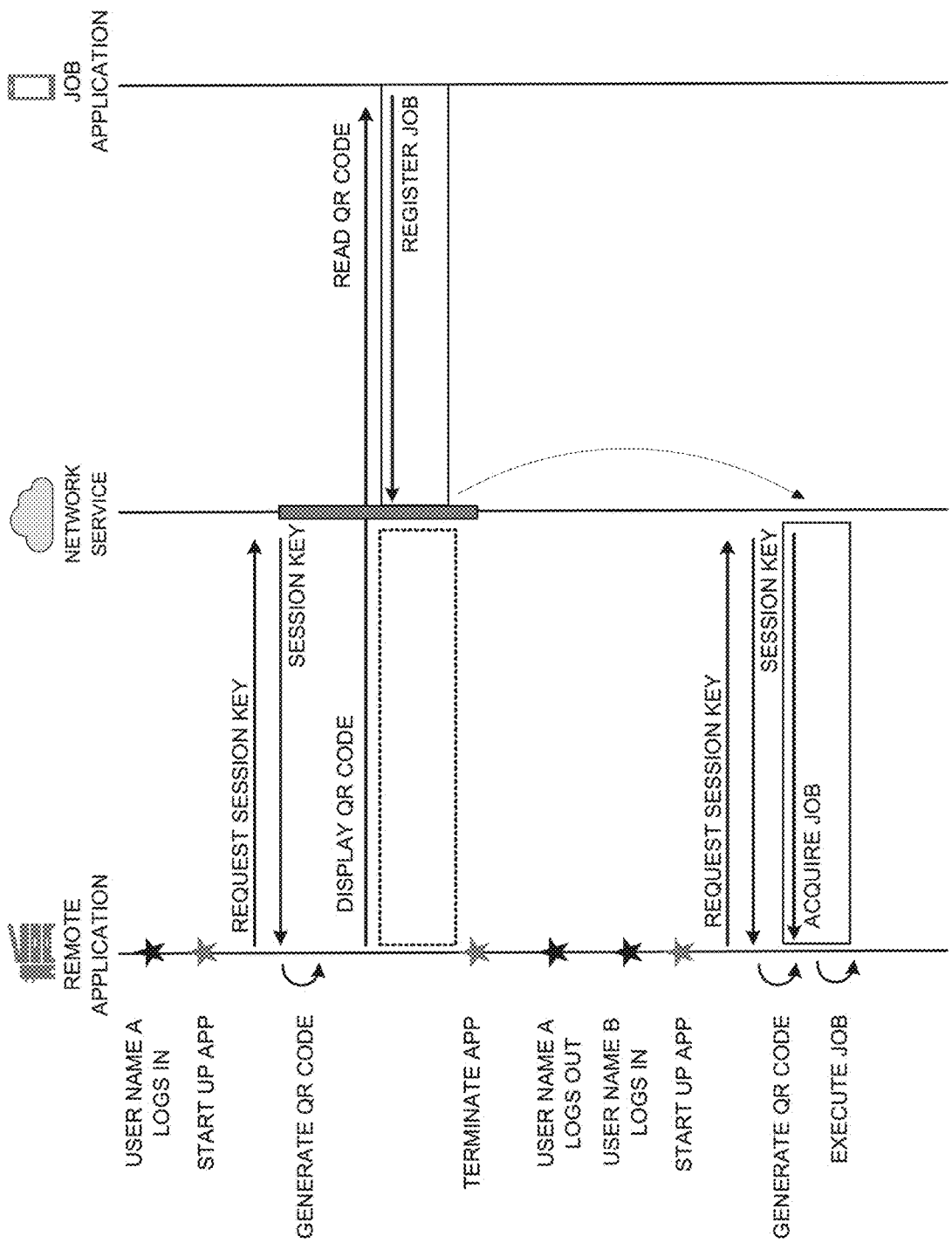
FIG. 27 is a diagram illustrating the fourth embodiment.

However, as in the situation illustrated in FIG. 27, after the job is registered in the network service and before the multifunction peripheral acquires the job from the network service, the remote application may be terminated, or the registered job may remain in the network service due to a network communication failure or as the job is not acquired from the network service.

In such a situation, when the user name A logs out of the multifunction peripheral and then another user, a user name B, logs in to the multifunction peripheral and starts up the remote application, the multifunction peripheral acquires the job of the user name A from the network service and executes the job. Specifically, when the remote application is subsequently executed during the period in which the session key generated for the user name A is valid, the session key is reused. Thus, there is a problem such that the registered job is executed when it remains.

As the user name A terminates the remote application without waiting for job termination, it is considered that the setting information remaining in the network service is a job that is not needed (no longer needed) by the user name A. However, it is also possible that, for example, the user name A needed to leave the multifunction peripheral as soon as possible or the user assumed that the job was completed and left the multifunction peripheral without knowing that a communication failure had occurred. In either case, the situation where the setting information for the job executed by the user name A remains in the network service and may be executed by another user, the user name B, is not a desirable situation in terms of a safe remote operation of the multifunction peripheral because of the possibility of leakage of personal information, unauthorized use of the output material of the job, etc.

In view of the above described situation, according to the embodiment described below, the job registered in the network service is deleted before or when the remote application is started up so that it is possible to prevent other users from executing the job registered in the network service.

4.1 Overall Configuration

The overall configuration according to the fourth embodiment may be identical to the overall configuration according to the first embodiment, and therefore the description here is omitted.

4.2 Functional Configuration

The functional configuration of the terminal device may be identical to the functional configuration of the terminal device 30 according to the first embodiment, and therefore the description here is omitted.

4.2.1 Regarding Multifunction Peripheral 70

Figure 28:
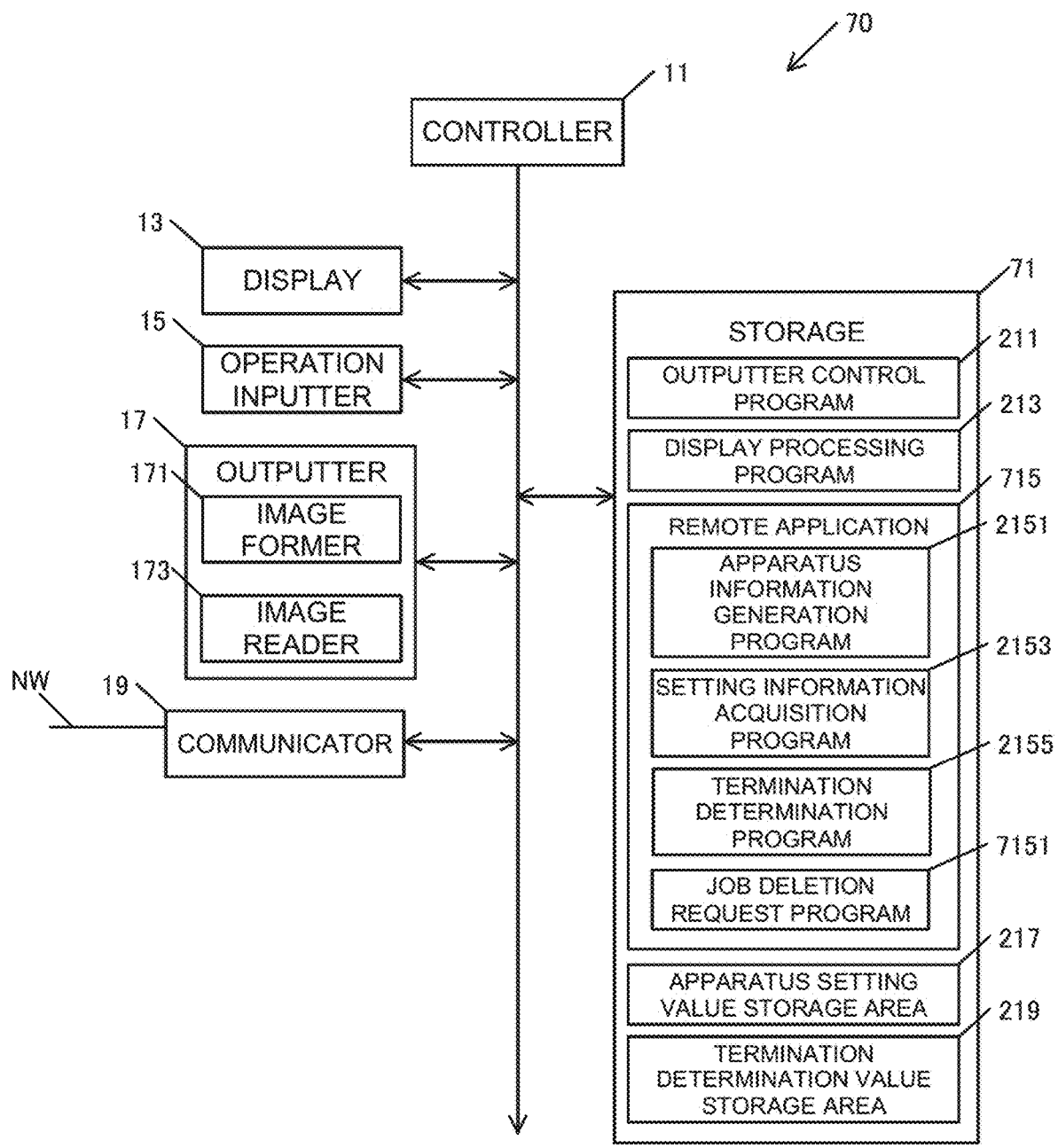
FIG. 28 is a diagram illustrating a functional configuration of a multifunction peripheral according to the fourth embodiment.

FIG. 28 is a functional configuration diagram of a multifunction peripheral 70. The functional configuration of the multifunction peripheral 70 may be configured in the same manner as the multifunction peripheral 10 according to the first embodiment. Therefore, the same functions as those of the multifunction peripheral 10 are denoted by the same reference numerals, and their descriptions are omitted.

The multifunction peripheral 70 includes a storage 71 instead of the storage 21. The storage 71 stores the outputter control program 211, the display processing program 213, and a remote application 715 as an application and provides the apparatus setting value storage area 217 and the termination determination value storage area 219.

The remote application 715 includes the apparatus information generation program 2151, the setting information acquisition program 2153, the termination determination program 2155, and a job deletion request program 7151.

The job deletion request program 7151 is a program read by the controller 11 to delete the job, stored in a network service 80, in response to the startup instruction of the remote application 715. After reading the job deletion request program 7151, the controller 11 outputs a job deletion request to the network service 80. When the application is started up, the controller 11 outputs a deletion request for the registered job even while the session key is valid.

4.2.2 Regarding Network Service 80

Figure 29:
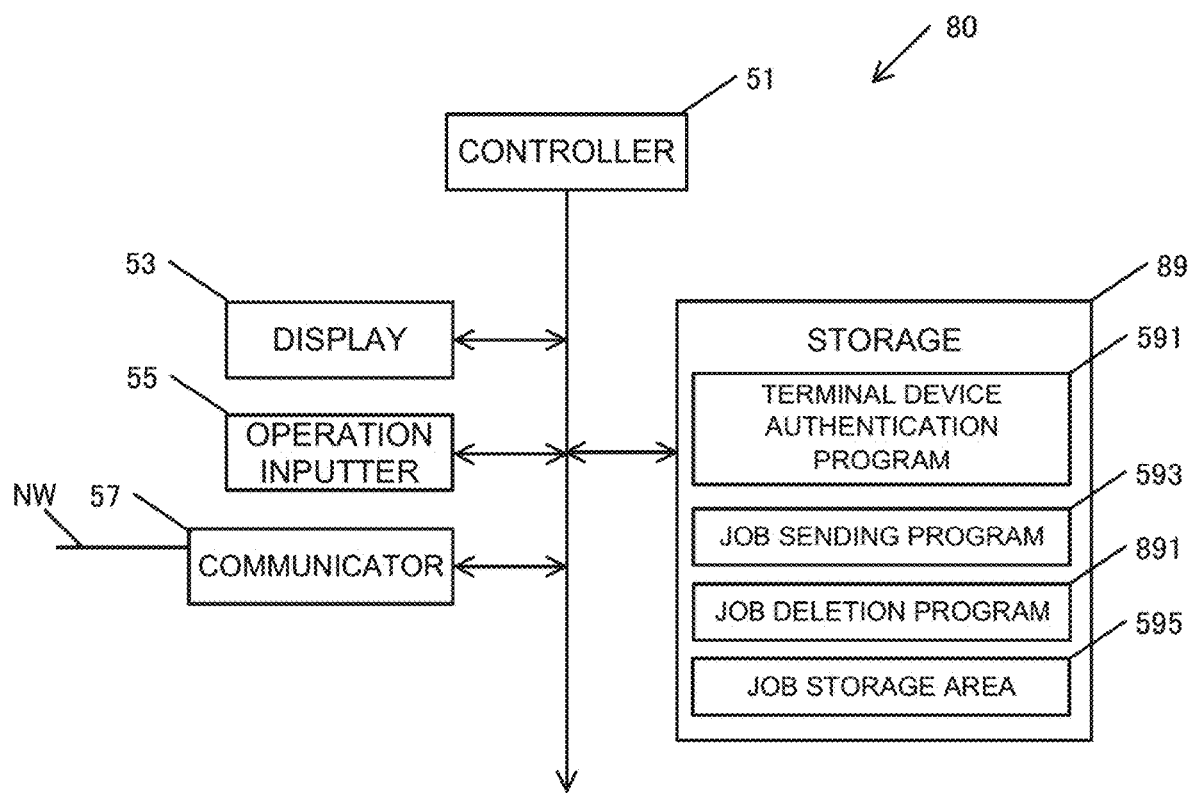
FIG. 29 is a diagram illustrating a functional configuration of a network device according to the fourth embodiment.

FIG. 29 is a functional configuration diagram of the network service 80. The functional configuration of the network service 80 may be configured in the same manner as the network service 50 according to the first embodiment. Therefore, the same functions as those of the network service 50 are denoted by the same reference numerals, and their descriptions are omitted.

The network service 80 includes a storage 89 instead of the storage 59. The storage 89 stores the terminal device authentication program 591, the job sending program 593, and a job deletion program 891 and provides the job storage area 595.

The job deletion program 891 is a program read by the controller 51 when the job deletion request is received from the multifunction peripheral 70. After reading the job deletion program 891, the controller 51 deletes the job when it is stored.

4.3 Process Flow

4.3.1 Regarding Overall Process

The overall process according to the fourth embodiment may be identical to the flow of the process described in the flowchart of FIG. 9 according to the first embodiment, and therefore the description here is omitted.

4.3.2 Regarding Process of Multifunction Peripheral 70

Next, a process of the multifunction peripheral 70 will be described with reference to the flowchart in FIG. 30. The process of the multifunction peripheral 70 is substantially identical to the flow of the process described in FIG. 10 according to the first embodiment, and therefore the same process is denoted by the same step number and its description is omitted.

When it is determined at Step S160 that the startup instruction for the remote application 715 has been input (Step S160; Yes) or when it is determined at Step S150 that the operation for job execution has been input (Step S150; Yes), the controller 11 starts up the remote application 715 (Step S170).

Subsequently, the controller 11 reads the job deletion request program 7151 to output the job deletion request to the network service 80 (Step S610). During the apparatus initialization process at Step S120 or the login authentication at Step S130, the controller 11 may read the job deletion request program 7151 and output the job deletion request to the network service 80.

4.3.3 Regarding Process of Network Service 80

Figure 31:
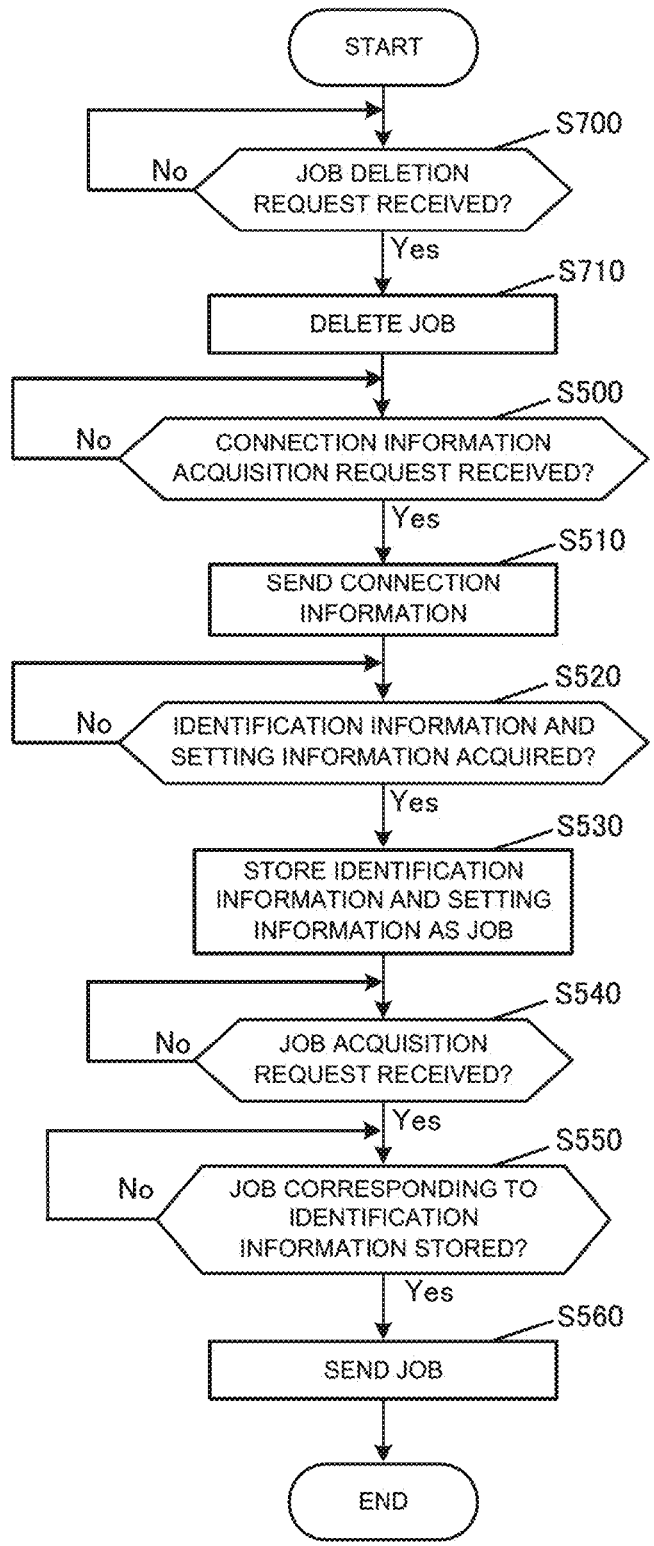
FIG. 31 is a flowchart illustrating a process of the network service according to the fourth embodiment.

Next, a process of the network service 80 will be described with reference to the flowchart in FIG. 31. The process of the network service 80 is substantially identical to the flow of the process described in FIG. 12 according to the first embodiment, and therefore the same process is denoted by the same step number, and its description is omitted.

First, the controller 51 determines whether the job deletion request has been received from the multifunction peripheral 70 (Step S700). When it is determined that the job deletion request has been received from the multifunction peripheral 70, the controller 51 reads the job deletion program 891, and when the job is stored in the job storage area 595, deletes the job (Step S700; Yes→Step S710). Conversely, when it is determined that the job deletion request has not been received from the multifunction peripheral 70, it waits until the deletion request is received (Step S700; No).

The process regarding Step S500 and the subsequent steps is identical to the process described in the flowchart of FIG. 12.

4.4 Operation Example

Figure 32:
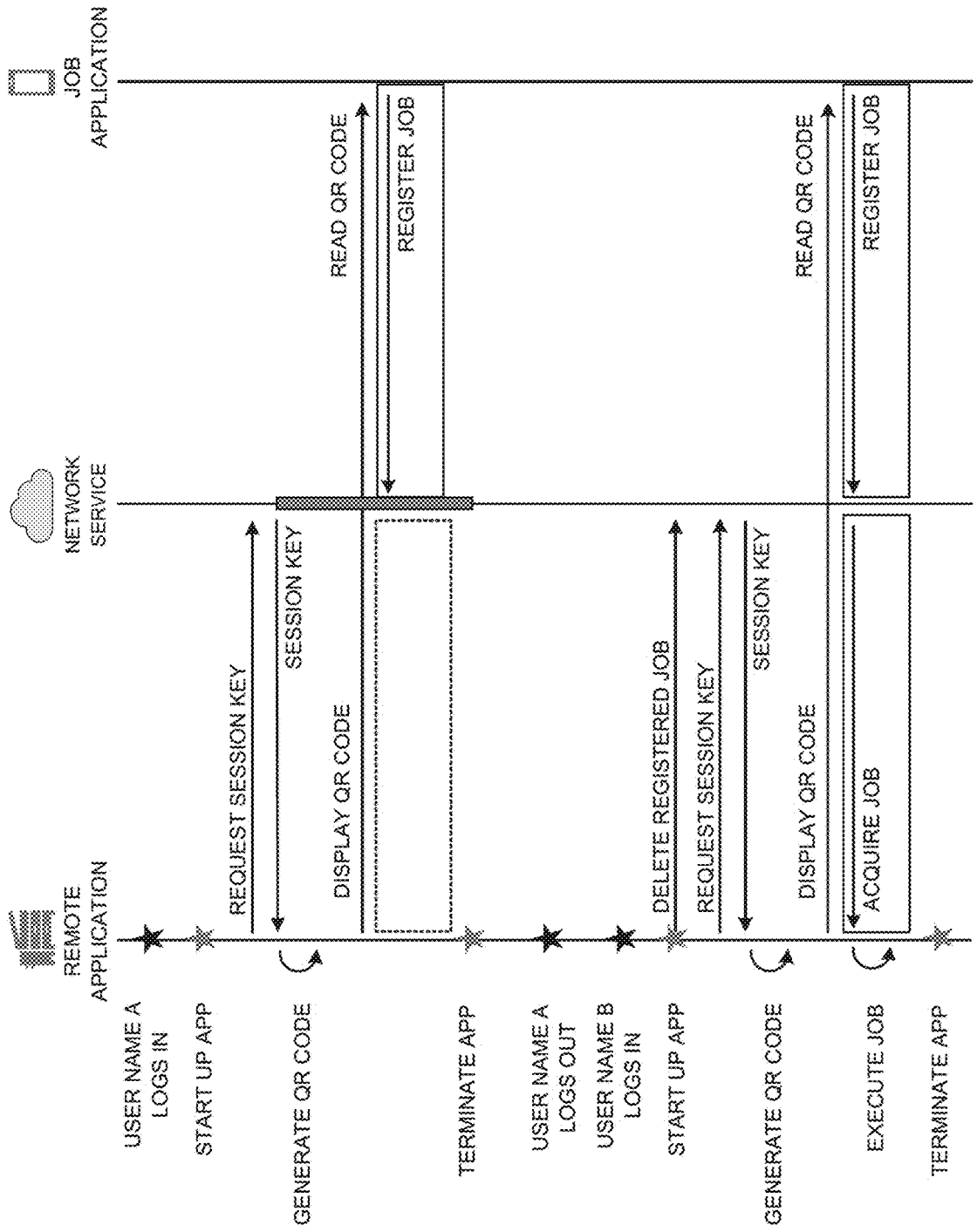
FIG. 32 is a diagram illustrating an operation example according to the fourth embodiment.

Next, an operation example according to the fourth embodiment will be described. FIG. 32 is a diagram schematically illustrating, as a timeline, the flow of an operation according to the fourth embodiment.

When the user name A logs in to the multifunction peripheral and starts up the remote application, the multifunction peripheral 70 (remote application) makes a request to the network service 80 to acquire the session key as the connection information.

When acquiring the session key from the network service 80, the multifunction peripheral generates a QR Code as the encoded information including the apparatus information and displays the QR Code to the terminal device (job application). The terminal device acquires (reads) the QR Code via the apparatus information acquirer.

After the job is registered in the network service and before the multifunction peripheral acquires the job from the network service, the remote application is terminated. As a result, the job is not acquired from the network service, and the job remains in the network service. In this state, the user name A logs out of the multifunction peripheral 70.

After the user name A logs out, the user name B logs in to the multifunction peripheral 70 and inputs the startup instruction for the remote application 715.

In response to the startup instruction input for the remote application 715, the controller 11 outputs, to network service 80, the job deletion request regarding job execution.

In response to the job deletion request, the network service 80 deletes the job when the job is stored.

Subsequently, the multifunction peripheral 70 makes a request to the network service 80 to acquire the session key as the connection information.

When acquiring the session key from the network service 80, the multifunction peripheral 70 generates a QR Code as the encoded information including the apparatus information and display the QR Code to the terminal device 30 (job application). The terminal device acquires (reads) the QR Code via the apparatus information acquirer.

Then, the terminal device 30 generates the setting information for jog execution and sends the generated setting information to the network service 80 to register the job. The multifunction peripheral 70 acquires the job from the network and executes the acquired job.

After the job is executed, the multifunction peripheral performs a termination control on the remote application.

As described above, according to the fourth embodiment, the job registered in the network service is deleted before or when the remote application is started up so that it is possible to prevent other users from executing the job registered in the network service.

5 Fifth Embodiment

A fifth embodiment is an embodiment in which the user is inquired as to whether the job is to be deleted when the job deletion request is made to the network service according to the fourth embodiment.

The overall configuration or the functional configurations of the multifunction peripheral, the terminal device, and the network service according to the fifth embodiment may be identical to the functional configuration according to the fourth embodiment, and therefore the description here is omitted. The flow of the overall process, the process of the terminal device, and the process of the network service may also be identical to the process according to the fourth embodiment, and therefore the description here is omitted.

5.1 Regarding Process of Multifunction Peripheral 70

Figure 30:
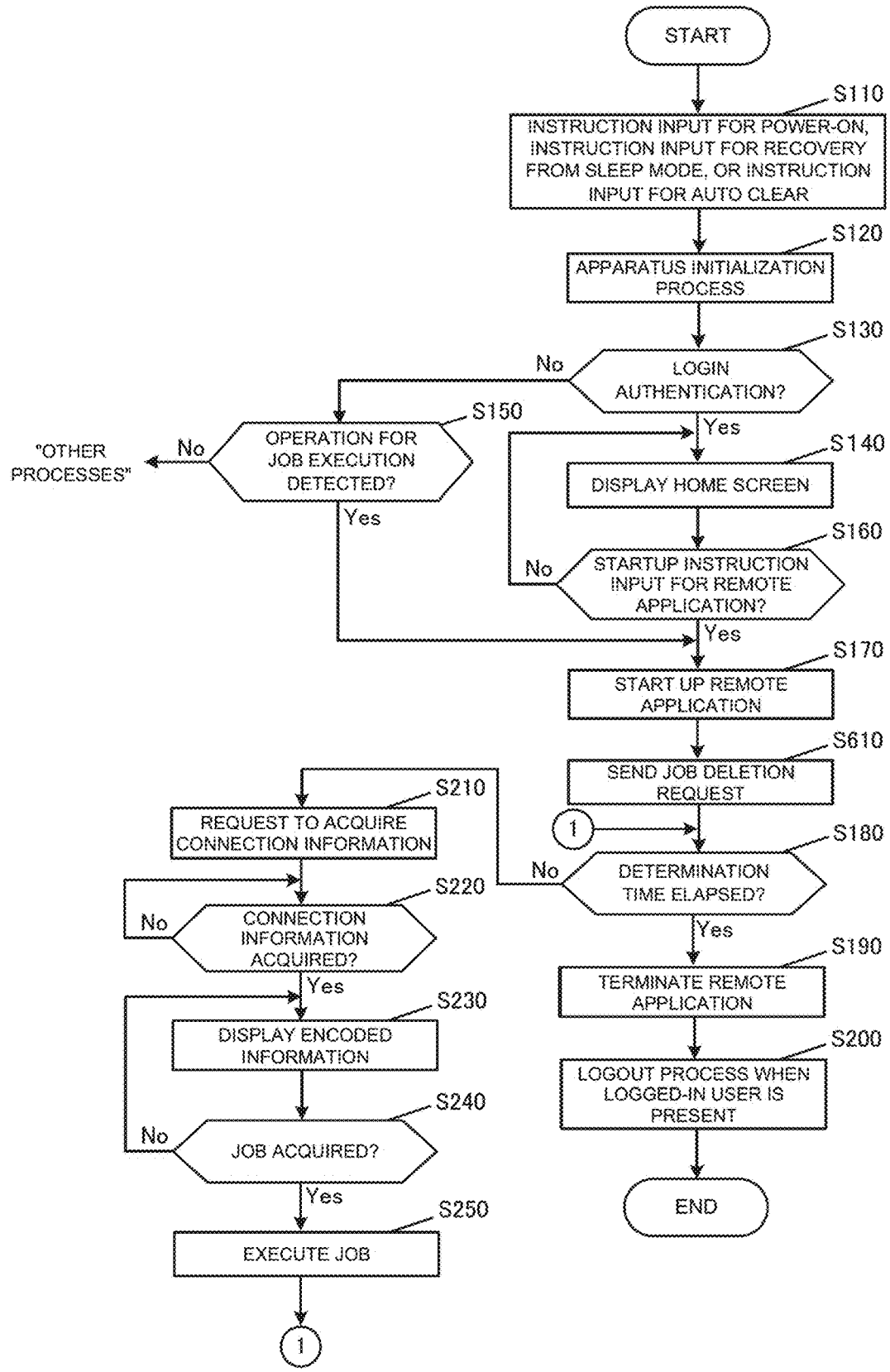
FIG. 30 is a flowchart illustrating a process of the multifunction peripheral according to the fourth embodiment.

The flow of the process of the multifunction peripheral 70 according to the fifth embodiment may also be substantially identical to the flow of the process of the multifunction peripheral 70 described in FIG. 30 according to the fourth embodiment. The fifth embodiment is different from the fourth embodiment in that, before or after the job deletion request is sent at Step S610 of FIG. 30, the display 13 displays a job deletion confirmation screen as an inquiry screen as to whether deletion is to be executed.

5.2 Operation Example

Figure 33:
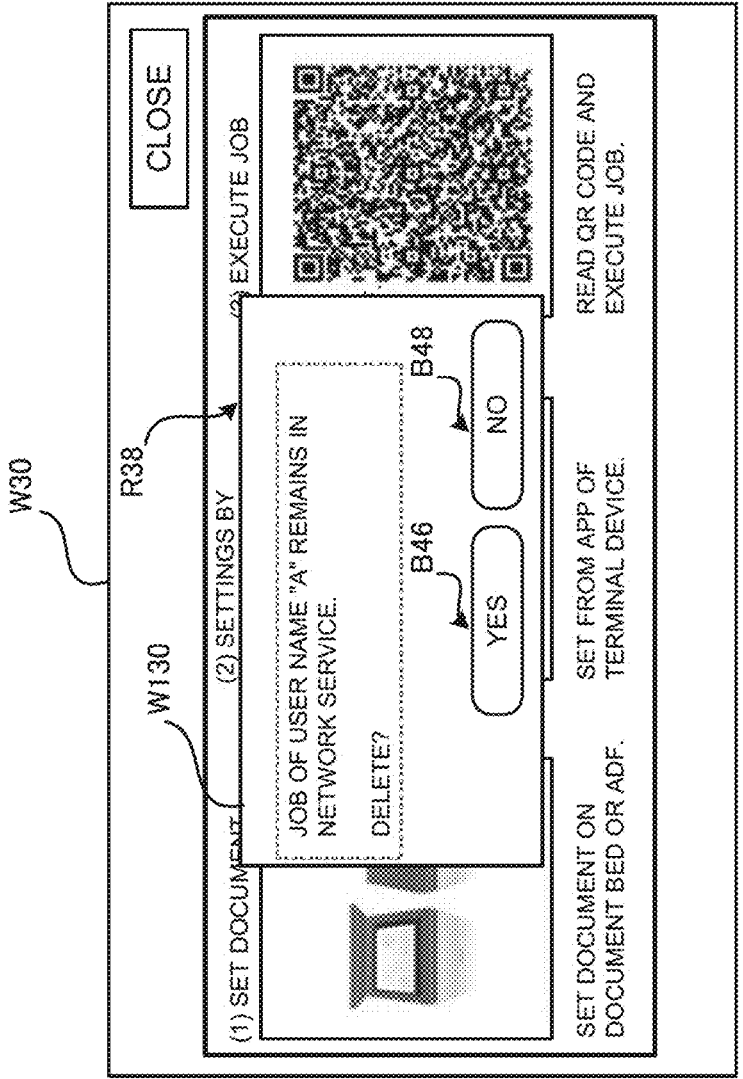
FIG. 33 is a diagram illustrating an operation example according to a fifth embodiment.

In FIG. 33, a job deletion confirmation screen W130 includes a job deletion confirmation area R38, a Yes button B46, and a No button B48.

The job deletion confirmation area R38 is an area that displays a message to the user to make an inquiry as to whether the job stored in the network service 80 is to be deleted. FIG. 33 illustrates an example of the message indicating that the job of the user name A remains in the network service 80 and making an inquiry as to whether the job is to be deleted.

The Yes button B46 receives the input of the job deletion instruction from the user. When the Yes button B46 is selected to give the job deletion instruction, the controller 11 sends the deletion request for the job to the network service 80. The No button B48 receives an instruction when the job is not to be deleted. When the No button B48 is selected to give an instruction indicating that the job is not to be deleted, the controller 11 does not send the deletion request for the job to the network service 80.

As described above, according to the fifth embodiment, in addition to the advantage of the fourth embodiment, it is possible to prevent unnecessary job deletion, for example, when the user name A continuously logs in to the multifunction peripheral 70 after having logged out once.

6 Sixth Embodiment

The fifth embodiment is an embodiment in which the multifunction peripheral 70 displays the job deletion confirmation screen W130 to confirm job deletion in the multifunction peripheral 70. A sixth embodiment is an embodiment in which job deletion confirmation may be performed in the terminal device 30.

The overall configuration or the functional configurations of the multifunction peripheral, the terminal device, and the network service according to the sixth embodiment may be identical to the functional configuration according to the fourth embodiment, and therefore the description here is omitted. The flow of the overall process, the process of the multifunction peripheral, and the process of the network service may also be identical to the process according to the fourth embodiment, and therefore the description here is omitted.

6.1 Regarding Process of Terminal Device 30

Figure 34:
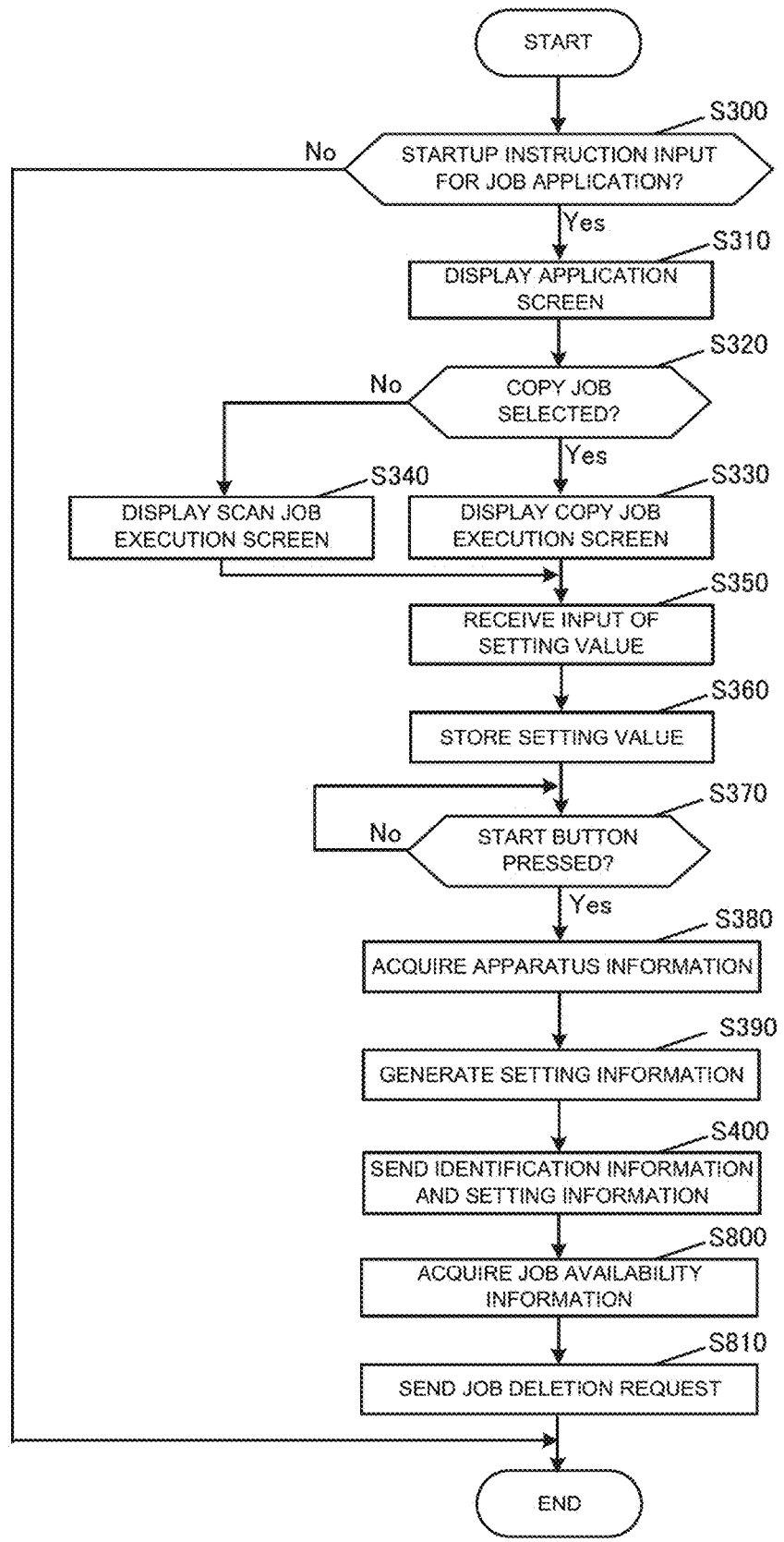
FIG. 34 is a flowchart illustrating a process of a terminal device according to a sixth embodiment.

FIG. 34 is a flowchart illustrating the flow of a process of the terminal device 30 according to the sixth embodiment. The flow of the process of the terminal device 30 according to the sixth embodiment may also be substantially identical to the flow of the process of the terminal device 30 described in FIG. 11 according to the first embodiment. Therefore, the same process as the process in the flowchart of FIG. 11 is denoted by the same step number, and its description is omitted.

After sending the generated setting information together with the identification information on the multifunction peripheral 10 to the network service 80 at Step S400, the controller 31 acquires availability information indicating whether the network service 80 stores the job (Step S800). Then, the controller 31 displays the job deletion confirmation screen on the display 33 based on the acquired availability information on the job, and when the deletion instruction for the job is received, sends the job deletion request to the network service 80 (Step S810).

6.2 Operation Example

Figure 35:
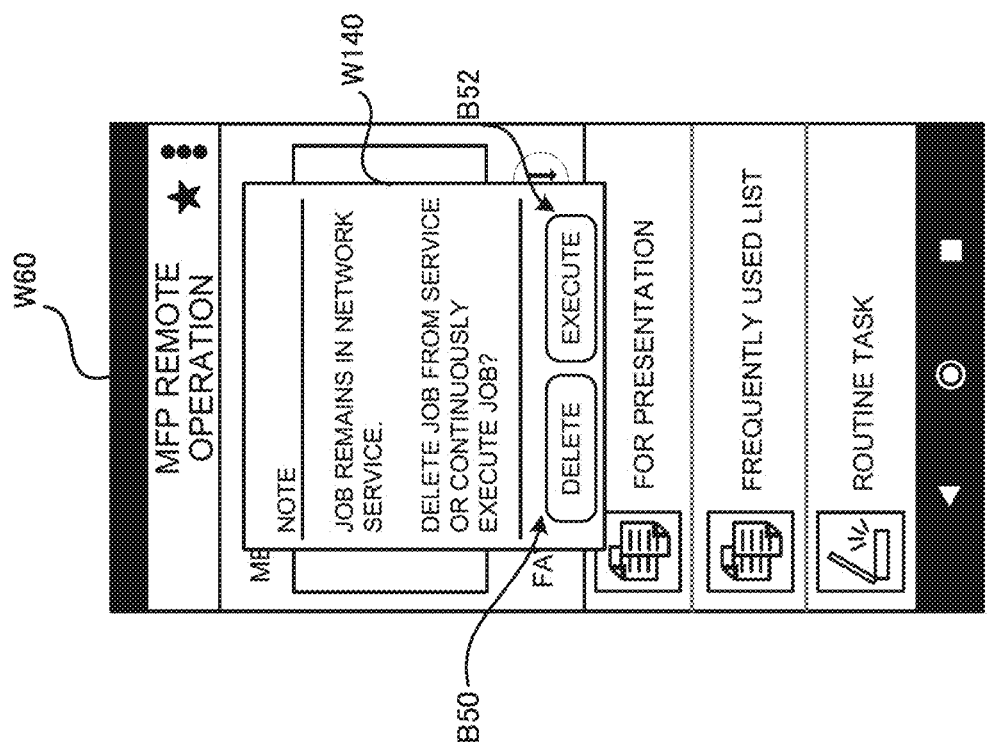
FIG. 35 is a diagram illustrating an operation example according to a sixth embodiment.

FIG. 35 is a diagram illustrating a configuration example of a job deletion confirmation screen W140 displayed by the terminal device 30. The job deletion confirmation screen W140 may be displayed by selecting the application setting button B44 provided on the application screen W60 illustrated in FIG. 25 to input a display instruction.

The job deletion confirmation screen W140 may have the same display content as the display content of the job deletion confirmation screen W130 illustrated in FIG. 33. The user may make a setting as to whether the job is to be deleted via the job deletion confirmation screen W140. The user may select a deletion button B50 to input a job deletion instruction. In order not to delete the job, the user may select an execution button B52 to execute the job.

As described above, according to the sixth embodiment, in addition to the advantage of the fourth embodiment, setting information deletion confirmation may be performed in the terminal device 30 without operating the operation screen of the multifunction peripheral 70, and thus the contact with the multifunction peripheral 70 may be further avoided.

7 Seventh Embodiment

When multiple documents (pages) are read using the document bed during the copy job or scan job, the user lifts a document pressing member, removes the document after reading, and sets the subsequent document on the document placement bed. Then, the user needs to return the document pressing member to its original pressing position and then input a document reading start instruction (e.g., press a reading start button displayed on the operation screen).

Figure 36:
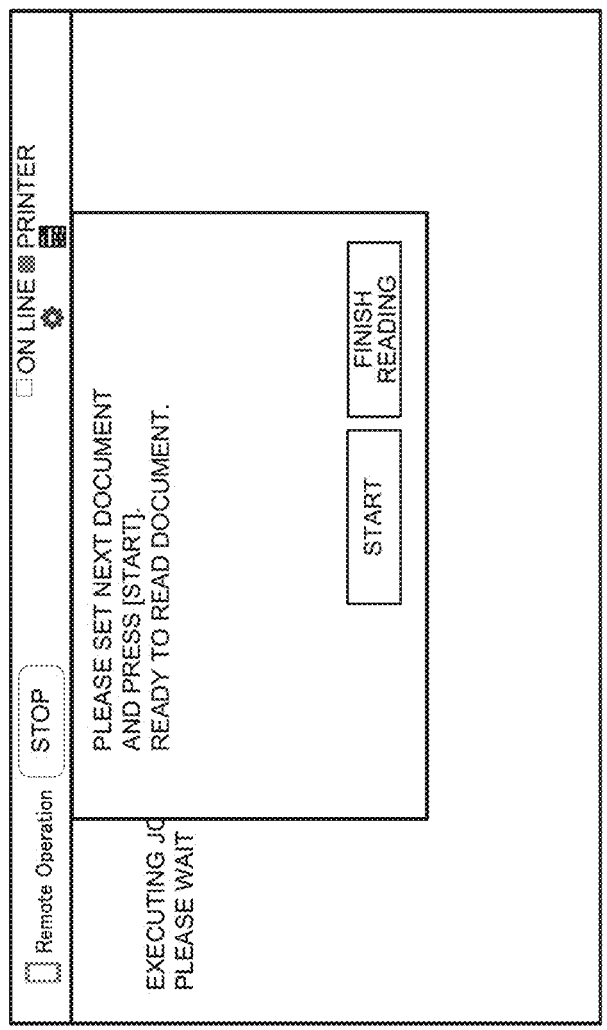
FIG. 36 is a diagram illustrating a seventh embodiment.

In this case, each time document reading is completed, the operation screen, or the like, displays the message to prompt setting of the subsequent document (FIG. 36).

The operation to read multiple documents using the document bed always needs operations on the document bed and the display (operation screen). Reading multiple documents using the document bed described above does not fit with the concept of the remote operation of the multifunction peripheral to avoid high frequency contact.

A seventh embodiment is an embodiment in which, during the document reading operation using the document bed, the number of times that reading may be performed on the document bed is limited so that the contact with the document bed and the operation screen may be avoided as much as possible.

7.1 Overall Configuration

The overall configuration according to the seventh embodiment may be identical to the overall configuration according to the first embodiment, and therefore the description here is omitted.

7.2 Functional Configuration

The functional configurations of the terminal device and the network service may be identical to the configurations of the terminal device 30 and the network service 50 according to the first embodiment, and therefore the description her is omitted.

7.2.1 Regarding Multifunction Peripheral 90

Figure 37:
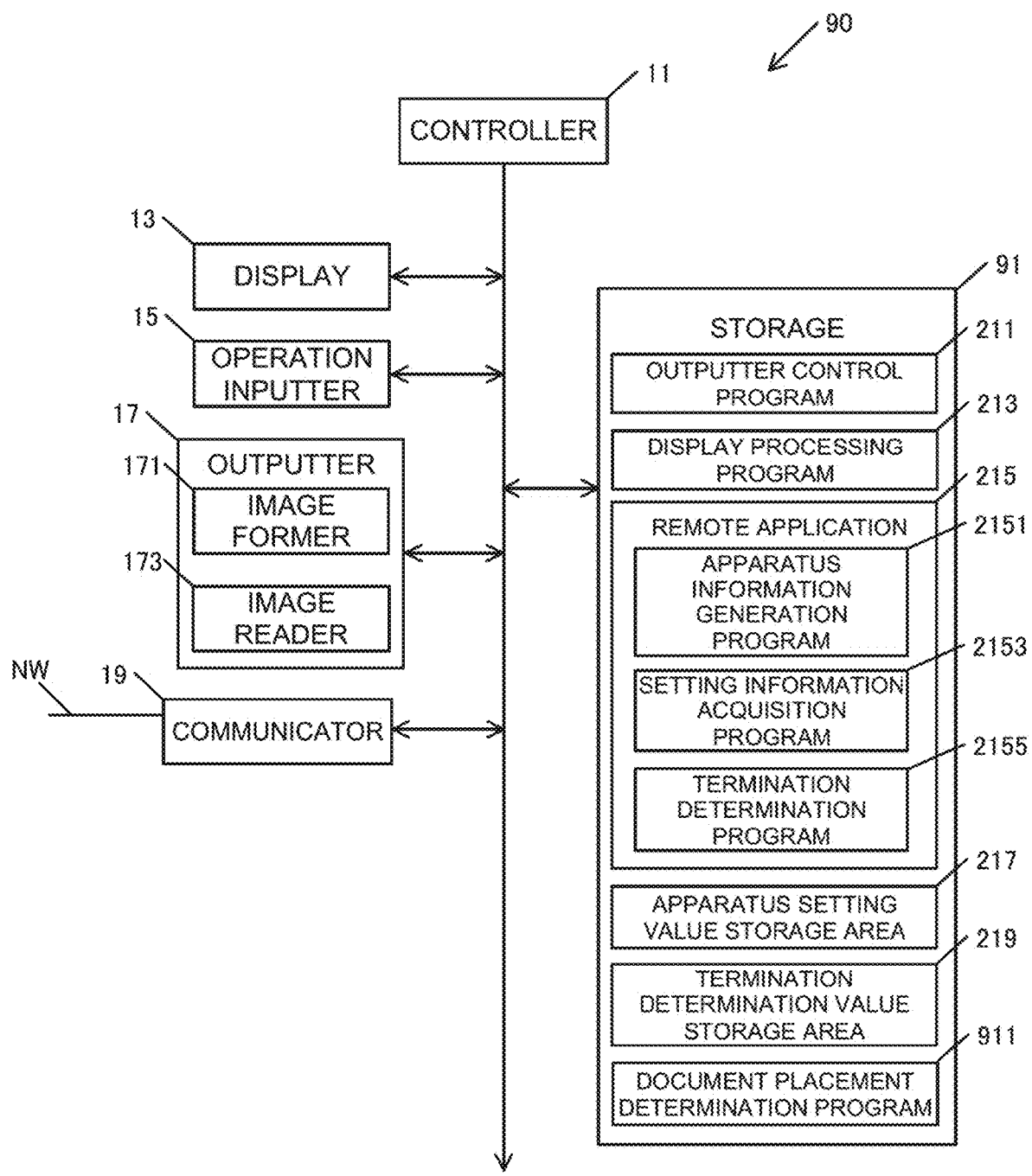
FIG. 37 is a diagram illustrating a functional configuration of a multifunction peripheral according to the seventh embodiment.

FIG. 37 is a functional configuration diagram of a multifunction peripheral 90. The functional configuration of the multifunction peripheral 90 may be configured in the same manner as the multifunction peripheral 10 according to the first embodiment. Therefore, the same functions as those of the multifunction peripheral 10 are denoted by the same reference numerals, and their descriptions are omitted.

The multifunction peripheral 90 includes a storage 91 instead of the storage 21. The storage 91 stores the outputter control program 211, the display processing program 213, the remote application 215, and a document placement determination program 911 and provides the apparatus setting value storage area 217 and the termination determination value storage area 219.

The document placement determination program 911 is a program read by the controller 11 to determine whether a document has been placed (set) on the document bed included in the image reader 173. For example, the controller 11 may read the document placement determination program 911 that is triggered when the document pressing member included in the document bed is opened.

7.3 Process Flow

7.3.1 Regarding Overall Process

The overall process according to the seventh embodiment may be identical to the process described in the flowchart of FIG. 9 according to the first embodiment, and therefore the description here is omitted.

7.3.2 Regarding Process of Multifunction Peripheral 90

Figure 38:
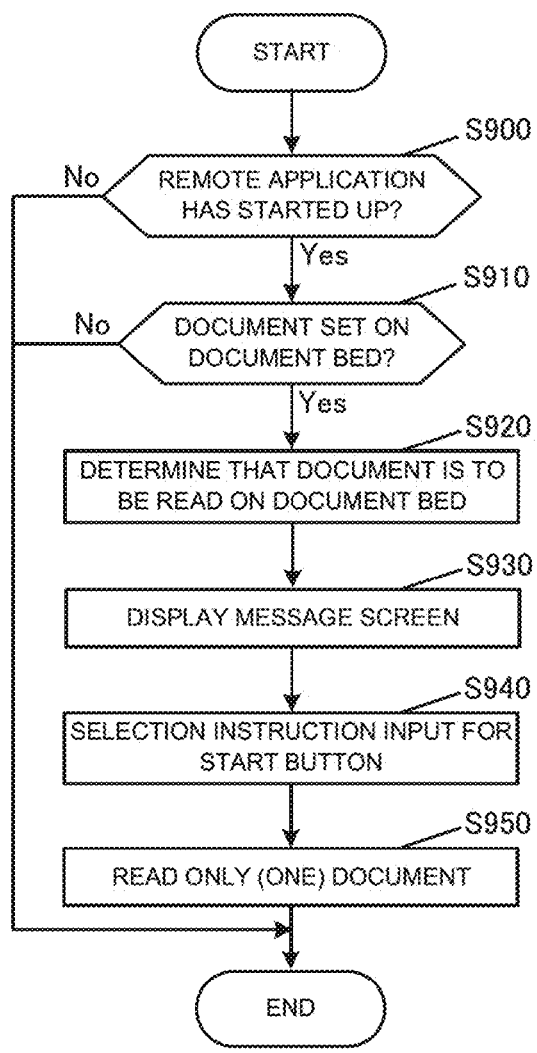
FIG. 38 is a flowchart illustrating a process of the multifunction peripheral according to the seventh embodiment.

Next, a process of the multifunction peripheral 90 will be described with reference to the flowchart in FIG. 38. FIG. 38 is a flowchart illustrating a process to read a document by the image reader 173 of the multifunction peripheral 90.

First, the controller 11 determines whether the remote application 215 has started up (Step S900). When it is determined that the remote application 215 has started up, the controller 11 determines whether a document has been set on the document bed (Step S900; Yes→Step S910). The controller 11 may detect the document by using, for example, an optical or mechanical detector to determine whether a document has been set on the document bed. Conversely, when it is determined that the remote application 215 has not started up, the controller 11 terminates the process (Step S900; No).

When it is determined that a document has been set on the document bed, the controller 11 determines that the document is to be read on the document bed (Step S910; Yes→Step S920). Conversely, when it is determined that no document has been set on the document bed, the controller 11 terminates the process (Step S910; No).

Subsequently, the controller 11 displays, on the display 13, the message indicating that document reading is to be started (Step S930).

When the user selects a start button to input a selection instruction of the start button, the controller 11 reads the document (one document) once placed on the document bed and terminates the process (Step S940→Step S950).

7.4 Operation Example

Figure 39:
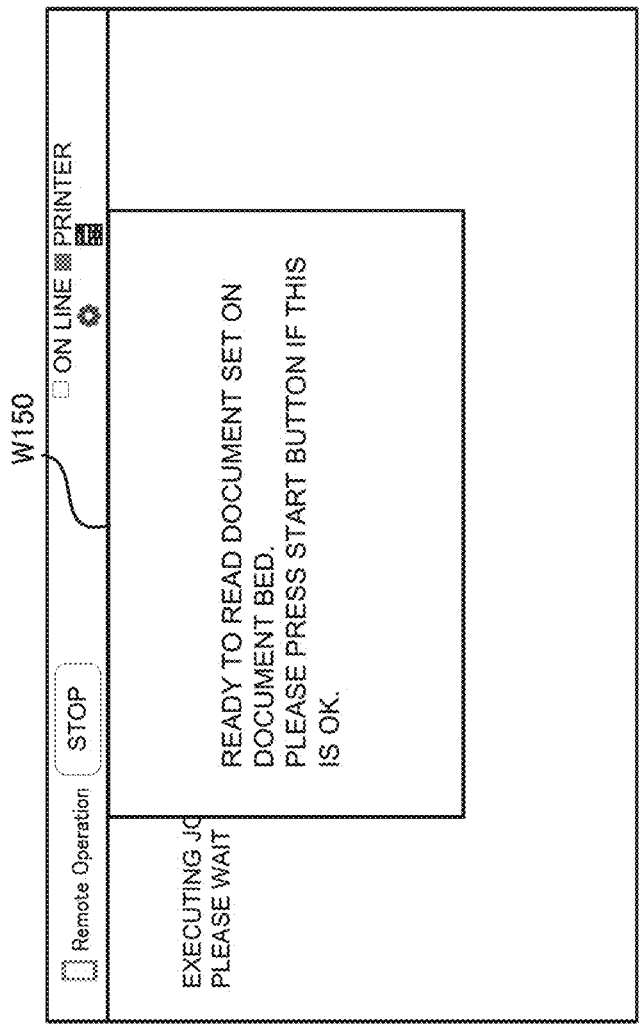
FIG. 39 is a diagram illustrating an operation example according to the seventh embodiment.

FIG. 39 is a diagram illustrating a configuration example of a message screen W150 displayed on the display 13 by the controller 11 at Step S930 of FIG. 38. The message screen W150 displays the message indicating that reading of the document set on the document bed is to be started. The user may confirm the displayed message and then select the start button displayed on the terminal device 30 to start document reading.

Figure 40:
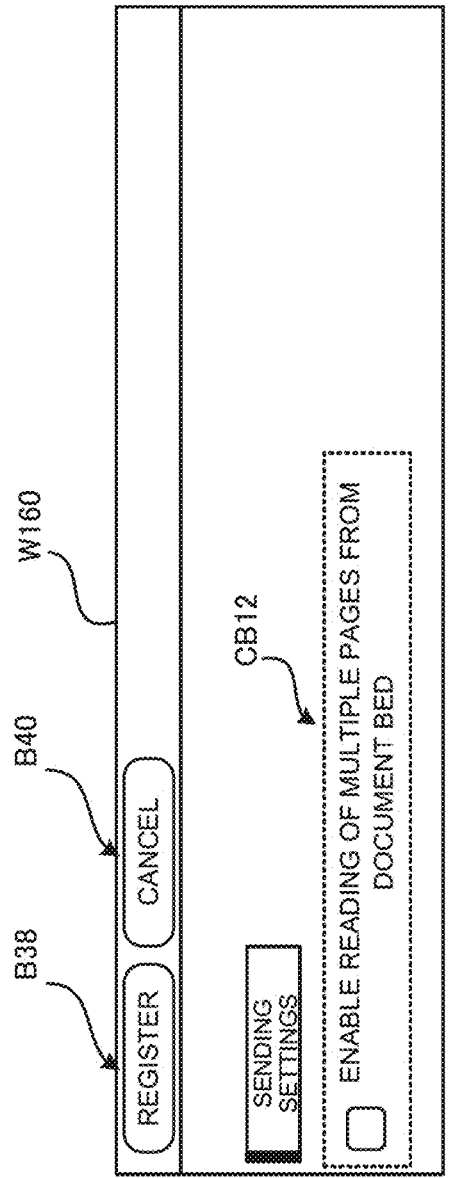
FIG. 40 is a diagram illustrating an operation example according to the seventh embodiment.

FIG. 40 is a diagram illustrating a configuration example of a document reading setting screen W160. The document reading setting screen W160 may be displayed, for example, via a system setting screen (not illustrated).

The document reading setting screen W160 includes a multiple-documents reading setting checkbox CB12, the registration button B38, and the cancel button B40.

The multiple-documents reading setting checkbox CB12 is a checkbox for setting the availability of multiple times of document reading (reading multiple documents) via the document bed. When the multiple-documents reading setting checkbox CB12 is checked, the setting for reading multiple documents is enabled.

The registration button B38 receives setting registration of the multiple-documents reading setting checkbox CB12. The cancel button B40 receives cancellation of the setting of the multiple-documents reading setting checkbox CB12.

As described above, according to the seventh embodiment, during the operation to read documents by using the document bed, the number of times the documents may be read on the document bed is limited to once (one document) so that it is possible to avoid the contact with the document bed and the operation screen as much as possible.

8 Eighth Embodiment

An eighth embodiment is an embodiment in which the use of an automatic document feeder is recommended when the user desires to read multiple documents according to the seventh embodiment.

The overall configuration or the functional configurations of the multifunction peripheral, the terminal device, and the network service according to the eighth embodiment may be identical to the functional configuration according to the seventh embodiment, and therefore the description here is omitted. The flow of the overall process, the process of the terminal device, and the process of the network service may also be identical to the process according to the seventh embodiment, and therefore the description here is omitted.

8.1 Regarding Process of Multifunction Peripheral 90

Next, a process of the multifunction peripheral 90 will be described with reference to the flowchart in FIG. 41. The process of the multifunction peripheral 90 is substantially identical to the flow of the process described in FIG. 38 according to the seventh embodiment, and therefore the same process is denoted by the same step number, and its description is omitted.

After the display 13 displays the message indicating that document reading is to be started, the controller 11 determines whether the setting place of the document has changed to the automatic document feeder (ADF) (Step S930→Step S960). For example, the controller 11 may determine that the setting place of the document has changed to the automatic document feeder when the detection signal of the document is no longer detected at the document bed and the detection signal of the document is detected in the automatic document feeder.

When it is determined that the setting place of the document has not changed to the automatic document feeder, that is, when the detection signal of the document is continuously detected at the document bed, the controller 11 performs the process at Steps S940 and S950 (Step S960; No→Step S940, Step S950).

Conversely, when it is determined that the setting place of the document has changed to the automatic document feeder, the controller 11 determines that the document is to be read by the automatic document feeder (Step S960; Yes→Step S970).

When the user selects the start button to input a selection instruction of the start button, the controller 11 reads the document and terminates the process (Step S980→Step S990).

8.2 Operation Example

Figure 41:
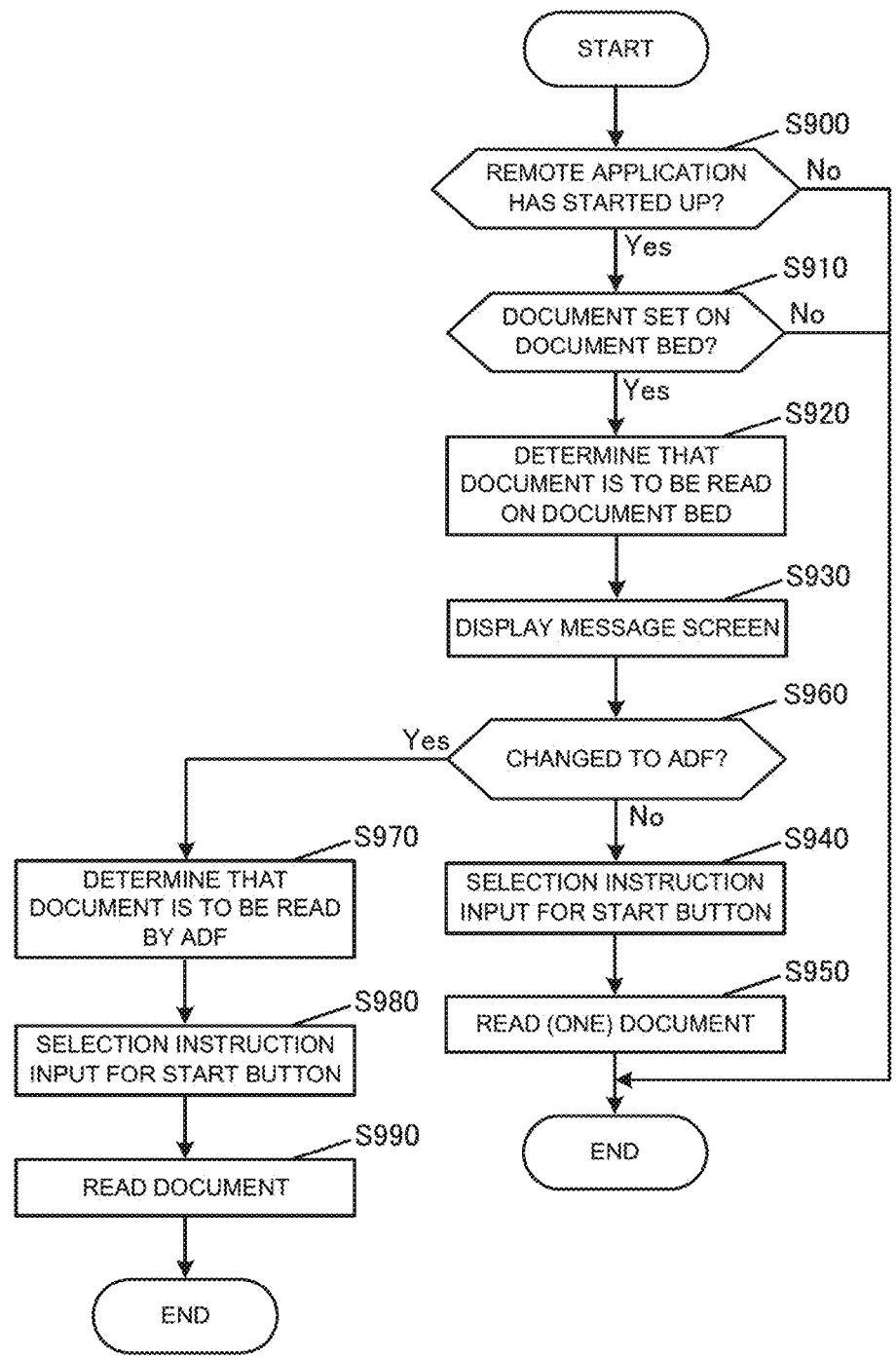
FIG. 41 is a flowchart illustrating a process of a multifunction peripheral according to an eighth embodiment.
Figure 42:
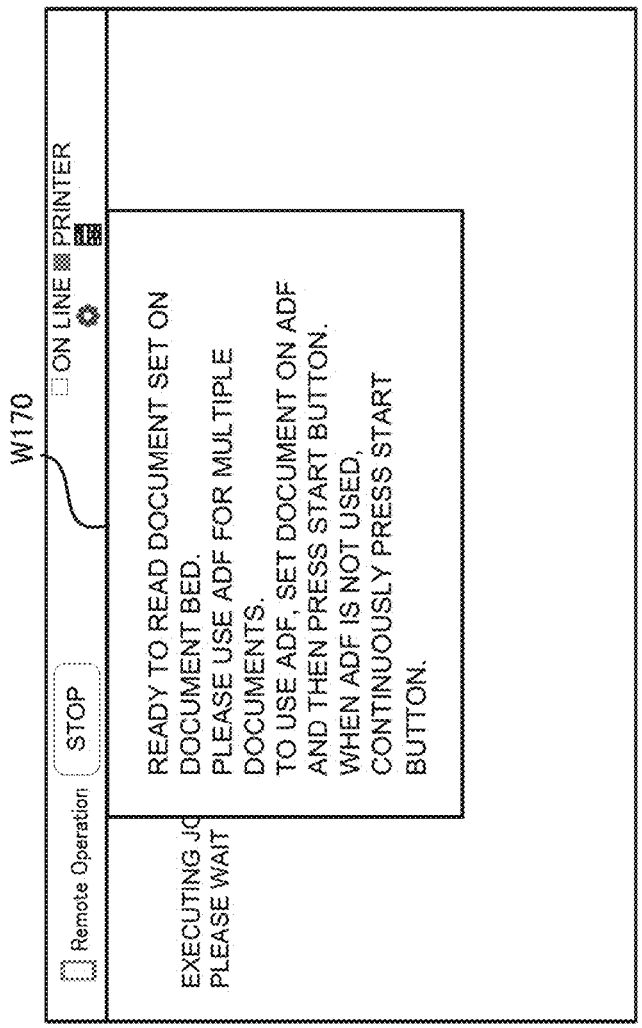
FIG. 42 is a diagram illustrating an operation example according to the eighth embodiment.

FIG. 42 is a diagram illustrating a configuration example of a message screen W170 as a recommendation screen displayed on the display 13 by the controller 11 at Step S930 of FIG. 41. The message screen W170 displays the message indicating the recommendation of the use of the automatic document feeder when there are multiple documents to be read. The user confirms the displayed message and then changes the setting place of the document to the automatic document feeder. Then, the user may select the start button displayed on the terminal device 30 to start document reading.

As described above, according to the eighth embodiment, in addition to the advantage of the seventh embodiment, when the user desires to read multiple documents, the automatic document feeder may be used to perform the reading operation so that it is possible to avoid the contact with the document bed and the operation screen as much as possible.

9 Ninth Embodiment

It is natural that the demand for improved usability increase along with the development of the technology for remote operations of multifunction peripherals. In particular, there is a need for more desirable operability and visibility of user interfaces connecting devices such as terminal devices and multifunction peripherals with users.

A ninth embodiment is an embodiment that may further improve the usability of the user interface provided by the terminal device 30.

For example, the application screen W60 described in FIG. 19, and the like, according to the first embodiment is configured to include the copy job selection button B26 and the scan job selection button B28 to enable the remote operation of the copy job or scan job for the multifunction peripheral 10. In the description according to the ninth embodiment, a fax job selection button is further added to these job selection buttons.

The overall configuration or the functional configurations of the multifunction peripheral, the terminal device, and the network service according to the ninth embodiment may be identical to the functional configuration according to any of the first embodiment to the eighth embodiment, and therefore the description here is omitted. The flow of the overall process, the process of the multifunction peripheral, the process of the terminal device, and the process of the network service may also be identical to the process according to any of the first embodiment to the eighth embodiment, and therefore the description here is omitted.

9.1 Operation Example

Figure 43:
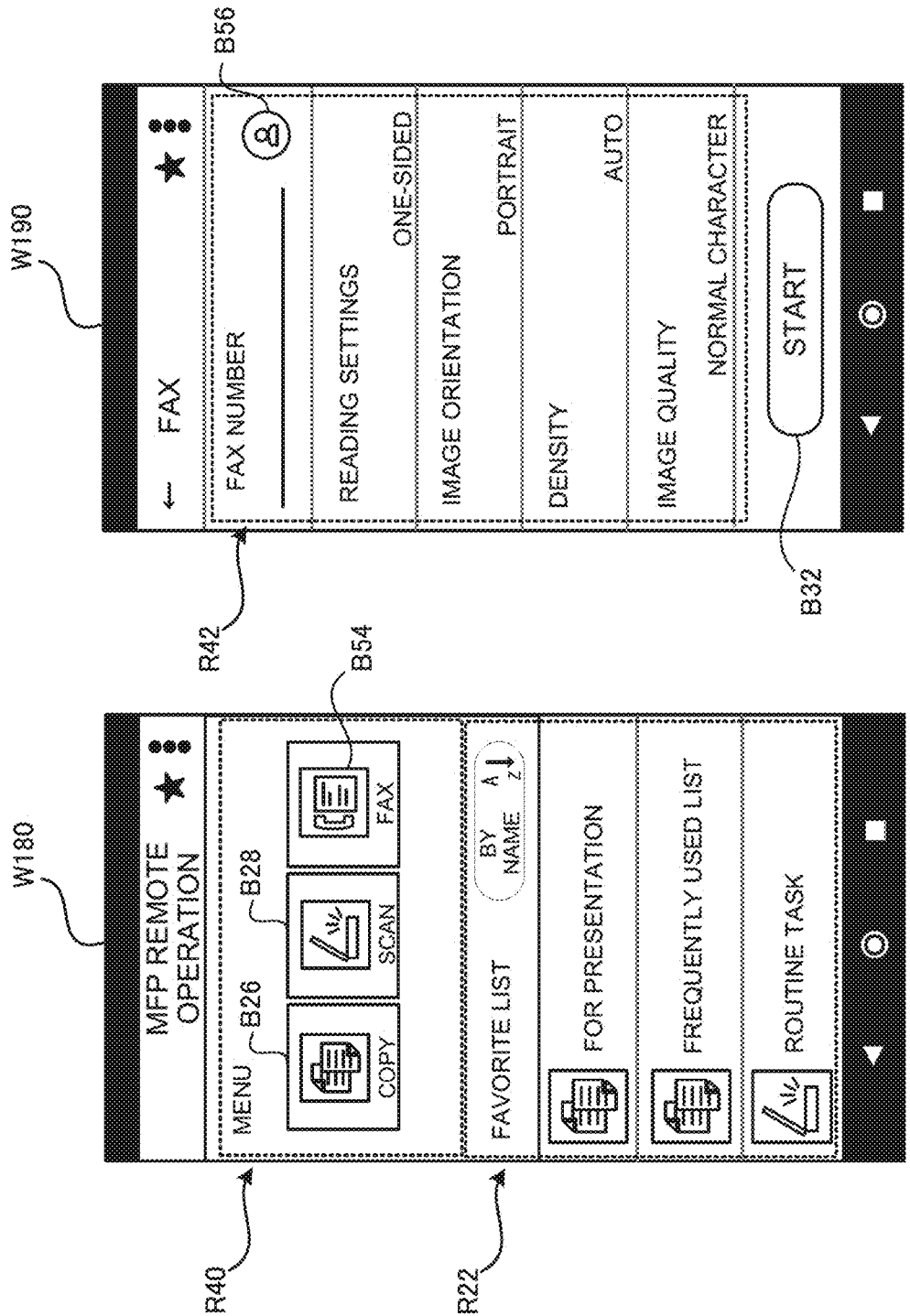
FIG. 43 is a diagram illustrating an operation example according to a ninth embodiment.

FIG. 43 illustrates a configuration example of an application screen W180 displayed on the display 33 by the controller 31 in response to the startup instruction of the job application 413 from the user. The application screen W180 includes a menu display area R40 and the favorite list display area R22.

The menu display area R40 includes the copy job selection button B26, the scan job selection button B28, and a fax job selection button B54. The copy job selection button B26 and the scan job selection button B28 have the same configuration as those described in FIG. 19, and therefore the description here is omitted. The favorite list display area R22 also has the same configuration as that described in FIG. 19, and therefore the description here is omitted.

The fax job selection button B54 receives the selection of the fax job from the user. When the selection of the fax job selection button B54 is received, the controller 31 may determine that the user has selected the fax job. When the selection of the fax job selection button B54 is received, the controller 31 displays a fax job execution screen W190 on the display 33.

The fax job execution screen W190 includes a setting value setting area R42 and the start button B32. The setting value setting area R42 receives input and selection of the setting value for job execution. The setting value may be input and selected for each setting item regarding the fax job, for example, "fax number", "reading settings", "image orientation", "density", and "image quality".

"Fax number" receives the input of the fax number of the sending destination. For example, when a screen operation such as a tap operation is performed on "fax number" by the user and the screen operation is detected, the controller 31 displays setting value input buttons (numeric keypad) that allows direct input of the fax number. The user may directly input the fax number via the numeric keypad. The fax number may also be selected via an address book selection button B56 in addition to the direct input using the numeric keypad. The address book is an address list managed by the terminal device 30 and is a collection of information in which the sending destination is associated with contact information such as fax number, telephone number, e-mail address, postal address, and workplace.

"Reading settings" is a setting item that has setting values such as "one-sided", "two-sided (vertical binding)", and "two-sided (horizontal binding) and that receives the setting for the reading side of the document. "Image orientation" is a setting item that has setting values such as "portrait" and "landscape" and that receives the setting for the orientation of the document image. "Density" is a setting item that has setting values such as "auto" and "manual (levels 1 to 5)" and receives the setting for document density. "Image quality" is a setting item that has setting values such as "normal character", "small character", "small character (middle tone) ", "fine", "fine (middle tone)", "high definition", and "high definition (middle tone)" and that receives the setting for document image quality.

After inputting and selecting these setting values in the setting value setting area R42, the user may select the start button B32 to execute the fax job.

Figure 44:
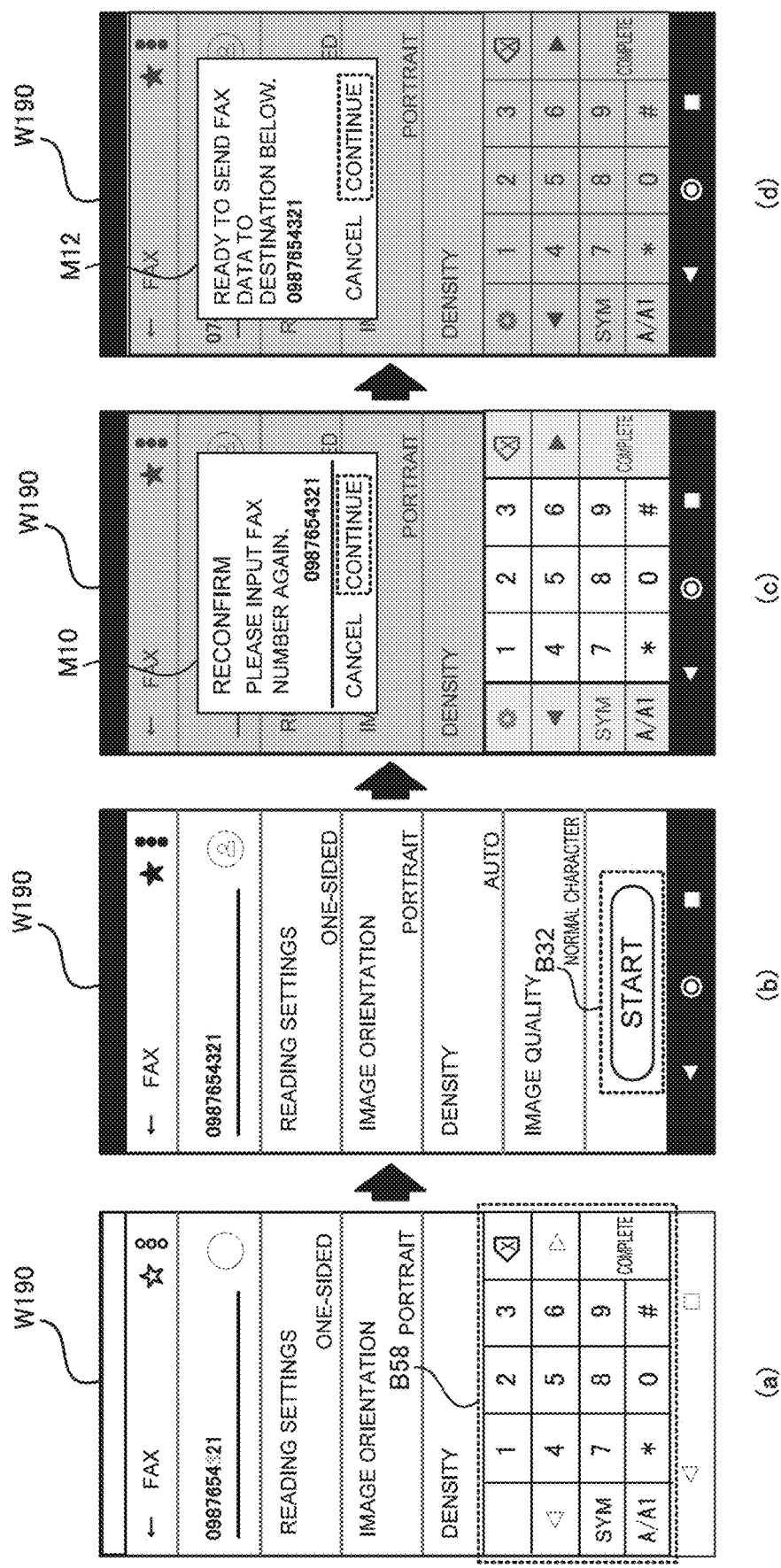
FIG. 44 is a diagram illustrating an operation example according to the ninth embodiment.

FIG. 44 is a diagram illustrating the procedure for directly inputting the fax number via the fax job execution screen W190. In the description of FIG. 44, it is assumed that the fax number input procedure transitions in order: a state (a) on the left of FIG. 44, a state (b), a state (c), and then a state (d).

The state (a) represents the state where the user has used setting value input buttons (numeric keypad) B58 to input the fax number "0987654321". When the input of the fax number is completed and, for example, "complete" of the setting value input buttons B58 is selected, the controller 31 shifts the display state of the fax job execution screen W190 to the state (b).

In the state (b), when the selection of the start button B32 is received from the user, the controller 31 shifts the display state of the fax job execution screen W190 to the state (c). In the state (c), the fax number input in the state (a) is input again (retyping function) to make the user reconfirm that there is no error in the input content. Therefore, when the information on the sending destination is a fax number, the controller 11 displays, on the modal M10 as a reconfirmation screen, the message prompting re-entry of the fax number (for example, "Please input the fax number again.") and a re-entry area (e.g., an entry area where all digits of the fax number may be input). After the fax number is input again and the selection of a set button on the modal M10 is received, the controller 31 compares the input content in the state (a) with the input content in the state (c). Here, when the two input contents do not match, the controller 31 displays, on the modal M10, the message indicating, for example, "The numbers do not match. Please input again." Then, the controller 31 returns the display state of the fax job execution screen W190 to the state (b), deletes the input fax number, and prompts re-entry of the fax number again.

In the state (c), when the selection of a cancel button on the modal M10 is received, the controller 31 returns the display state of the fax job execution screen W190 to the state (b), but continuously displays the input fax number.

When the selection of the set button on the modal M10 is received and the input content in the state (a) matches the input content in the state (c), the controller 31 shifts the display state of the fax job execution screen W190 to the state (d). In the state (d), the controller 31 displays, on the modal M12, the message prompting destination confirmation of the fax number (e.g., "Ready to send the fax data to the destination below.") and, when the selection of a continue button on the modal M12 is received, executes the fax job.

Figure 45:
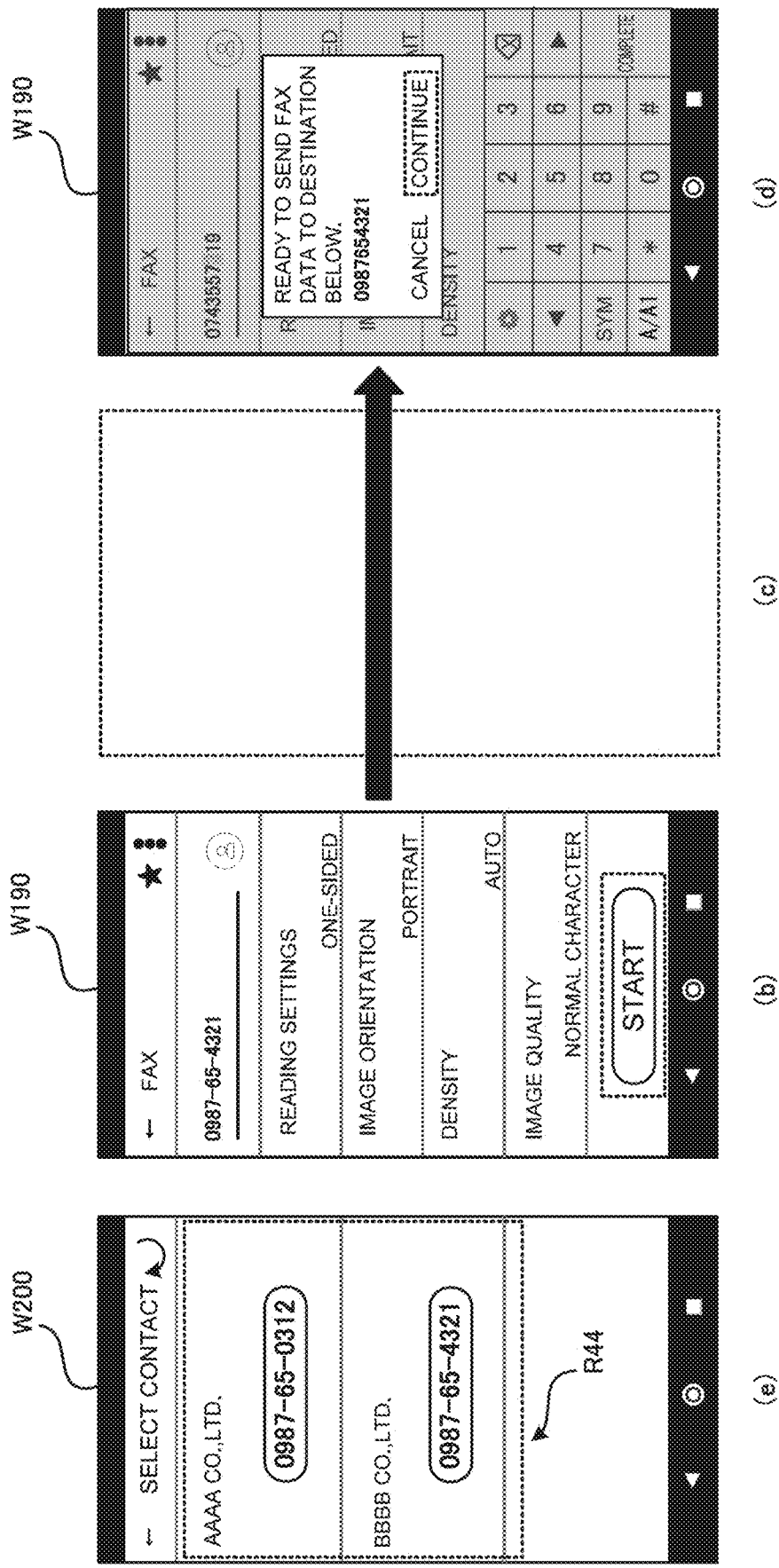
FIG. 45 is a diagram illustrating an operation example according to the ninth embodiment.

FIG. 45 is a diagram illustrating the procedure when the address book selection button B56 is used as information on the sending destination stored in the storage 41 to input the fax number via the fax job execution screen W190. The ones having the same state as those in FIG. 44 are denoted by the same reference numerals. In the description of FIG. 45, it is assumed that the fax number input procedure transitions in order: a state (e) on the left of FIG. 45, the state (b), the state (c), and then the state (d).

When the selection of the address book selection button B56 on the fax job execution screen W190 is received, the controller 31 displays a contact selection screen W200 (the state (e)). The contact selection screen W200 includes a contact selection area R44. The contact selection area R44 is an area that displays the fax numbers of sending destinations registered in the address book managed by the terminal device 30 in the storage 41. The user may select the fax number of the sending destination displayed in the contact selection area R44 to input the fax number.

When one of the fax numbers displayed in the contact selection area R44 is selected, the controller 31 shifts the display state of the fax job execution screen W190 to the state (b). When the fax number is selected from the address book, in principle, the controller 31 does not request retyping of the fax number, which is requested when the fax number is directly input. However, when it is detected that editing has been made to the selected fax number, the controller 31 shifts the display state of the fax job execution screen W190 to the state (c) in FIG. 44 and requests retyping of the fax number.

Subsequently, the controller 31 shifts the display state of the fax job execution screen W190 to the state (d). In the state (d), the controller 31 displays, on the modal M12, the message prompting destination confirmation of the fax number (e.g., "Ready to send the fax data to the destination below.") and, when the selection of the continue button on the modal M12 is received, executes the fax job.

Figure 46:
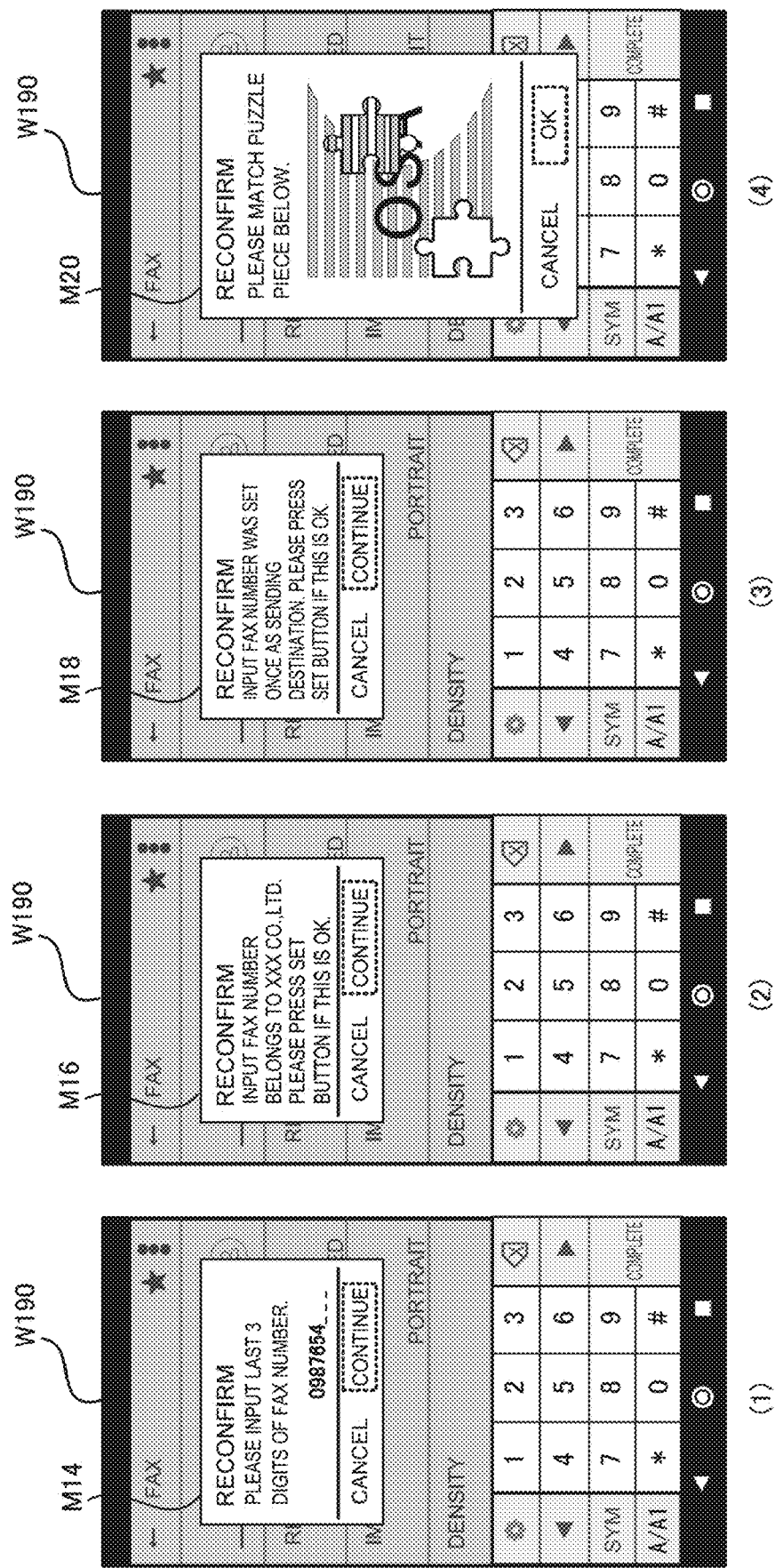
FIG. 46 is a diagram illustrating an operation example according to the ninth embodiment.

FIG. 46 is a diagram illustrating other forms that are applicable instead of retyping of the fax number in the state (c) of the fax job execution screen W190 illustrated in FIG. 44.

A form (1) is a form that asks the user to input a part of the fax number instead of asking the user to input all the digits of the fax number again. In this case, a modal M14 places a cursor that allows numerical input at the position of the numerical value to be input and, for the numerical values that are not to be input, continuously displays a part of the fax number input in the state (a). The form (1) requests the user to input a part of the fax number, and therefore the burden on the user for inputting the fax number may be reduced. In the example of the form (1), the number of digits to be input is three digits, but the number of digits to be input is not limited thereto.

A form (2) is a form that displays, on a modal M16, a search result that is obtained by a search service that searches for the destination information based on the fax number input in the state (a) by using the fax number as a search value. In the form (2), the destination information corresponding to the fax number input in the state (a) is displayed as a search result, and therefore it is advantageous in grasping the image of the sending destination more easily than directly inputting the fax number.

A form (3) is a form in which, when the fax number input in the state (a) matches the fax number that was once set as the sending destination in the past, re-entry of the fax number is not requested. When the fax number input in the state (a) matches the fax number that was once set as the sending destination in the past, it is unlikely that the fax number was incorrectly input by the user. In such a case, as explained for the modal M18, such a display as "The input fax number has once been set as a transmission destination. If this is OK, please press the determination button." is presented, and the form does not request re-entry of the fax number, and therefore the burden on the user for inputting the fax number may be reduced.

A form (4) is a form in the case including verification as to whether the fax number was input by a human in the state (a). The use of image authentication, such as hiragana authentication and picture authentication as well as puzzle authentication explained for the modal M20, as illustrated in FIG. 46, may increase security for fax job execution.

Furthermore, the setting for requesting the re-entry of the fax number as described in FIG. 44, and the like, may be made via an application setting modal. Here, the setting for re-entry of the fax number will be described with reference to FIG. 47.

Figure 47:
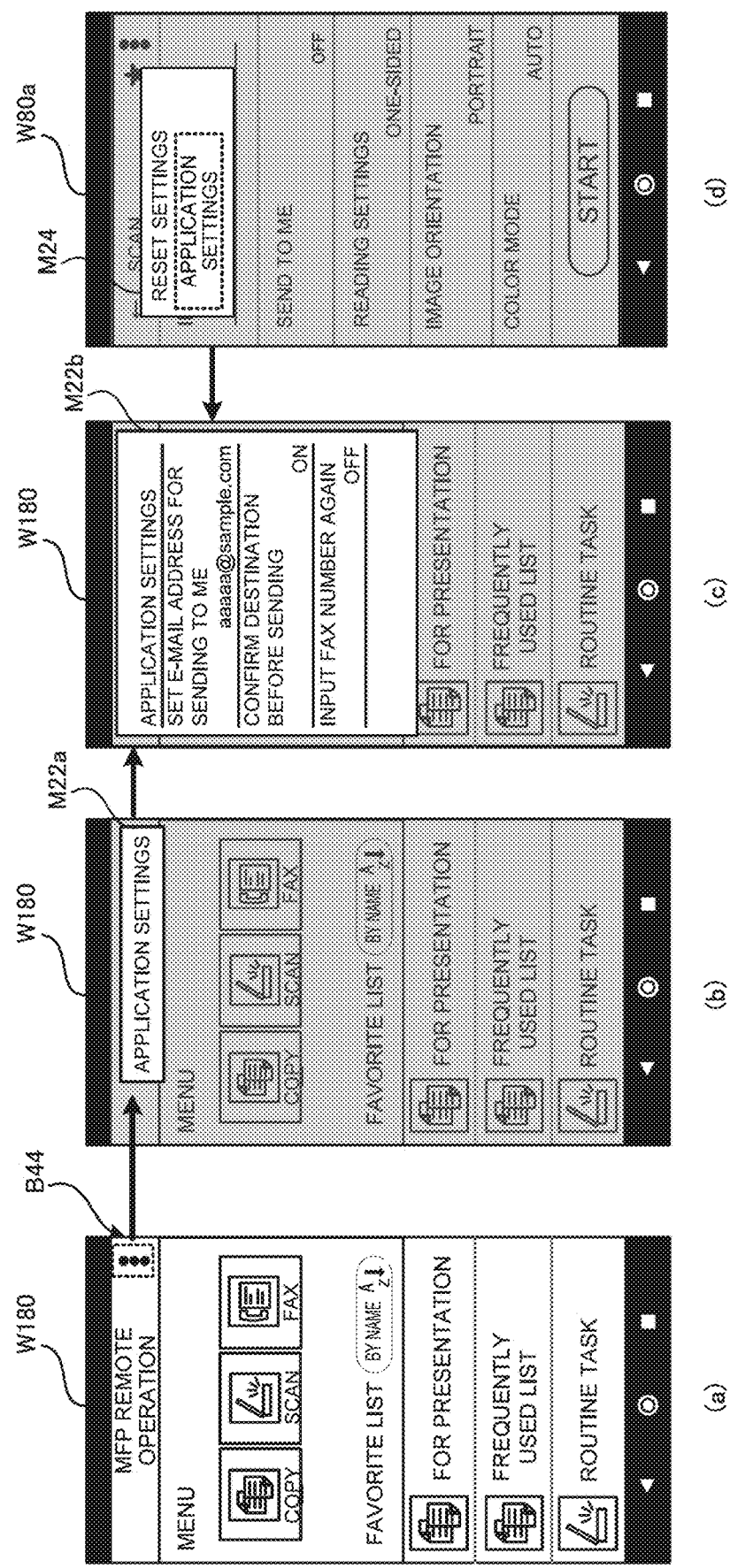
FIG. 47 is a diagram illustrating an operation example according to the ninth embodiment.

The application setting modal may be displayed, for example, when the user selects the application setting button B44 provided on the application screen W180 illustrated in FIG. 47(*a*). When the selection of the application setting button B44 is received, the controller 31 displays an application setting modal M22a (FIG. 47(*b*)).

The application setting modal M22a as an application setting screen illustrated in FIG. 47(*b*) may be displayed and developed into the settable contents as illustrated in FIG. 47(c) due to, for example, detection of a tap operation, or the like, on the modal. After the development, an application setting modal M22b collectively displays setting items regarding application settings, such as "set the e-mail address for sending to me", "confirm the destination before sending", and "input the fax number again". To disable the function for inputting the fax number again, the user may set the setting value of "input the fax number again" to "OFF" to disable the function for inputting the fax number again. Conversely, to enable the function for inputting the fax number again, the user may set the setting value of "input the fax number again" to "ON" to enable the function for inputting the fax number again.

As illustrated in FIG. 47(b), as the application setting modal M22b collectively displays the items whose settings may be changed regardless of the type of application, the user may efficiently set the application settings, which may enhance the usability.

As illustrated in FIG. 47(d), the application setting modal M22b may also be displayed via the job execution screen of each application. FIG. 47(d) illustrates an example in which an application setting button for receiving an instruction to display the application setting modal M22b, at a modal M24 on the scan job execution screen W80a. This configuration allows the user to easily access the application setting modal M22b regardless of whether the display 33 (operation screen) displays either the application screen or the job execution screen.

As described above, the user interface provided by the terminal device has an additional configuration to enable fax jobs in addition to copy jobs and scan jobs and further has a configuration to provide a retyping function to reconfirm the input fax number, and thus, according to the ninth embodiment, it is possible to provide the terminal device, and the like, which may further improve the usability. The application setting modal collectively displays the items whose settings may be changed regardless of the type of application, and thus the user may efficiently set the application settings.

10 Tenth Embodiment

A tenth embodiment is an embodiment that may further improve the usability of the user interface provided by the multifunction peripheral 10.

In the description according to the tenth embodiment, the progress status of the job is added to the display content of an execution screen W40 (FIG. 17) displayed in the display 13 while the job is being executed after the multifunction peripheral 10 receives the job from the network service 50.

The overall configuration or the functional configurations of the multifunction peripheral, the terminal device, and the network service according to the tenth embodiment may be identical to the functional configuration according to any of the first embodiment to the ninth embodiment, and therefore the description here is omitted. The flow of the overall process, the process of the multifunction peripheral, the process of the terminal device, and the process of the network service may also be identical to the process according to any of the first embodiment to the ninth embodiment, and therefore the description here is omitted.

10.1 Operation Example

Figure 48:
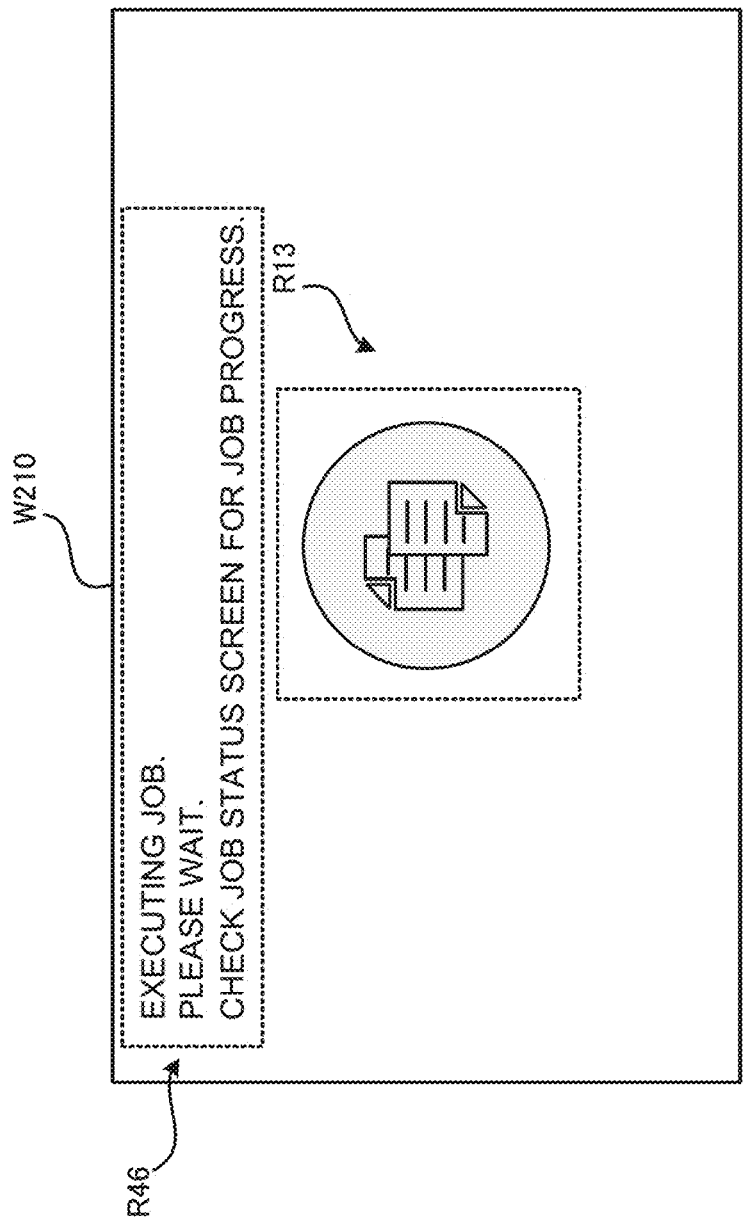
FIG. 48 is a diagram illustrating an operation example according to a tenth embodiment.

FIG. 48 illustrates a configuration example of an execution screen displayed on the display 13 while the job is being executed after the multifunction peripheral 10 receives the job from the network service 50. An execution screen W210 includes a message display area R46 indicating that the job is being executed and the executed job display area R13 displaying the type of job being executed (the copy job in the example of FIG. 48) by an illustration or animation.

The message display area R46 of the execution screen W210 illustrated in FIG. 48 displays, in addition to the display content on the execution screen W40, the message "Check the job status screen for the job progress.". For example, when the job is related to a fax job and it takes time to complete the job depending on a communication condition, the user may operate the job status button provided on the home screen to check the progress status of the job.

Figure 49:
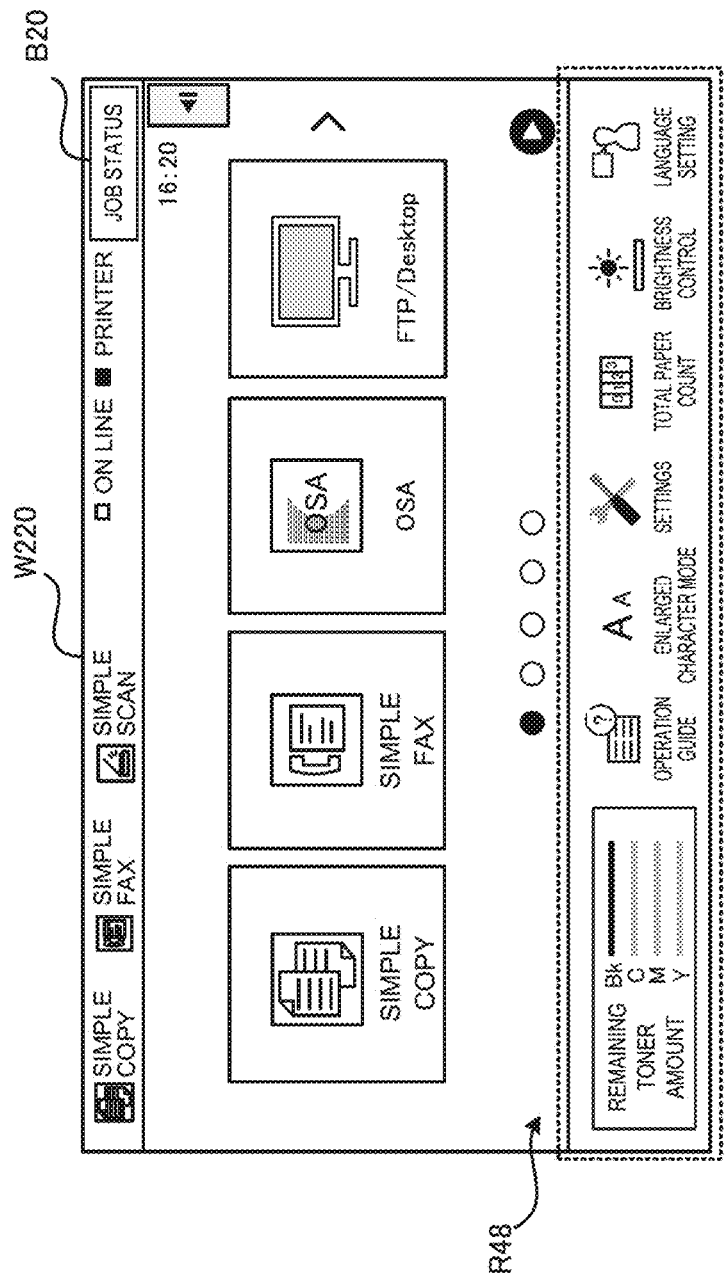
FIG. 49 is a diagram illustrating an operation example according to the tenth embodiment.

FIG. 49 illustrates a configuration example of a home screen W220 including the job status button B20. The home screen W220 may have substantially the same configuration as that of the home screen W20 illustrated in FIG. 15. The home screen W220 illustrated in FIG. 49 includes, for example, a display area R48 at a lower portion of the screen to display apparatus settings and consumables information such as toner consumption. The display layout of the home screen W20 illustrated in FIG. 15 and the home screen W220 illustrated in FIG. 49 may be changed and set via the system setting screen, etc.

FIGS. 50 to 52 illustrate configuration examples of job execution screens displayed by the controller 11 when the selection of the job status button B20 on the home screen W220 in FIG. 49 is received. FIG. 50 illustrates a configuration example of the job execution screens W230a and W230b for a copy job (print). FIG. 51 illustrates a configuration example of the job execution screens W240a and W240b for a scanner job. FIG. 52 illustrates a configuration example of the job execution screens W250a and W250b for a fax job. The job execution screens illustrated in FIGS. 50 to 52 may all have the same configuration. Therefore, in the description below, the same configuration is denoted by the same reference numeral, and the job execution screens W230a and W230b for the copy job in FIG. 50 are used as a representative example in the description.

A job execution screen W230a and a job execution screen W230b illustrated in FIG. 50 include an executed job display area R50 and a status display area R52.

The executed job display area R50 is an area that displays information about the executed job (job type, user name, number of set copies, status, start time, etc.). The executed job display area R50 includes job type switch tabs that allow switching of the display of the information about the executed job for each job type (copy (print) job, scanner job, fax job, or Internet Fax). The user may operate the job type switching tab to check the execution status of the job for the desired job type.

The status display area R52 is an area that displays the execution status of the job. For example, the job execution screen W230a is an example of an execution screen of the job that is in the status of reservation/in execution. The same applies to a job execution screen W240a for the scanner job in FIG. 51 and a job execution screen W250a for the fax job in FIG. 52.

The job execution screen W230b is an example of an execution screen of the job that is in a completed status. The same applies to a job execution screen W240b for the scanner job in FIG. 51 and a job execution screen W250b for the fax job in FIG. 52.

As illustrated in FIG. 50, the job execution screen W230a and the job execution screen W230b may display different types of information in the executed job display area R50. In the example of FIG. 50, the information displayed on the job execution screen W230a includes information about "job", "user/mode", "end/number of set copies", "status", and "start time". Conversely, the information displayed on the job execution screen W230b includes information about "job", "complete", "set time", "number of copies", and "status". As described above, the content of the information displayed in the executed job display area R50 is changed in accordance with the execution status of the job so that the user may accurately recognize the execution status of the job.

As described above, according to the tenth embodiment, the progress status of the job may be included in the display content of the execution screen displayed on the display while the job received from the network service is being executed by the multifunction peripheral. This configuration allows the user to easily recognize the execution status of the job, which may further improve the usability.

The present disclosure is not limited to the above-described embodiments, and various modifications may be made. Specifically, the technical scope of the present disclosure also includes embodiments obtained by combining technical measures that are modified as appropriate without departing from the scope of the present disclosure.

Some parts of the above-described embodiments are separately described for convenience of explanation, but it is obvious that the embodiments may be implemented in combination within a technically allowable range.

The program operating in each apparatus according to the embodiment is a program that controls the CPU, and the like (a program that causes the computer to function) so as to perform the functions according to the above-described embodiments. The information handled by these apparatuses is temporarily stored in a temporary storage device (e.g., RAM) during its processing, and then stored in various storage devices such as a read only memory (ROM) or an HDD, and is read, modified, and written by the CPU as needed.

Here, a recording medium for storing the program may be any of a semiconductor medium (e.g., a ROM or a non-volatile memory card), an optical recording medium/magneto-optical recording medium (e.g., a Digital Versatile Disc (DVD), a Magneto Optical Disc (MO), a Mini Disc (MD), a Compact Disc (CD), and a Blu-ray Disc (BD) (registered trademark)), and a magnetic recording medium (e.g., a magnetic tape or a flexible disk). The function according to the above embodiment may be performed by executing the loaded program, and also the function according to the present disclosure may be performed by processing in conjunction with the operating system, other application programs, or the like, based on an instruction of the program.

For distribution in the market, the program may be stored and distributed in a portable recording medium or transferred to a server computer connected via a network such as the Internet. In this case, it is obvious that the present disclosure also includes a storage device of the server computer.

What is claimed is:

1. An image processing apparatus comprising:
a controller;
a display; and
a job executor that executes a job related to image processing at a predetermined setting based on setting information for job execution sent from a terminal device, wherein
the controller
sets a termination determination time,
starts up an application in response to a startup instruction,
generates apparatus information including identification information on the image processing apparatus based on the started application, displays the generated apparatus information on the display for the terminal device,
controls the job executor to output the job at a predetermined setting based on the setting information for the job execution sent from the terminal device having read the displayed apparatus information,
displays, on the display of the image processing apparatus, a first setting screen that prompts a selection as to whether the application is to be terminated and that receives a designation of a termination determination time before the application is terminated,
displays, on the display of the image processing apparatus, a second setting screen capable of extending the termination determination time, and
when the termination determination time has elapsed after the startup of the application terminates the application and a connection between the terminal device and the image processing apparatus is forcibly disconnected.

2. The image processing apparatus according to claim 1, wherein the controller further starts up the application based on the startup instruction from a logged-in user when a user authentication function is enabled.

3. The image processing apparatus according to claim 2, wherein the controller further logs out the logged-in user after the application is terminated.

4. The image processing apparatus according to claim 1, wherein the controller further starts up the application by using an operation for execution of the job as a trigger when a user authentication function is disabled.

5. The image processing apparatus according to claim 1, wherein the controller further acquires the setting information sent from the terminal device via a network service.

6. The image processing apparatus according to claim 5, wherein the controller further periodically sends, to the network service, a request to acquire the setting information corresponding to the identification information.

7. The image processing apparatus according to claim 1, wherein the apparatus information is encoded using one or more of a two-dimensional code, a one-dimensional code, a symbol, and an alphanumeric character.

8. The image processing apparatus according to claim 1, wherein the termination determination time is a time that has passed since the application started up.

9. A method of outputting a job related to image processing by an image processing apparatus, the method comprising:
setting a termination determination time;
starting up an application in response to a startup instruction;
generating apparatus information including identification information on the image processing apparatus based on the started application;
displaying, on a display of the image processing apparatus, the generated apparatus information for a terminal device;

outputting a job at a predetermined setting based on setting information for job execution sent from the terminal device having read the displayed apparatus information;

displaying, on the display of the image processing apparatus, a first setting screen that prompts a selection as to whether the application is to be terminated and that receives a designation of a termination determination time before the application is terminated;

displaying, on the display of the image processing apparatus, a second setting screen capable of extending the termination determination time; and when the termination determination time has elapsed after the startup of the application, terminating the application and a connection between the terminal device and the image processing apparatus is forcibly disconnected.

10. An image processing apparatus comprising:

a controller;

a display; and a job executor that is capable of executing a job related to image processing and registered in a network service at a predetermined setting based on setting information for job execution sent from a terminal device, wherein the controller starts up an application in response to a startup instruction, establishes a communication with the terminal device, acquires the job including the setting information for the job execution from the terminal device and controls the job executor to execute the acquired job, outputs, to the network service, a deletion request to request deletion of the job when the application is started up, the job being registered in the network service and not executed, displays, on the display of the image processing apparatus, a first setting screen that prompts a selection as to whether the application is to be terminated and that receives designation of a termination determination time before the application is terminated, and displays, on the display of the image processing apparatus, a second setting screen capable of extending the termination determination time.

11. The image processing apparatus according to claim 10, wherein the controller further generates apparatus information including identification information on the image processing apparatus based on the started application, displays the generated apparatus information on the display, and establishes a communication with the terminal device having read the displayed apparatus information.

12. The image processing apparatus according to claim 10, wherein the controller further requests a session key from the network service, is capable of acquiring the job from the network service while the session key is valid, and when the application is started up, outputs the deletion request for the registered job even while the session key is valid.

13. The image processing apparatus according to claim 10, wherein the controller further outputs the deletion request before or when the application is started up based on a startup instruction input.

14. The image processing apparatus according to claim 10, wherein the controller further outputs the deletion request at time of an initialization process of the image processing apparatus or at time of user authentication.

15. The image processing apparatus according to claim 10, wherein the controller further inquires a user as to whether the job is to be deleted when the deletion request is output.

16. The image processing apparatus according to claim 15, wherein the controller further displays, on the display, an inquiry screen as to whether the job is to be deleted.

17. The image processing apparatus according to claim 16, wherein the inquiry screen displays information about a user who registered the job.

* * * * *